(12) United States Patent
Haarburger

(10) Patent No.: US 12,245,570 B1
(45) Date of Patent: Mar. 11, 2025

(54) PET DENTAL DEVICES AND SYSTEMS

(71) Applicant: Woof Pet Inc., Denver, CO (US)

(72) Inventor: Daniel Haarburger, Denver, CO (US)

(73) Assignee: Woof Pet Inc., Denver, CO (US)

( * ) Notice: Subject to any disclaimer, the term of this patent is extended or adjusted under 35 U.S.C. 154(b) by 0 days.

(21) Appl. No.: 18/740,044

(22) Filed: Jun. 11, 2024

Related U.S. Application Data

(60) Provisional application No. 63/538,113, filed on Sep. 13, 2023.

(51) Int. Cl.
*A01K 15/02* (2006.01)
*A61D 5/00* (2006.01)

(52) U.S. Cl.
CPC .............. *A01K 15/026* (2013.01); *A61D 5/00* (2013.01)

(58) Field of Classification Search
CPC ................................. A01K 15/026; A61D 5/00
See application file for complete search history.

(56) References Cited

U.S. PATENT DOCUMENTS

| | | | | |
|---|---|---|---|---|
| 5,647,302 | A * | 7/1997 | Shipp .................... | A01K 15/026 606/235 |
| 10,448,615 | B1 * | 10/2019 | Mullin ................. | A01K 15/026 |
| D971,549 | S | 12/2022 | Ubel | |
| 2006/0102099 | A1 * | 5/2006 | Edwards .............. | A01K 15/026 119/710 |
| 2012/0272922 | A1 * | 11/2012 | Axelrod ............... | A01K 15/026 119/709 |
| 2017/0258046 | A1 * | 9/2017 | Valle ........................ | A01K 5/00 |
| 2017/0303509 | A1 * | 10/2017 | Stone ....................... | A01K 5/00 |
| 2018/0271062 | A1 * | 9/2018 | Toolan ................ | A01K 15/026 |
| 2019/0133082 | A1 * | 5/2019 | Becattini, Jr. ........ | A01K 15/026 |
| 2021/0153995 | A1 * | 5/2021 | Coopersmith ....... | A01K 13/001 |
| 2023/0048506 | A1 | 2/2023 | Ponte et al. | |
| 2023/0056488 | A1 | 2/2023 | Mayberry et al. | |
| 2024/0130330 | A1 * | 4/2024 | Chen .................... | A01K 15/025 |

FOREIGN PATENT DOCUMENTS

WO   WO 2021/216646   10/2021

* cited by examiner

*Primary Examiner* — Yvonne R Abbott-Lewis
(74) *Attorney, Agent, or Firm* — Sheridan Ross P.C.

(57) ABSTRACT

Pet dental devices and systems are provided. The dental device may include at least one body and at least one cavity extending into the body. The cavity is configured to receive a pet treat. The device also includes at least one cutout extending into the body and intersecting the at least one cavity to expose a pet treat disposed in the at least one cavity. The device further includes at least one set of dental cleaning mechanism positioned on at least a portion of a perimeter of the at least one cutout. The pet treat as disposed in the at least one cavity and partially exposed by the cutout encourages a pet to chew the dental device at the cutout such that the pet's teeth contact the dental cleaning mechanism and cleans the pet's teeth.

20 Claims, 49 Drawing Sheets

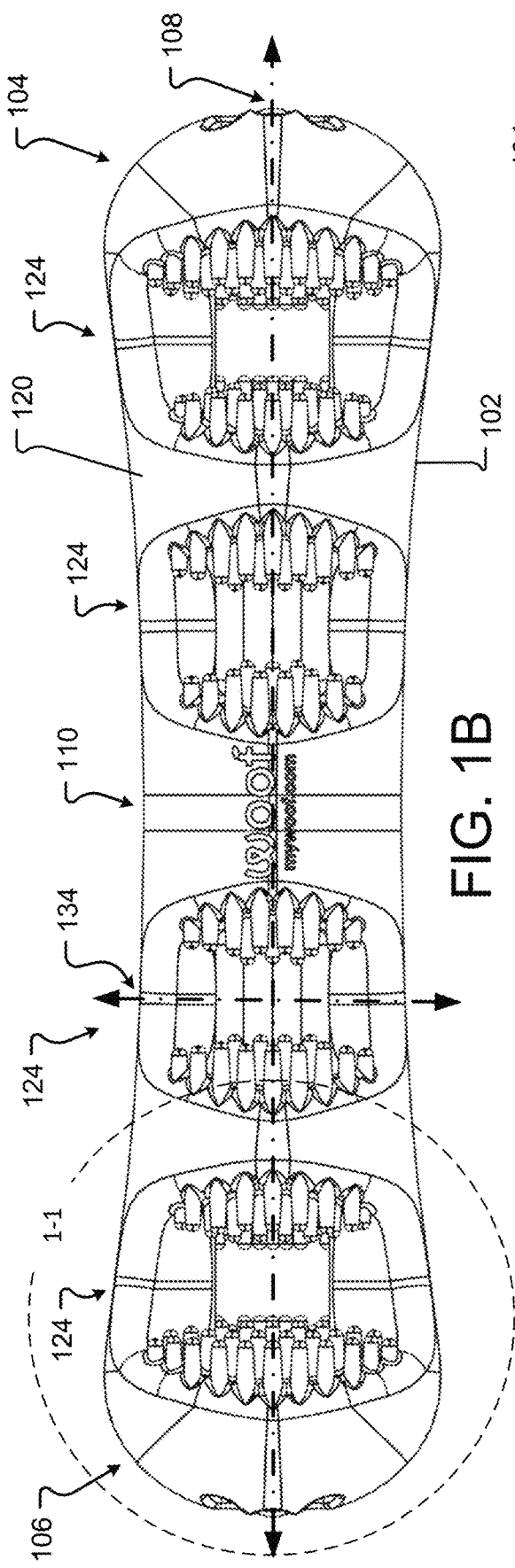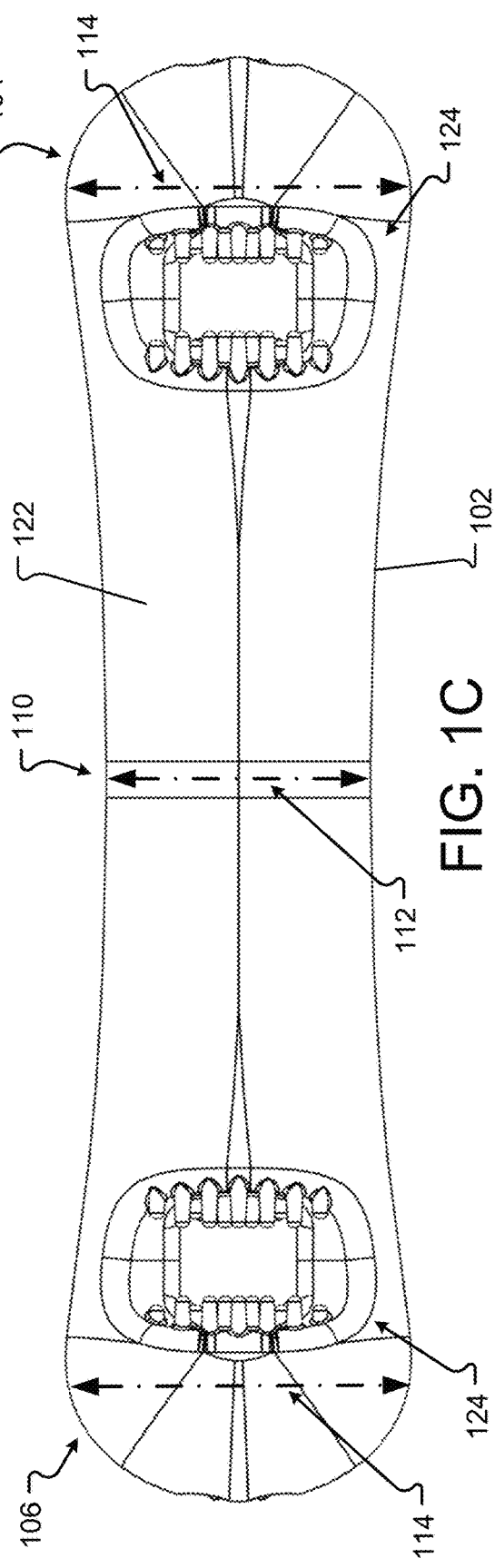
FIG. 1B
FIG. 1C

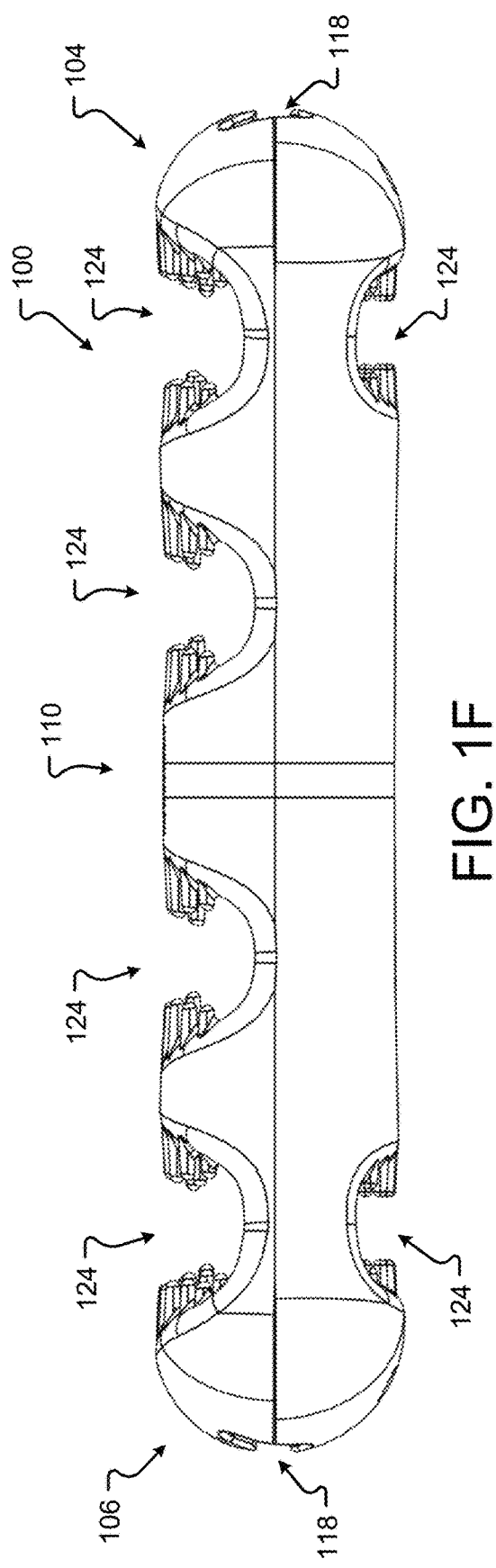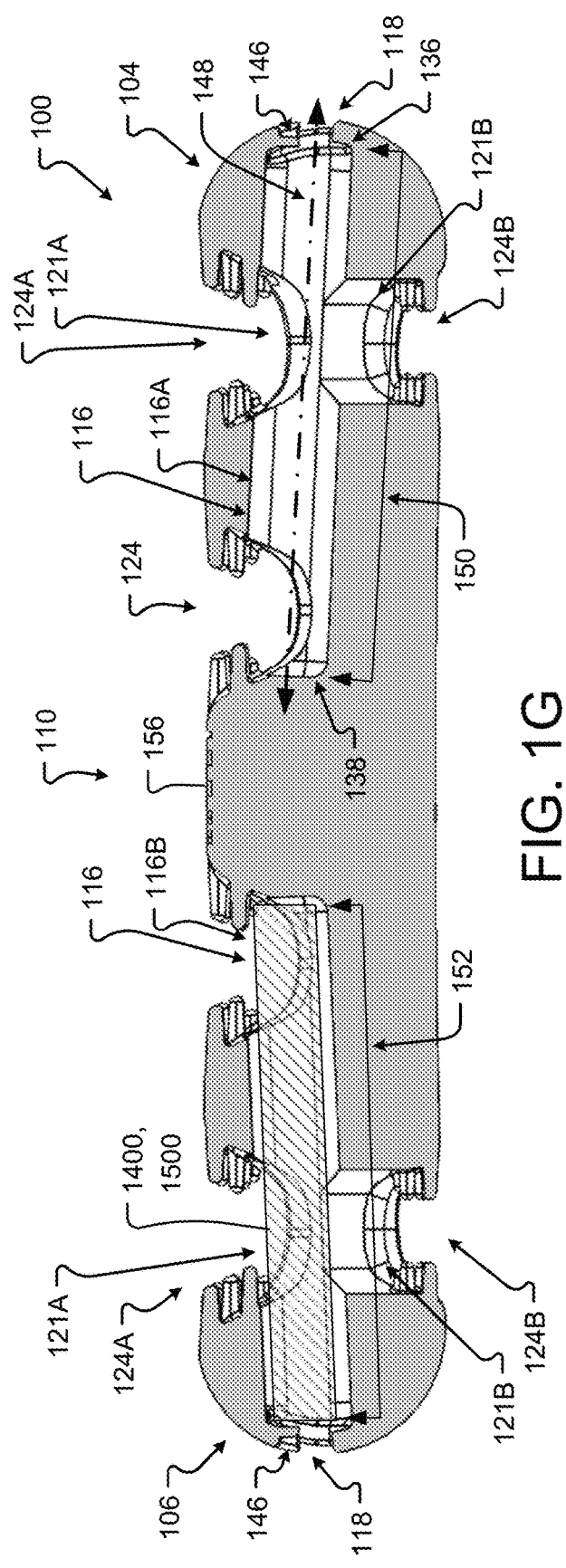

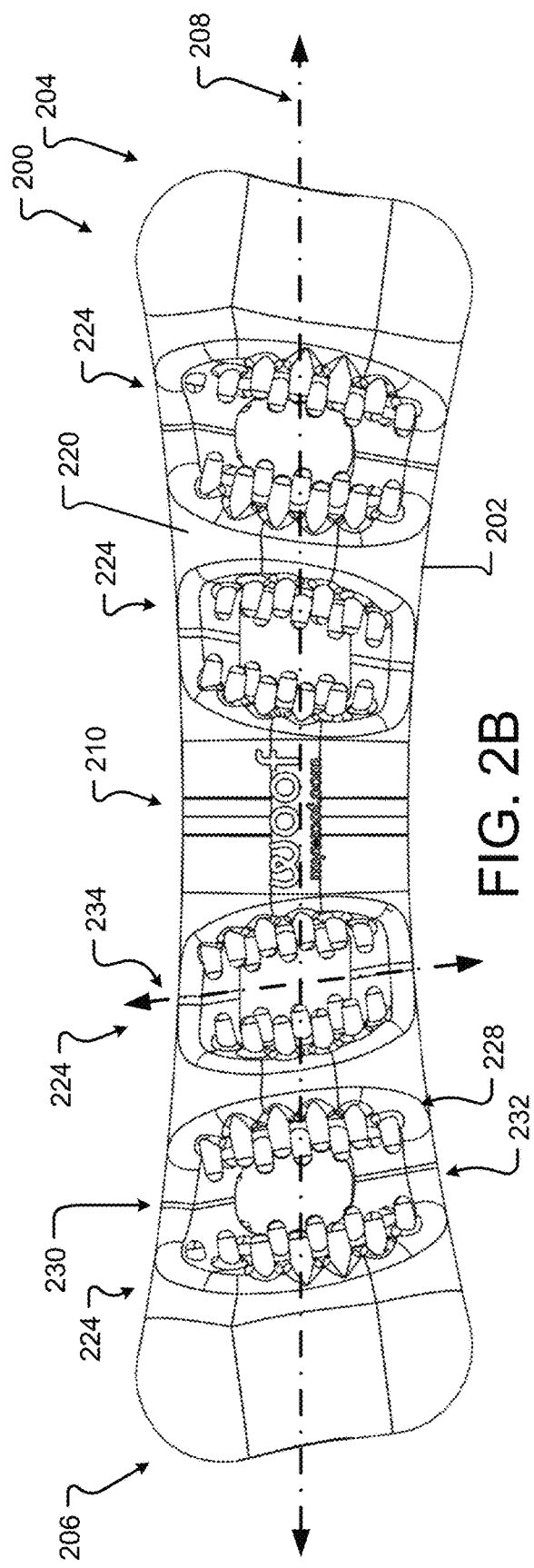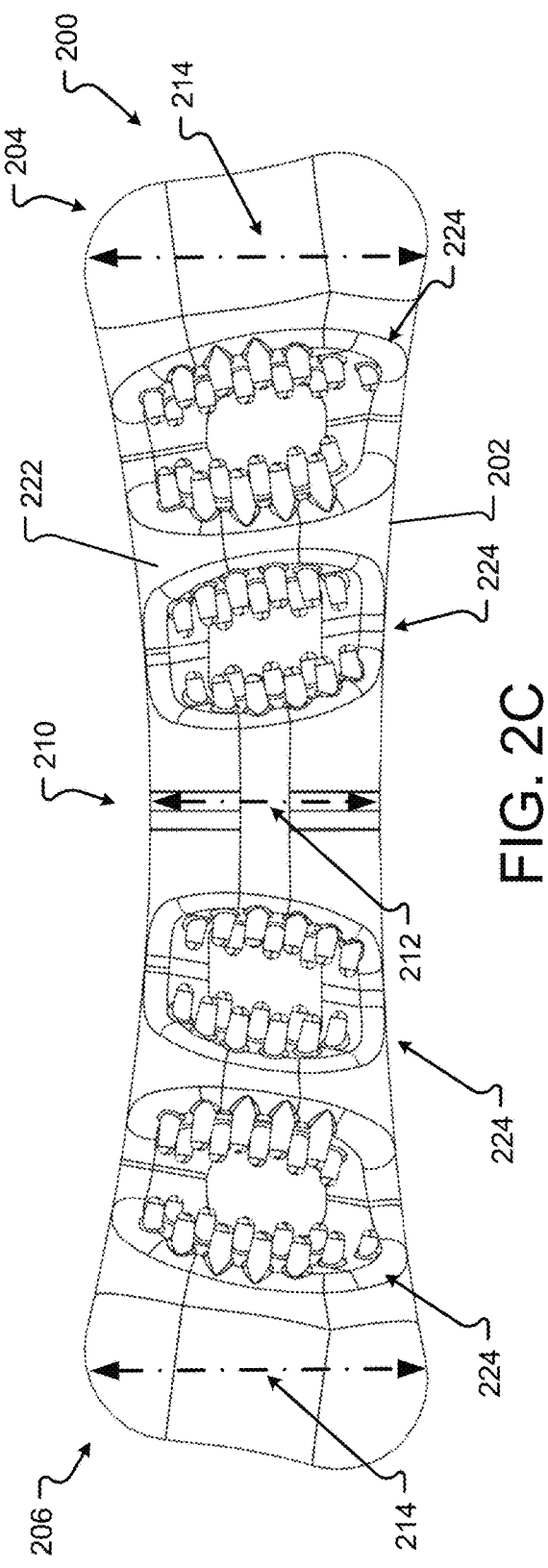
FIG. 2B
FIG. 2C

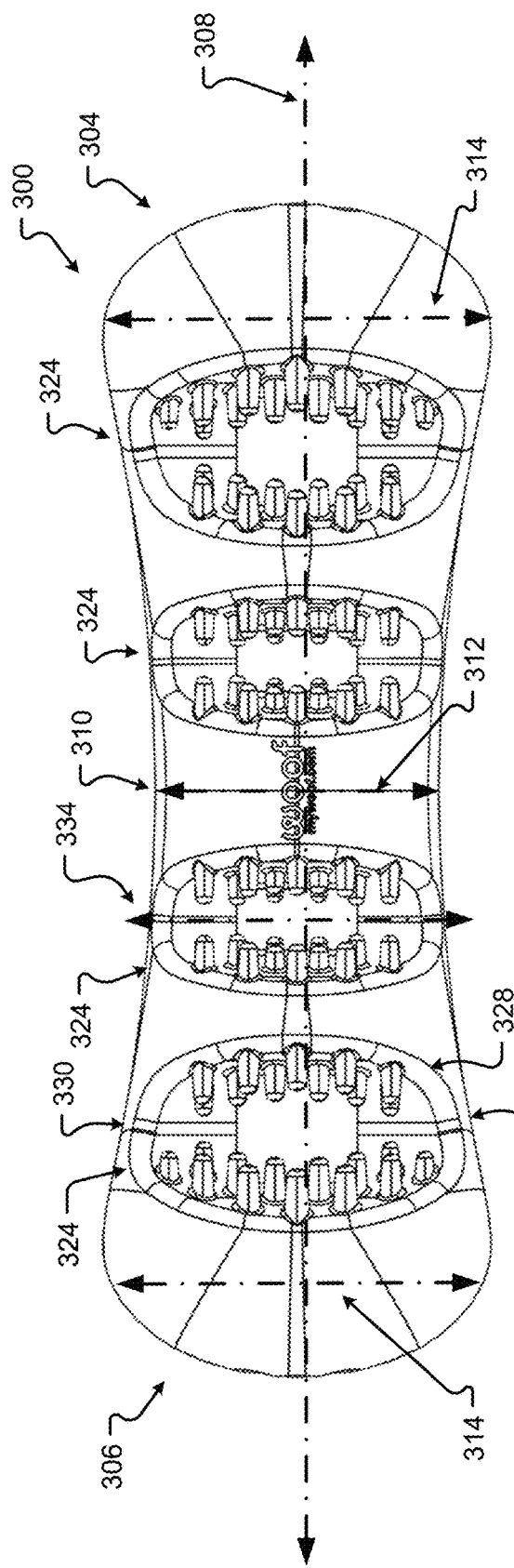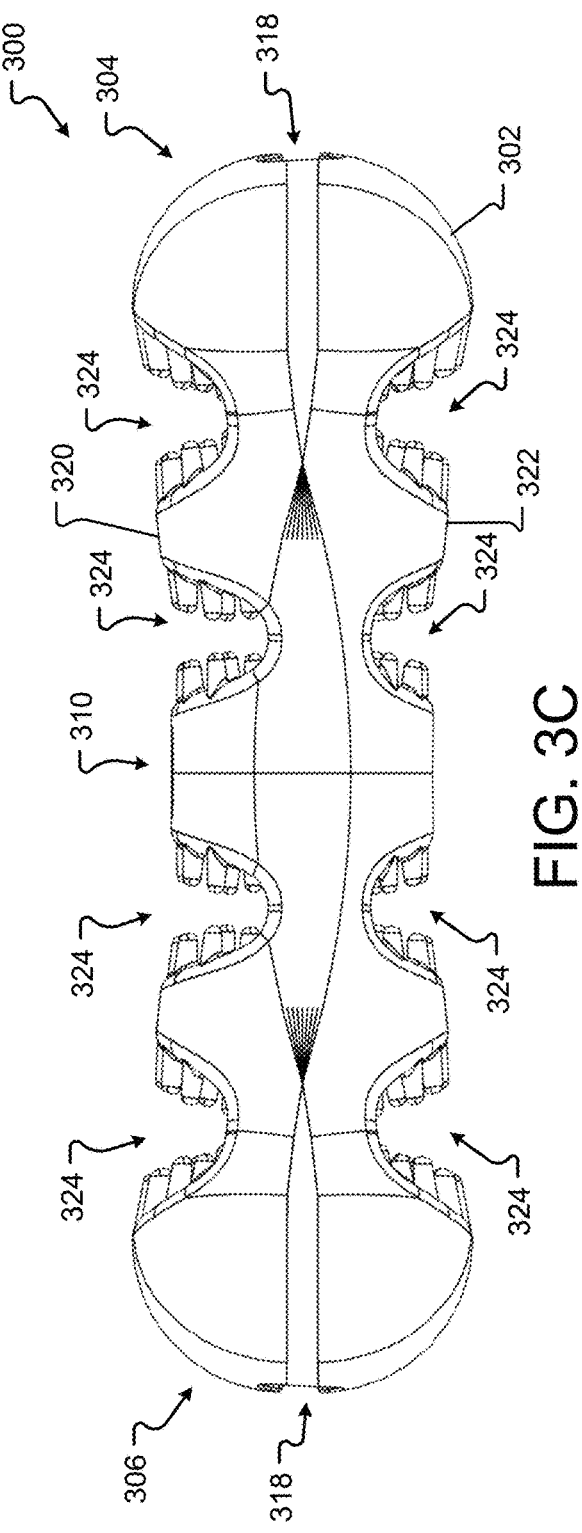
FIG. 3B
FIG. 3C

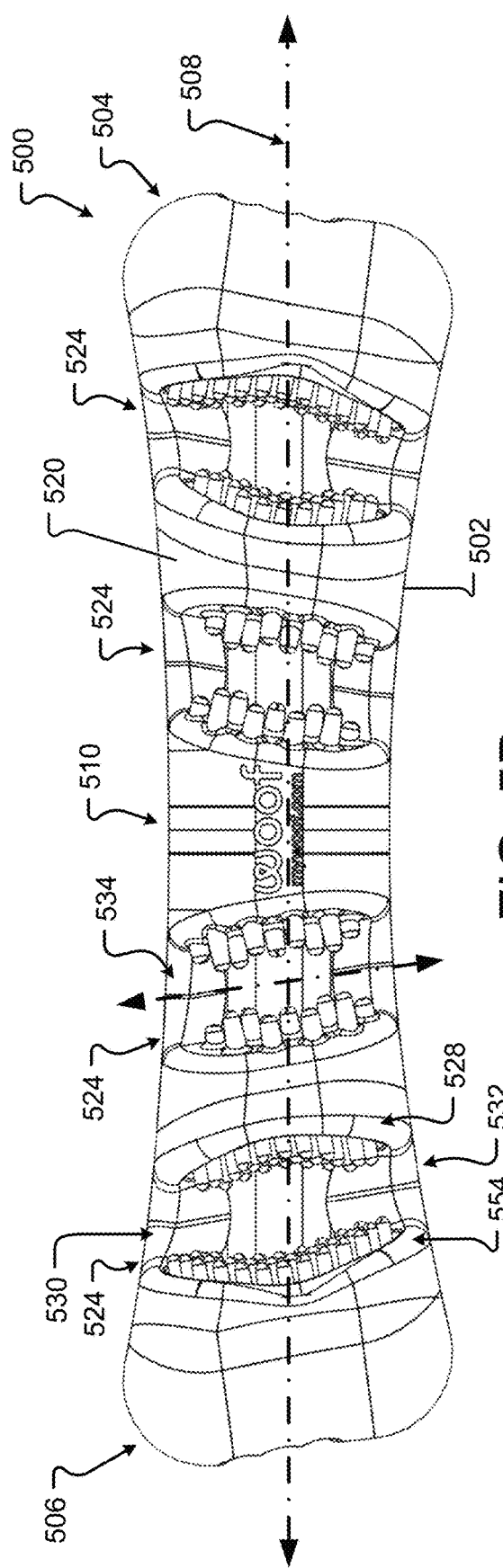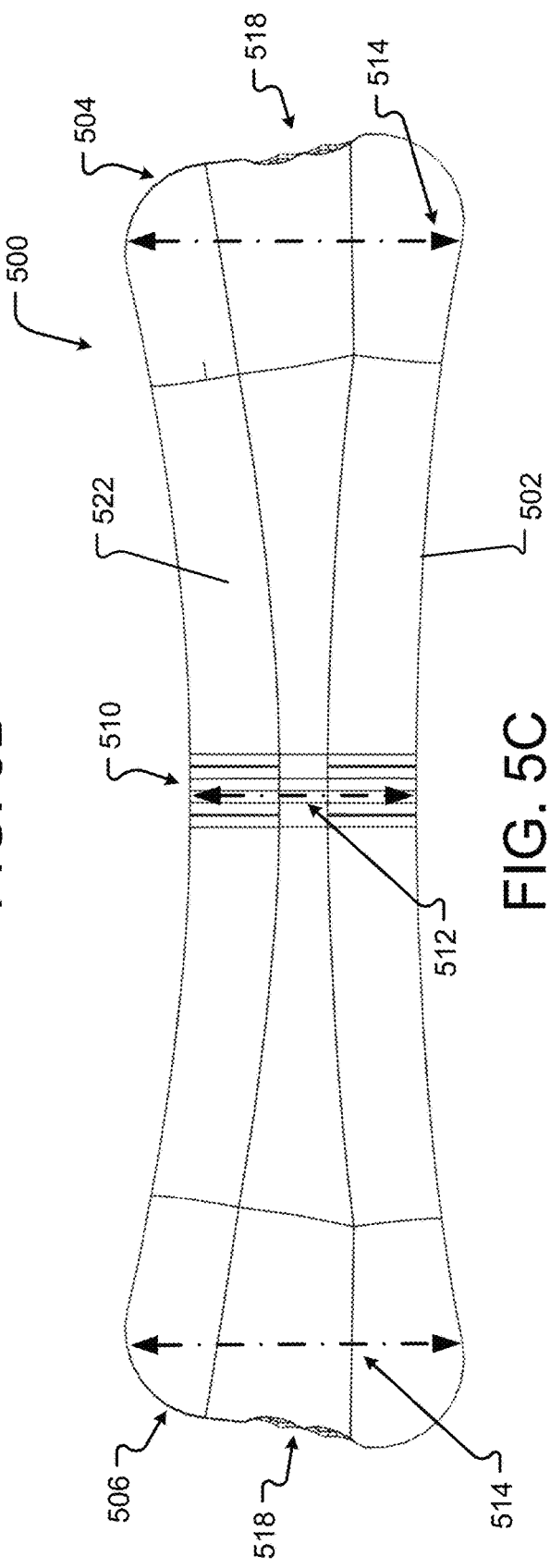
FIG. 5B
FIG. 5C

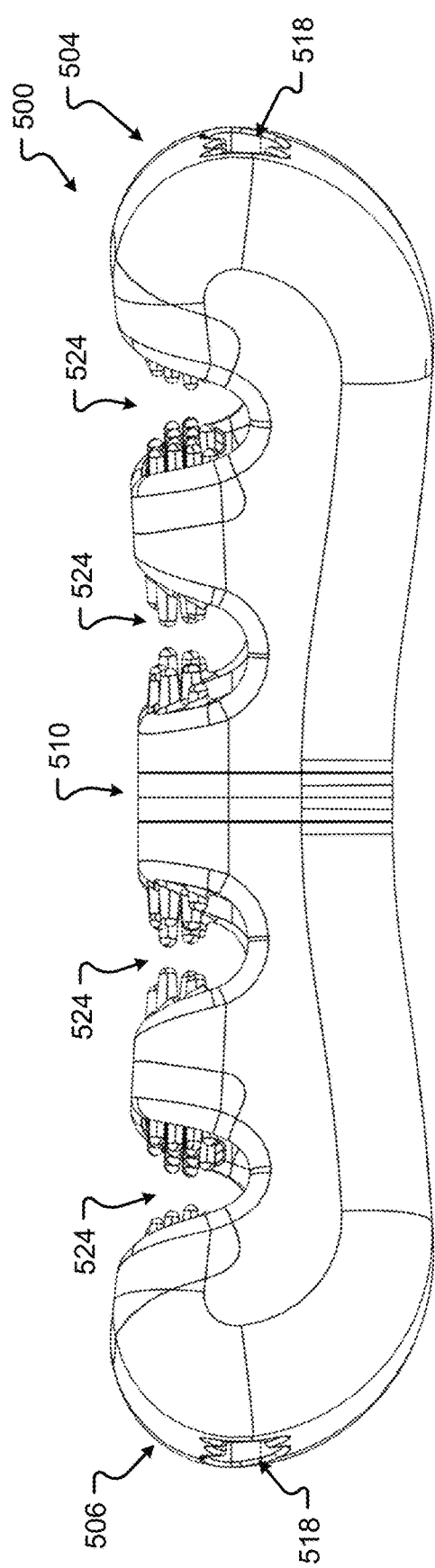
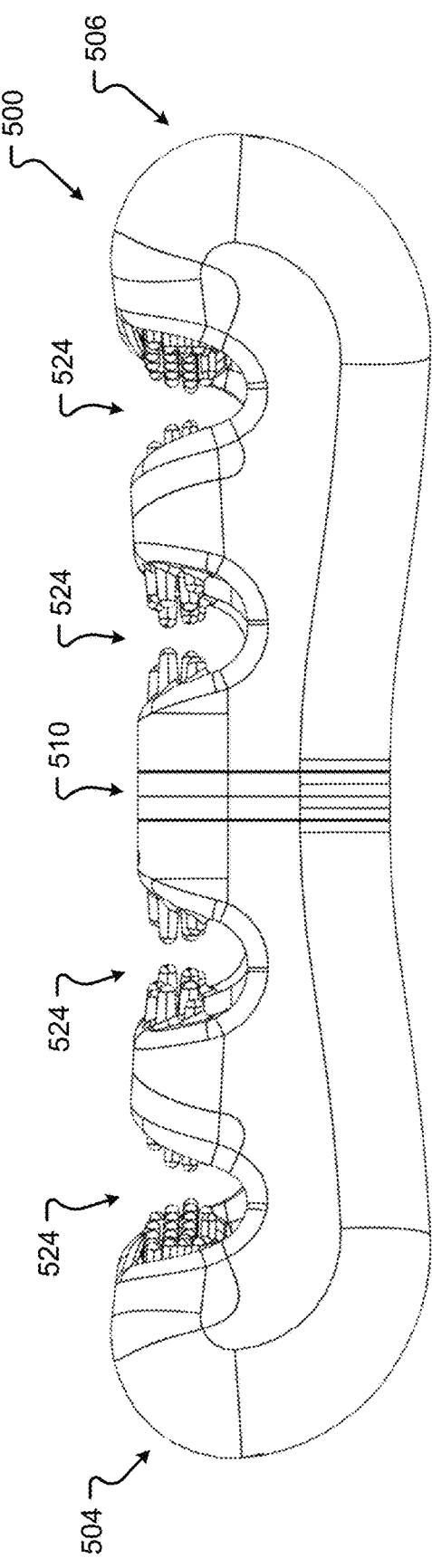
FIG. 5D
FIG. 5E

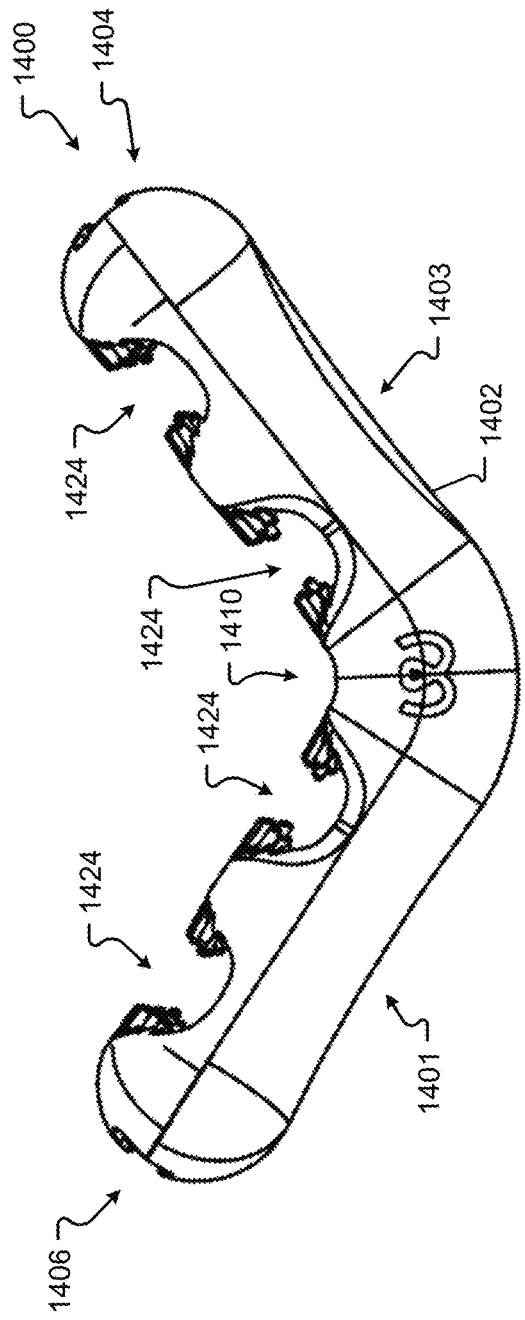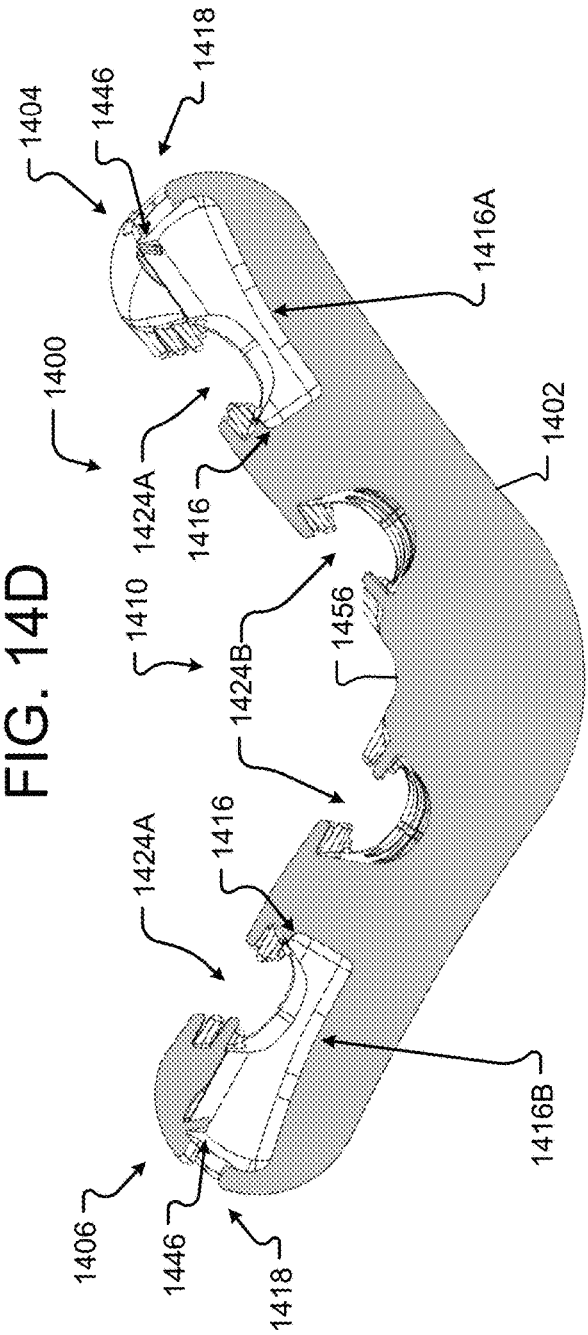

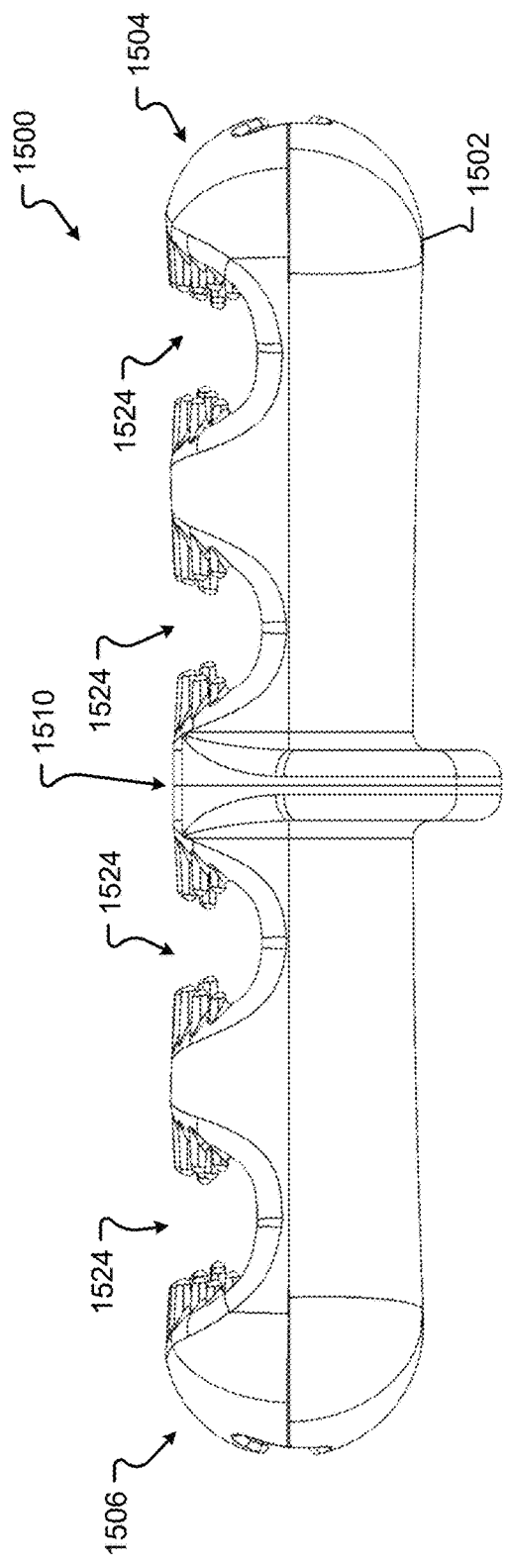
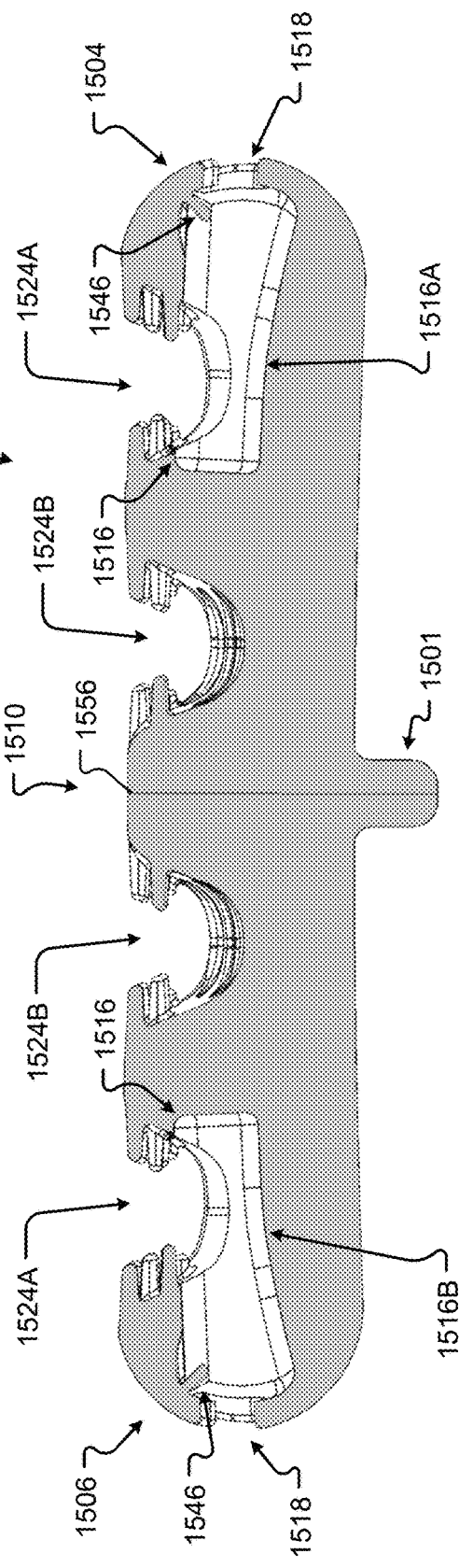
FIG. 15C
FIG. 15D

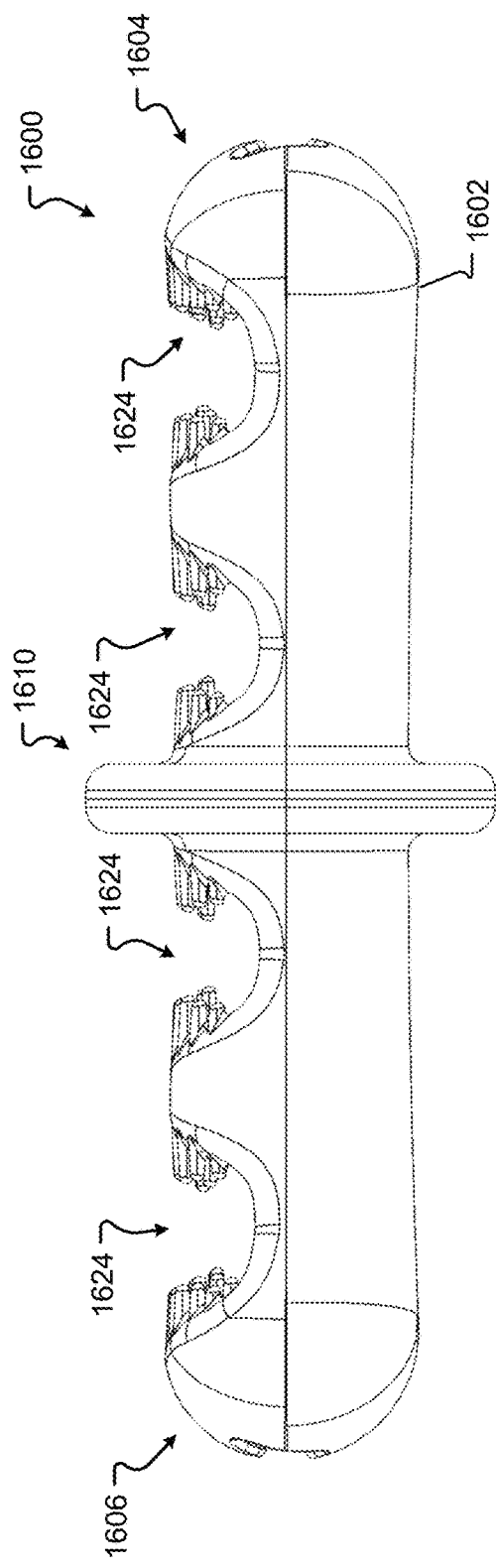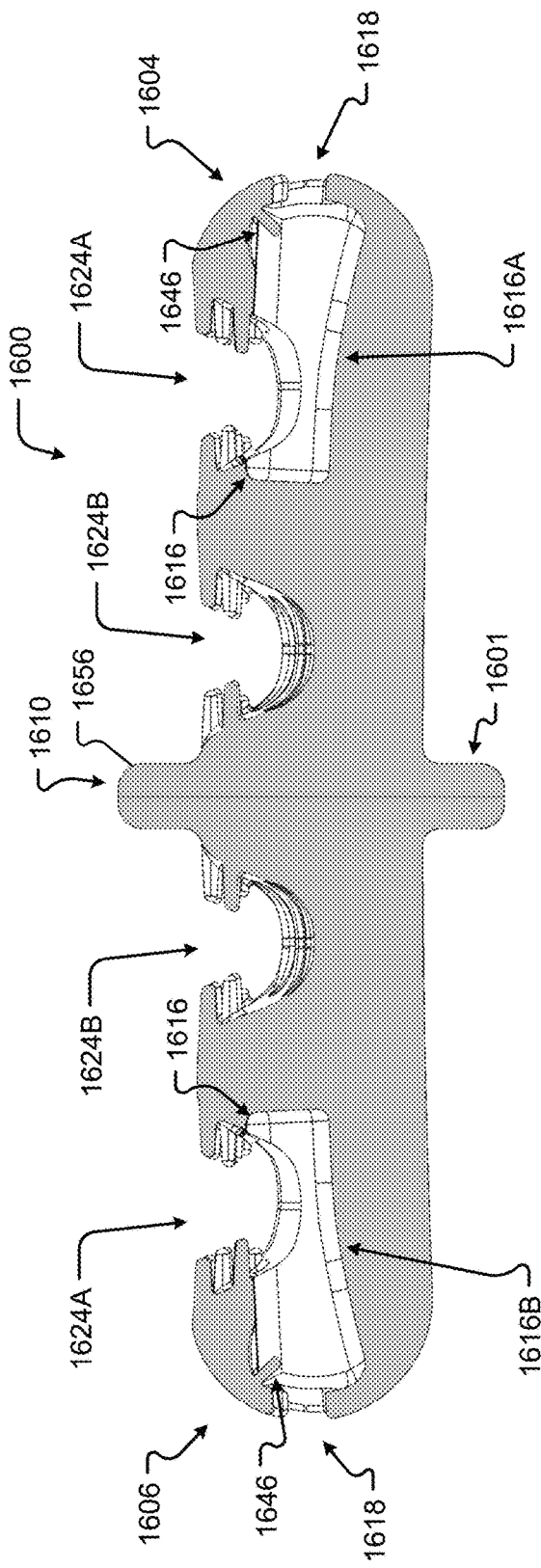

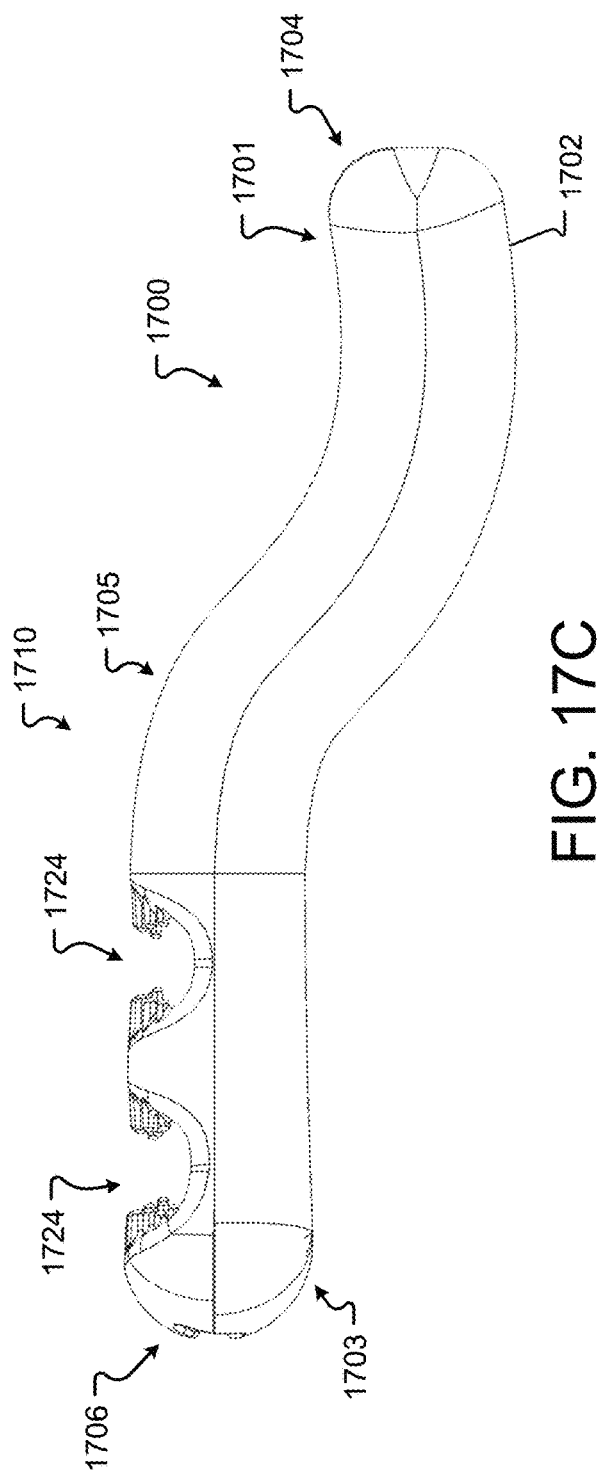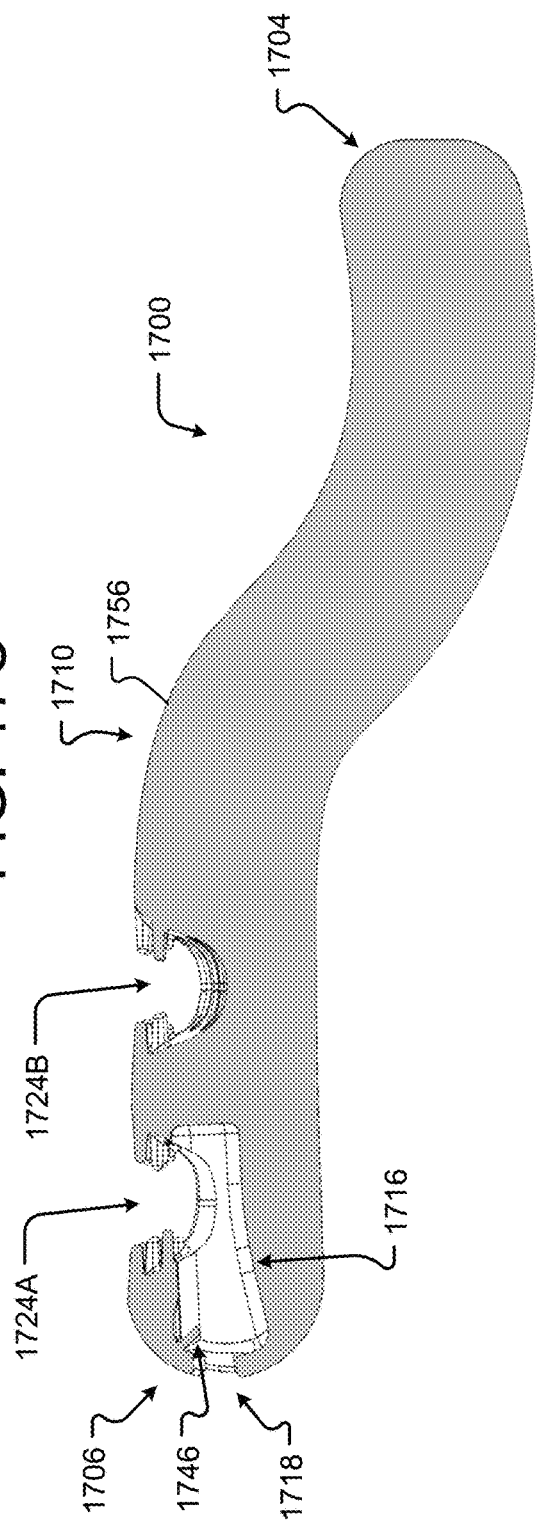
FIG. 17C
FIG. 17D

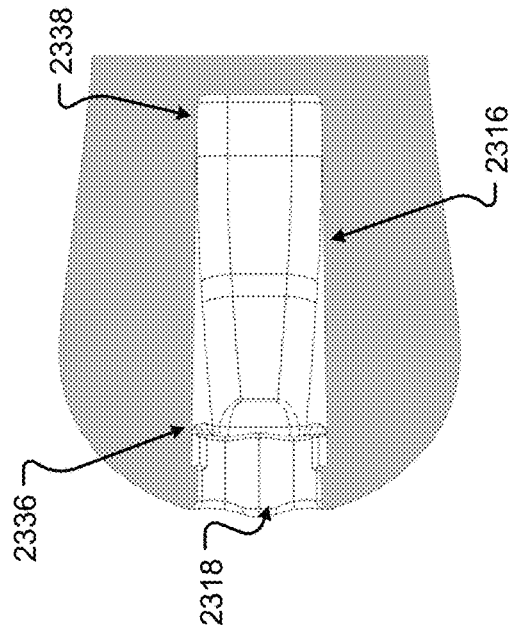
FIG. 23B
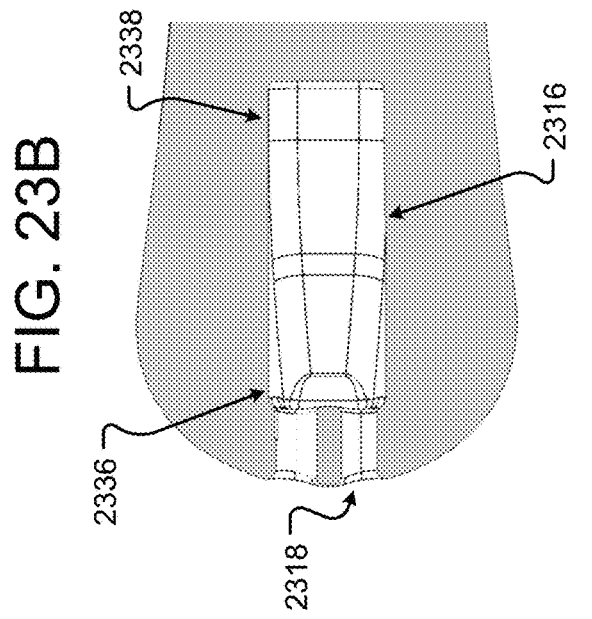
FIG. 23D
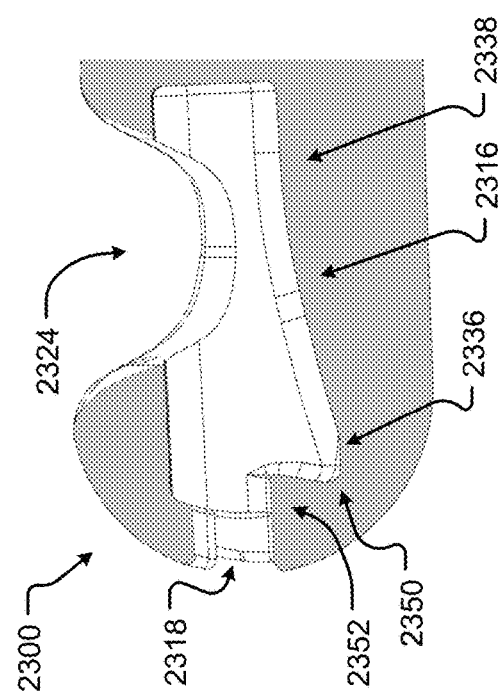
FIG. 23A
FIG. 23C

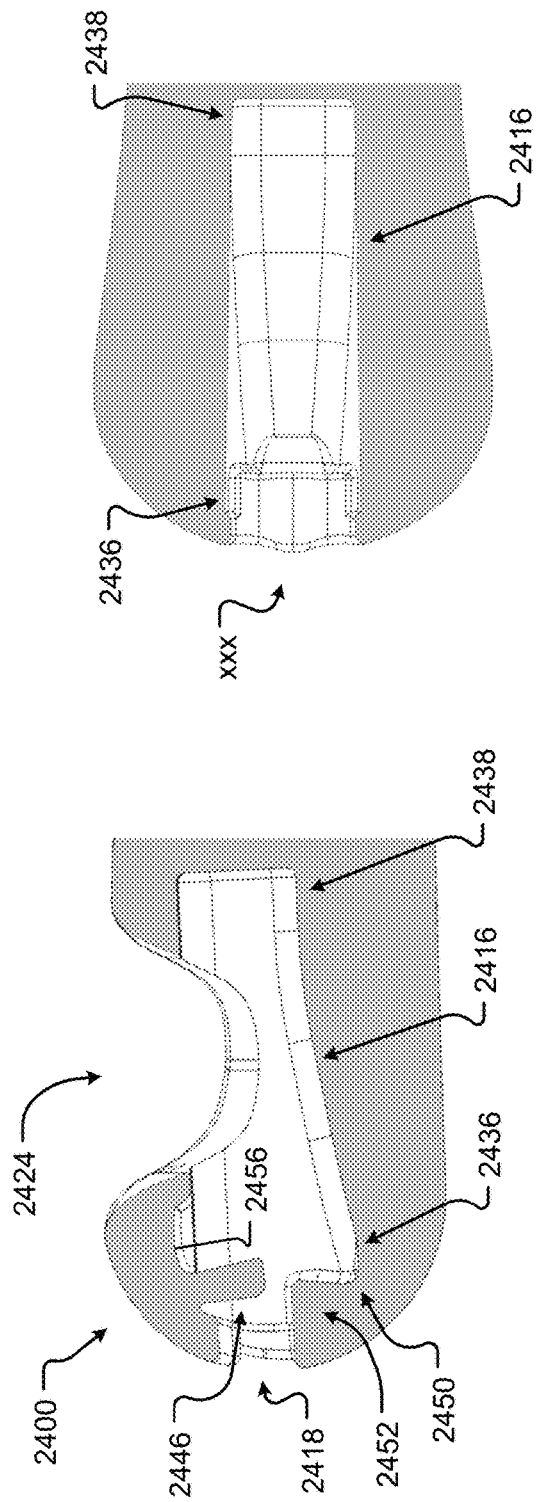
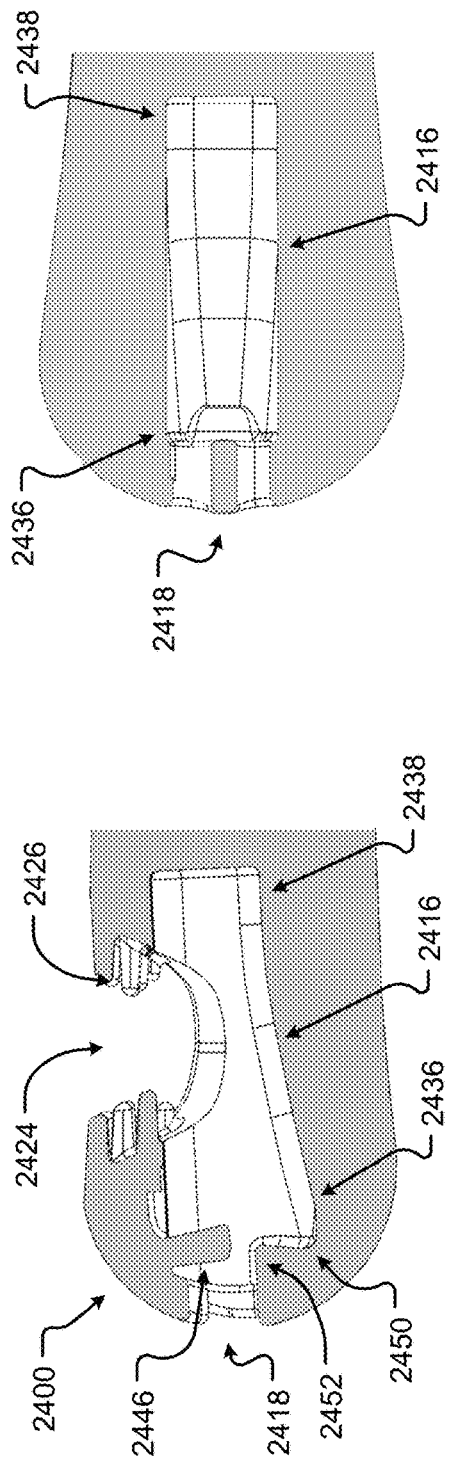
FIG. 24A
FIG. 24B
FIG. 24C
FIG. 24D

PET DENTAL DEVICES AND SYSTEMS

CROSS REFERENCE TO RELATED APPLICATIONS

This application claims the benefit of U.S. Provisional Application No. 63/538,113 filed on Sep. 13, 2023, which application is incorporated herein by reference in its entirety.

FIELD

The present disclosure generally relates to pet devices, and relates more particularly to pet dental devices.

BACKGROUND

Domestic animal (referred to generally herein as a pet) ownership has significantly increased over the past several years. Such pets are capable of providing emotional fulfillment and support for their caretakers. Like their caretakers, pets greatly benefit from maintaining healthy dental or oral hygiene to prevent pain and/or diseases such as periodontal diseases to the pet. Conventionally, caretakers are encouraged to brush their pets' teeth, provide dental chews, and/or have a vet perform a dental cleaning. However, such conventional devices or methods are either inconvenient (teeth brushing), consumable and thus, not reusable (dental chews), and/or costly or potentially harmful to the pet (dental cleaning under anesthesia). Thus, it remains difficult and/or expensive to maintain a pet's dental or oral hygiene, and as a result many animals go without the dental treatment they need.

Hence, those who care for pets continue to desire devices for maintaining healthy dental or oral hygiene for their pet(s).

SUMMARY

The techniques of this disclosure generally relate to pet devices such as such as, for example, pet dental devices.

A pet dental device according to at least one embodiment of the present disclosure comprises at least one body extending from a first end to a second end; at least one cavity extending into the body, the at least one cavity configured to receive a pet treat; at least one cutout extending into the body and intersecting the at least one cavity to expose a pet treat disposed in the at least one cavity; and at least one set of dental cleaning mechanism positioned on at least a portion of a perimeter of the at least one cutout.

Any of the aspects herein, wherein the dental cleaning mechanism comprises bristles and the bristles are at least one of parallel to or at an angle relative to the center axis.

Any of the aspects herein, wherein the at least one cutout extends from a first cutout end along a cutout axis to a second cutout end, wherein the cutout axis is perpendicular to the center axis.

Any of the aspects herein, wherein the at least one cutout extends from a first cutout end along a cutout axis to a second cutout end, wherein the cutout axis is at an angle relative to the center axis.

Any of the aspects herein, wherein the at least one cavity extends from a first cavity end at the first end or the second end along a cavity axis to a second cavity end near the center portion.

Any of the aspects herein, wherein the cavity axis is at an angle relative to the center axis.

Any of the aspects herein, wherein the cavity axis is angled towards the first surface from the at least one of the first end or the second end to the center portion.

Any of the aspects herein, wherein the at least one cavity opens to the at least one first end or the second end.

Any of the aspects herein, wherein the at least one cavity does not reach a center point of the center portion.

Any of the aspects herein, wherein the at least one cavity comprises a pair of cavities, a first cavity of the pair of cavities extending from the first end to the center portion and a second cavity of the pair of cavities extending from the second end to the center portion, wherein the first cavity and the second cavity do not intersect.

A pet dental device according to at least one embodiment of the present disclosure comprises a body extending from a first end to a second end along a center axis, the body having a center portion between the first end and the second end, the body having a first surface opposite a second surface and each extending from the first end to the second end, at least one cavity extending from at least one of the first end or the second end towards the center portion and through the body, the at least one cavity extending from a first cavity end to a second cavity end along a cavity axis, the at least one cavity configured to receive a pet treat; at least one cutout extending from at least one of the first surface or the second surface through the body and to the at least one cavity; and at least one set of dental cleaning mechanism positioned on at least a portion of a perimeter of the at least one cutout, wherein the cavity axis is at an angle relative to the center axis.

Any of the aspects herein, wherein the dental cleaning mechanism comprises bristles and the bristles are at least one of parallel to or at an angle relative to the center axis.

Any of the aspects herein, wherein the at least one cutout extends from a first cutout end along a cutout axis to a second cutout end, wherein the cutout axis is perpendicular to the center axis.

Any of the aspects herein, wherein the at least one cutout extends from a first cutout end along a cutout axis to a second cutout end, wherein the cutout axis is at an angle relative to the center axis.

Any of the aspects herein, wherein the at least one cutout comprises four cutouts on the first surface and two cutouts on the second surface.

Any of the aspects herein, wherein the cavity axis is angled towards the first surface from the at least one of the first end or the second end to the center portion.

Any of the aspects herein, wherein the at least one cavity opens to the at least one first end or the second end.

A dental pet system according to at least one embodiment of the present disclosure comprises a pet dental device comprising: a body extending from a first end to a second end along a center axis, the body having a center portion between the first end and the second end, the body having a first surface opposite a second surface and each extending from the first end to the second end, wherein the center portion has a diameter less than a diameter of each of the first end and the second end; at least one cavity extending from at least one of the first end or the second end towards the center portion and through the body, the at least one cavity having an opening with a first cross-section that opens into the at least one of the first end or the second end; at least one cutout extending from at least one of the first surface or the second surface through the body and to the at least one cavity; and at least one set of dental cleaning mechanism positioned on at least a portion of a perimeter of the at least one cutout; and a pet treat having a second cross-section that has a shape that is the same shape as the first cross-section, the second cross-section sized substantially equal to or less than the first cross-section, wherein the pet treat is at least partially exposed to a pet via the at least one cutout.

Any of the aspects herein, wherein the at least one cavity has a length extending from a first cavity end at the first end or the second end along a cavity axis to a second cavity end near the center portion.

Any of the aspects herein, wherein a portion of the at least one cavity near the first cavity end is sized smaller than a remaining portion of the at least one cavity such that the pet treat is retained in the cavity.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present disclosure will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1B is a top view of the pet dental device of FIG. 1A according to at least one embodiment of the present disclosure;

FIG. 1C is a bottom view of the pet dental device of FIG. 1A according to at least one embodiment of the present disclosure;

FIG. 1F is a side view of the pet dental device of FIG. 1A according to at least one embodiment of the present disclosure;

FIG. 1G is a side cross-sectional view of the pet dental device of FIG. 1A taken along line A-A shown in FIG. 1E according to at least one embodiment of the present disclosure;

FIG. 2B is a top view of the pet dental device of FIG. 2A according to at least one embodiment of the present disclosure;

FIG. 2C is a bottom view of the pet dental device of FIG. 2A according to at least one embodiment of the present disclosure;

FIG. 3B is a top view of the pet dental device of FIG. 3A according to at least one embodiment of the present disclosure;

FIG. 3C is a side view of the pet dental device of FIG. 3A according to at least one embodiment of the present disclosure;

FIG. 5B is a top view of the pet dental device of FIG. 5A according to at least one embodiment of the present disclosure;

FIG. 5C is a bottom view of the pet dental device of FIG. 5A according to at least one embodiment of the present disclosure;

FIG. 5D is a side view of the pet dental device of FIG. 5A according to at least one embodiment of the present disclosure;

FIG. 5E is a side view of the pet dental device of FIG. 5A according to at least one embodiment of the present disclosure;

FIG. 14D is a side view of the pet dental device of FIG. 14A according to at least one embodiment of the present disclosure;

FIG. 14E is a side cross-sectional view of the pet dental device of FIG. 14A taken along line F-F shown in FIG. 14C according to at least one embodiment of the present disclosure;

FIG. 15C is a side view of the pet dental device of FIG. 15A according to at least one embodiment of the present disclosure;

FIG. 15D is a side cross-sectional view of the pet dental device of FIG. 15A taken along line G-G shown in FIG. 15B according to at least one embodiment of the present disclosure;

FIG. 16C is a side view of the pet dental device of FIG. 16A according to at least one embodiment of the present disclosure;

FIG. 16D is a side cross-sectional view of the pet dental device of FIG. 16A taken along line H-H shown in FIG. 16B according to at least one embodiment of the present disclosure;

FIG. 17C is a side view of the pet dental device of FIG. 17A according to at least one embodiment of the present disclosure;

FIG. 17D is a side cross-sectional view of the pet dental device of FIG. 17A taken along line I-I shown in FIG. 17B according to at least one embodiment of the present disclosure;

FIG. 23A is a side cross-sectional view of an end of a pet dental device highlighting a cavity of the pet dental device according to at least one embodiment of the present disclosure;

FIG. 23B is a top cross-sectional view of the pet dental device of FIG. 23A according to at least one embodiment of the present disclosure;

FIG. 23C is a side cross-sectional view of the pet dental device of FIG. 23A with bristles according to at least one embodiment of the present disclosure;

FIG. 23D is a top cross-sectional view of the pet dental device of FIG. 23C according to at least one embodiment of the present disclosure;

FIG. 24A is a side cross-sectional view of an end of a pet dental device highlighting a cavity of the pet dental device according to at least one embodiment of the present disclosure;

FIG. 24B is a top cross-sectional view of the pet dental device of FIG. 24A according to at least one embodiment of the present disclosure;

FIG. 24C is a side cross-sectional view of the pet dental device of FIG. 24A with bristles according to at least one embodiment of the present disclosure;

FIG. 24D is a top cross-sectional view of the pet dental device of FIG. 24C according to at least one embodiment of the present disclosure;

DETAILED DESCRIPTION

Figure 1A:
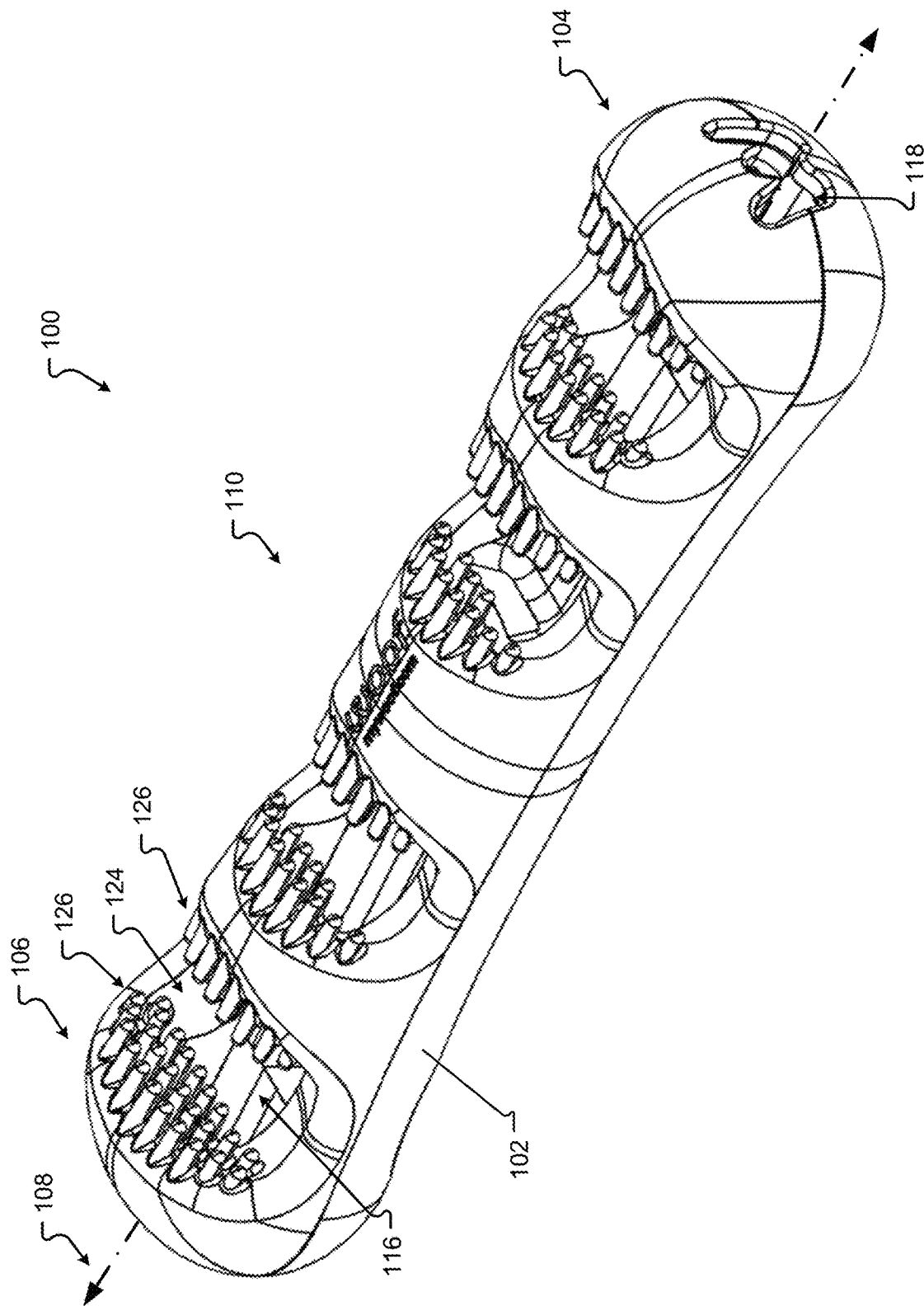
FIG. 1A is a perspective view of a pet dental device according to at least one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

A number of variations and modifications of the foregoing disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving case and/or reducing cost of implementation.

Turning to FIGS. 1A-1G, a pet dental device 100 (dental device) according to at least one embodiment of the present disclosure is provided. Generally, a pet treat (such as a pet treat 2800 or 2900, shown in FIGS. 28A, 28B, 29A, 29B) can be inserted into the dental device 100 and is partially exposed to a pet at specific access points to encourage the pet to chew the dental device 100 in a way that cleans their teeth. As the pet chews the treat held by the dental device 100, the pet's teeth rub or brush against one or more dental cleaning mechanisms (e.g., bristles), thereby cleaning the pet's teeth. Importantly, the treat may be developed in a way such that it encourages this brushing action, while also being sufficiently accessible to maintain a pet's interest. It may also be designed to with sufficient exposure to break apart quickly enough to prevent overbrushing. Once consumed, the treat can be replaced with a new treat for a later brushing session. Thus, the dental device 100 provides multiple benefits such as reusability, case of use, and enables a pet to self-clean its teeth in an enjoyable manner In FIG. 1A, the dental device 100 is shown in a perspective view. The dental device 100 includes a body 102 extending from a first end 104 to a second end 106 along a center axis 108. The body 102 has a center portion 110 between the first end 104 and the second end 106. A diameter or cross-sectional dimension 112 (e.g., a diameter, a width, a surface area, a height, etc.) of the center portion 110 is less than a diameter or cross-sectional dimension 114 of the first end 104 and the second end 106 (shown in FIG. 1C). This difference in dimension from end to center provides for different case of treat access and durability along the length of the dental device. For instance, the first end 104 may have a cross-sectional dimension for improved durability and resilience, as a pet is likely to chew more aggressively on the end. By contrast, the center portion 110 is often chewed less by pets, and thus may have a narrower diameter with a wider access cutout 124 (discussed in more detail below) for greater treat exposure. This greater exposure would motivate chewing in the middle of the device, which is important as it encourages a pet to use different teeth and parts of their mouth in the chewing action. For instance, a pet is more likely to use their rear teeth when chewing the ends of the device, and their smaller, front-most teeth when chewing the center portion 110 of the device. It will be appreciated that in other embodiments, the cross-sectional dimension 112 of the center portion 110 can be equal to or greater than the cross-sectional dimension 114 of the first end 104 and/or the second end 106.

The dental device 100 includes at least one cavity 116 extending from the first end 104 or the second end 106 towards the center portion 110 and through the body 102. In an embodiment, said cavity 116 may extend fully through the toy from the first end 104 to the second end 106. Alternatively, features may exist to prevent the cavity 116 from extending to or beyond the midpoint of the device. The at least one cavity 116 is configured to receive a pet treat (such as the pet treat 2800 or 2900, shown in FIGS. 28A, 28B, 29A, 29B) through an opening 118 into the first end 104 and/or the second end 106. The dental device 100 also includes at least one cutout 124 extending from a first surface 120 and/or a second surface 122 of the body 102 into the cavity 116 so as to provide access to at least a portion of a pet treat disposed in the corresponding cavity 116. The dental device 100 further includes at least one set of dental cleaning mechanisms 126 positioned on at least a portion of a perimeter 128 of the at least one cutout 124. The dental cleaning mechanism 126 may include, for example, bristles, nubs, brushes, or any combination thereof. It will be appreciated that a configuration of bristles, nubs, brushes, or combinations thereof on the different cutouts 124 may differ. For instance, the center cutout 124 may have fewer but larger bristles and the outermost cutout may have bristles that are finer (or vice versa). In embodiments where the dental cleaning mechanism 126 comprises bristles or nubs, the bristles or nubs can be formed as a block or molded individually out of another material (e.g., the body 102 may be formed of a first material and each bristle or nub may be separately molded into the base using a second material different from the first material). Additionally, the dental cleaning mechanism 126 may be further configured by shape, arrangement, or material to receive additional consumable items, such as a enzymatic toothpaste, in order to further facilitate dental cleaning. During use, the dental cleaning mechanism 126 rubs against a pet's teeth when the pet chews the dental device 100. More specifically, because the pet treat is partially exposed via the cutouts 124, the pet is encouraged to chew the dental device 100 at the cutout such that the pet's teeth engage the cutout 124 and dental cleaning mechanism 126. As the pet chews the dental device 100 at the cutout, the dental cleaning mechanism 126 engages or rubs against the pet's teeth, thereby rubbing or removing debris on the pet's teeth. The pet treat is formulated so as to break apart when the pet chews the pet treat, such that the pet is rewarded for chewing and is encouraged to continue chewing the dental device 100.

Figure 1D:
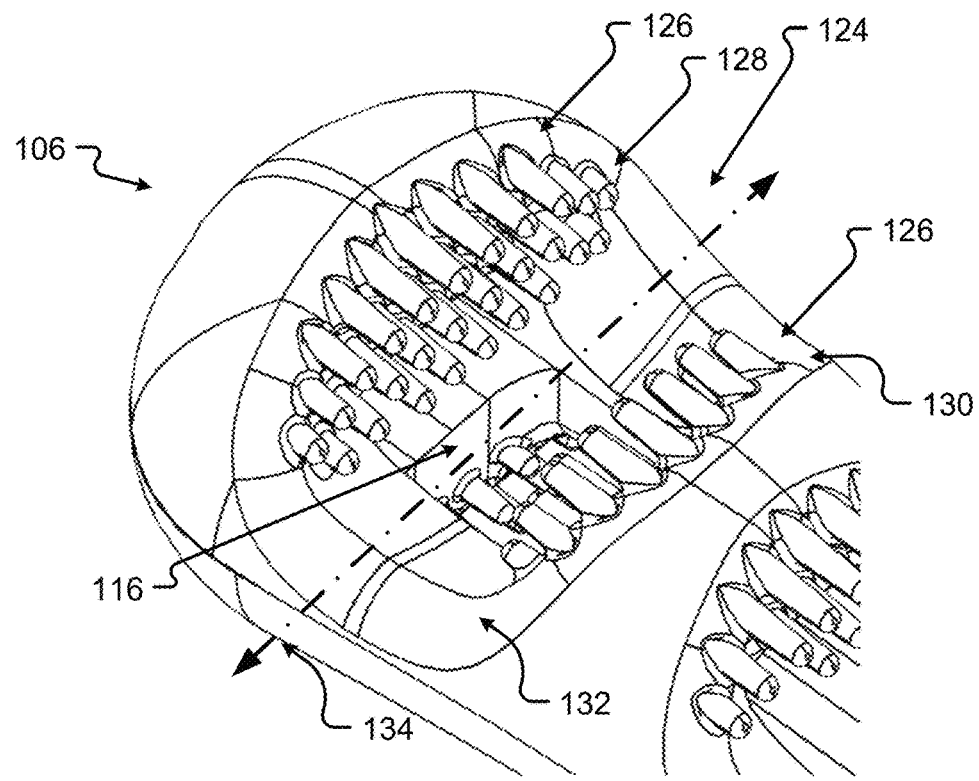
FIG. 1D is a detailed perspective view of the pet dental device of FIG. 1A at 1-1 according to at least one embodiment of the present disclosure.

Turning to FIGS. 1B-1D, a top view of the dental device 100, a bottom view of the dental device 100, and a detailed perspective view of the dental device 100 at the second end 106 are respectively shown. When viewed from the top or the bottom, the dental device 100 is in the shape of a bone, though it will be appreciated that the dental device 100 may be any shape or size. For example, the dental device 100 may be sized for any sized pet and may include sizes such as, for example, extra small, small, medium, large, or extra large.

As shown, the at least one cutout 124 extends from a first cutout end 130 to a second cutout end 132 along a cutout axis 134. In the illustrated embodiment, the cutout axis 134 is perpendicular to the center axis 108 of the dental device 100. However, it will be appreciated that the cutout axis 134 may be at any angle relative to the center axis 108. Such an angle may provide additional benefit in motivating chewing action of a particular nature, for instance encouraging a pet to chew using one side of their mouth or the other. As illustrated, the cutout 124 has an oblong, oval, or rectangular shape, though it will be appreciated that the cutout 124 may have any shape. Further, in embodiments where the dental cleaning mechanism 126 are bristles, the bristles are parallel to the center axis 108. In other instances, the bristles (or any dental cleaning mechanism 126) may be at any angle relative to the center axis 108 or some mechanisms of the dental cleaning mechanisms 126 may be parallel to the center axis 108 and other mechanisms of the dental cleaning mechanism 126 may be at any angle relative to the center axis 108. The dental cleaning mechanism 126 may also include a reservoir for distributing cleaning products such as, for example, enzymes or toothpaste. It will also be appreciated that cleaning products can be directly distributed on the dental cleaning mechanism 126. For example, in embodiments where the dental cleaning mechanism is a set of bristles, toothpaste may be directly applied to the bristles. Furthermore, wherein the dental cleaning mechanism 126 are bristles, said bristles may be uniform or may vary such as in length, shape, thickness, etc.

As also illustrated, the dental device 100 includes four cutouts 124 on the first surface 120 and two cutouts 124 on the second surface 122. Such configuration may encourage a pet to chew the dental device 100 at different angles and/or orientations and to engage both their upper teeth and lower teeth either separately or at the same time. In other instances, the dental device 100 may have any number of cutouts 124 on the first surface 120 and/or the second surface 122. In some embodiments, the cutout 124 may exist on both sides of the device 100 with a hole passing through them. This allows the treat to be chewed from either side, which makes it easier for dogs to crunch the treat apart, and for the resulting pieces to fall out more easily. The cutouts 124 may be positioned and sized so as to encourage a pet to chew with different parts of their mouth, thereby cleaning as many of the pet's teeth as possible. For example, cutouts 124 closer to center portion 110 encourage chewing with front molars vs cutouts 124 at the first end 104 and/or the second end 106 encourage chewing with back molars.

In some embodiments, the cutouts 124 may positioned opposite one another (i.e. on the first surface 120 and the second surface 122 and opposite each other) which allows dogs to access the treat more easily and also for treats to escape the device 100 more easily, thereby increasing engagement. Further, in some instances, the cutouts 124 on one side may provide direct access to the treat, while the cutouts 124 on the opposite but corresponding side may simply be a groove with a dental cleaning mechanism 126. The groove with the dental cleaning mechanism 126 may be formed such that the groove is not deep enough to reach the treat. The benefit of such embodiments is that it still provides cleaning to the top and bottom teeth of the pet, but additional material is retained on one side to increase the durability of the device.

As shown in FIG. 1G, in embodiments where the dental device 100 includes more than one cutout 124, the cutouts 124 may have different shapes and openings 121. For example, in FIG. 1G, first cutouts 124A have an opening 121A that is more shallow than an opening 121B of second cutouts 124B. The opening 121B may have more depth or space so as to accommodate looseness of a treat disposed in the cavity 116. Further the cutouts 124 may have different number of rows of bristles 126. For example, the first cutouts 124A may have more than one row of bristles 126 and the second cutouts 124B may have one row of bristles 126.

In some embodiments, the dental device 100 may include a flange or a ledge 554 (Shown in FIGS. 5A and 5B) extending from the cutout 124 so as to cover a base of the dental cleaning mechanism 126. The ledge 554 may protect a base of the dental cleaning mechanism 126, which may be more susceptible to breakage as opposed to the ends of the dental cleaning mechanism 126. Thus, the ledge 554 may also encourage the pet to chew the dental cleaning mechanism 126 towards a center of the cutout 124 or a mid portion of the dental cleaning mechanism 126.

Figure 1E:
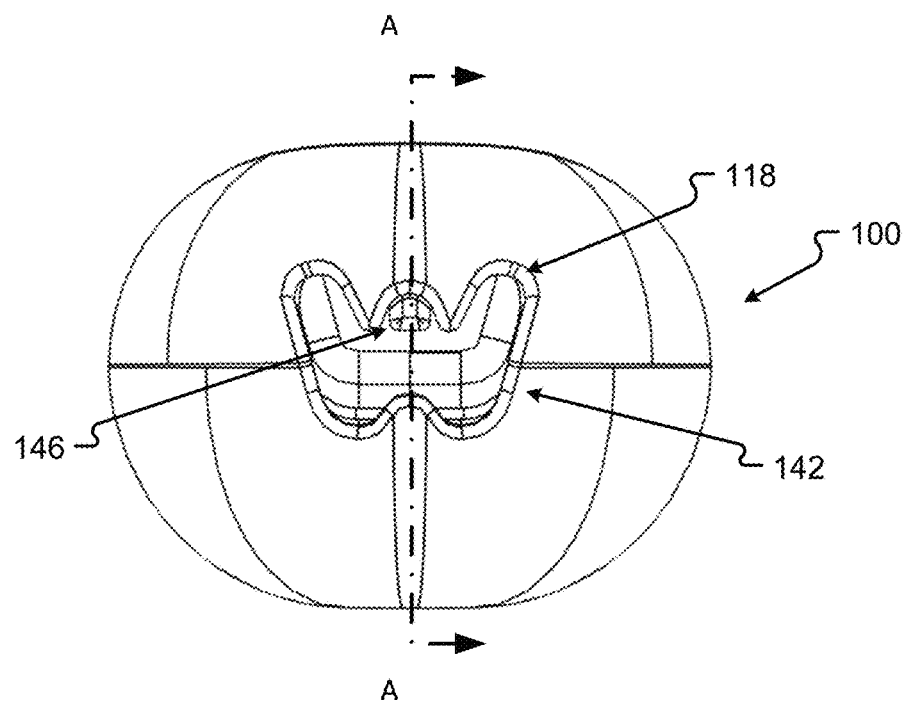
FIG. 1E is a front view of the pet dental device of FIG. 1A according to at least one embodiment of the present disclosure.

Turning to FIGS. 1E-1G, a side view of the dental device 100, a front view of the dental device 100, and a cross-sectional front view of the dental device 100 taken along line A-A shown in FIG. 1D are respectively shown. As shown, in particular in FIG. 1G, the cavity 116 extends from a first cavity end 136 at the first end 104 and/or the second end 106 along a cavity axis 148 to a second cavity end 138 near the center portion 110. In the illustrated embodiment, the cavity axis 148 is at an angle relative to the center axis 108, though it will be appreciated that the cavity axis 148 can be at any angle or parallel to the center axis 108. Such an angle may provide additional benefit by making the center-most portion of the treat more accessible to a pet, thereby encouraging chewing in that part of the dental device. The angle also keeps sufficient material at the first end 104 and/or the second end 106 for durability of the dental device 100. As previously described, the cavity 116 opens to the first end 104 and/or the second end 106 through a cavity opening 118. A pet treat 2800, 2900 can be inserted through the cavity opening 118 and into the cavity 116. As shown in FIG. 1E, the cavity opening 118 may have a first cross-section 142 having a unique shape such as, for example, the letter "W". In other embodiments, the cavity opening 118 may have any shape such as, for example, a star, a square, a rectangle, a triangle, etc. The pet treat 2800, 2900 (shown in FIGS. 28A, 28B, 29A, 29B) may have a second cross-section 2808, 2908 that is the same shape as the cavity opening 118 such that the pet treat 140 can be inserted into the cavity 116 via the cavity opening 118. The cavity opening 118 may, in some instances, act as a key for the pet treat 2800, 2900. In other words, the cavity opening 118 may be shaped so as to only allow a pet treat 2800, 2900 with the same cross-section to be inserted into the cavity 116 so it may be better held in place or retained. The pet treat 2800, 2900 may be sized to be substantially the same as or similar to the cavity opening 118 so that the pet treat 2800, 2900 can be inserted through the cavity opening 118. In other words, the second cross-section 2808, 2908 may be sized substantially equal to or less than the first cross-section 142.

Once the pet treat 2800, 2900 is positioned in the cavity 116, the pet treat 2800, 2900 may be retained by a retaining ledge 146 that extends at least partially around the perimeter of the cavity opening 118. In some instances, the retaining ledge 146 can extend around an entirety of the perimeter. The retaining ledge 146 may be semi-flexible so as to allow the pet treat 2800, 2900 to be inserted into the cavity 116 even if the pet treat 2800, 2900 is slightly larger than the retaining ledge 146. The pet treat 2800, 2900 may be sized smaller than the cavity 116 such that the pet treat 2800, 2900 is loosely held in place so that as a pet is breaking the pet treat 2800, 2900, portions of the treat have been chewed can exit the device via at least one cutout 124, while the still intact portions of the pet treat 2800, 2900 can slide into at least one cutout 124 to be chewed next. In other words, broken portions of the pet treat 2800, 2900 are enabled to exit the dental device 100 (via the cutouts 124) rather than get stuck within the dental device 100. Importantly, if this were not possible and the pet treat 2800, 2900 were to get stuck in a device, a pet may lose interest in the device and no longer wish to chew it, thereby limiting the dental cleaning effectiveness of the device. By enabling the pet treat 2800, 2900 to exit the dental device 100 more easily when broken, the pet is rewarded and encouraged to continue chewing the dental device 100 to further break and obtain more of the pet treat 2800, 2900 until the pet treat 2800, 2900 is consumed. Similarly, the cavity 116 has a cavity length 150 that may be substantially equal to or greater than a treat length 152 of the pet treat 2800, 2900. In instances where the cavity length 150 is greater than the treat length 152, the pet treat 2800, 2900 may slide or move within the cavity 116 to enable the pet treat 2800, 2900 to exit the dental device 100.

As shown and previously described, the cavity axis 148 and thus, the cavity 116, may be at an angle relative to the center axis 108. In the illustrated embodiment, the cavity axis 148 is angled towards the first surface 120 from the first end 104 and/or the second end 106 to the center portion 110. The cavity 116 may be angled so as to position a portion of the pet treat 2800, 2900 closer to the first surface 120 near the center portion 110 of the dental device 100 and near the corresponding cutouts 124. This may be beneficial as the dental device 100 may be more difficult for a pet to chew near the center portion 110 and thus, by positioning the treat 2800, 2900 in a more accessible position at the center portion 110, the pet is encouraged to chew the cutouts 124 near the center portion 110 of the dental device 100 in addition to the cutouts 124 at the first end 104 and/or the second end 106 of the dental device 100.

In the illustrated embodiment, the cavity 116 includes a pair of cavities. In such embodiments, a first cavity 116A of the pair of cavities extends from the first end 104 to the center portion 110 and a second cavity 116B of the pair of cavities extends from the second end 106 to the center portion 110. The first cavity 116A and the second cavity 116B do not intersect. Further, the first cavity 116A and the second cavity 116B do not contact or reach a center point 156 of the center portion 110. It will be appreciated that in other embodiments, the dental device 100 may include any number of cavities.

Though not shown, it will be appreciated that the cavity 116 can include an inner retainer within the cavity 116 so as to retain a first portion of the pet treat 2800, 2900 in a first cavity portion and second portion of the pet treat 2800, 2900 in a second cavity portion. In other words, the first portion of the pet treat 2800, 2900 may be accessible by a first set of cutouts 124 and the second portion of the pet treat 2800, 2900 may be accessible by a second set of cutouts 124. By retaining different portions of the pet treat 2800, 2900 in different portions of the cavity 116, the pet may be encouraged to chew each cutout 124 as opposed to chewing one cutout 124.

The pet treat 2800, 2900 may come in any flavor, shape, and/or size. The pet treat 2800, 2900 may be formulated so as to break into pieces when chewed by a pet. The pet treat 2800, 2900 may include grooves to receive cleaning products such as toothpaste or enzymes.

Turning to FIGS. 2A-2G, another embodiment of the dental device 200 according to at least one embodiment of the present disclosure is provided. Generally, the dental device 200 is the same as or similar to the dental device 100 except as will be described below.

Figure 2A:
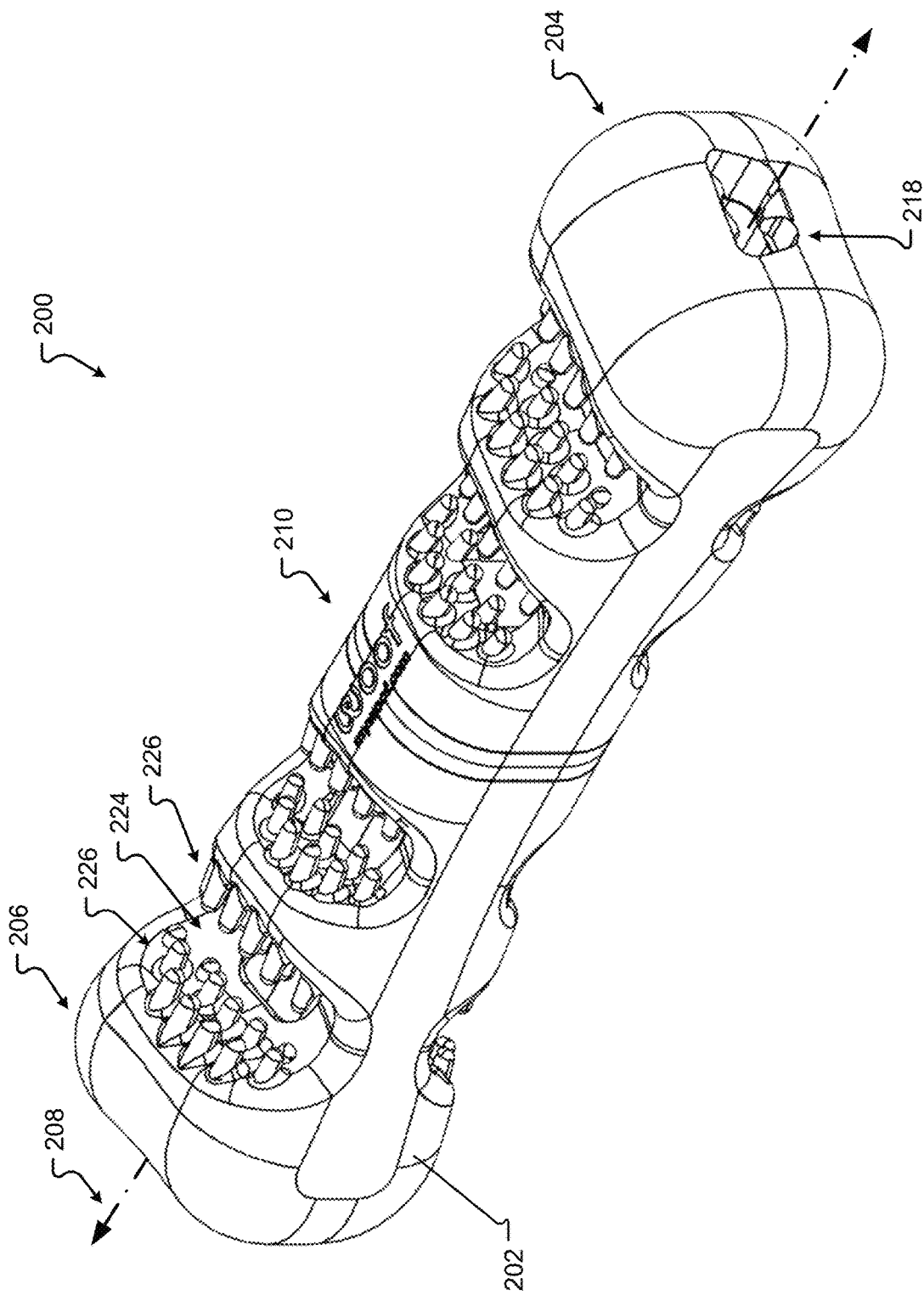
FIG. 2A is a perspective view of a pet dental device according to at least one embodiment of the present disclosure.

In FIG. 2A, the dental device 200 is shown in a perspective view. Similar to the dental device 100, the dental device 200 includes a body 202 extending from a first end 204 to a second end 206 along a center axis 208. The body 202 has a center portion 210 between the first end 204 and the second end 206. A diameter or cross-sectional dimension 212 (e.g., a diameter, a width, a surface area, a height, etc.) of the center portion 210 is less than a diameter or cross-sectional dimension 214 of the first end 204 and the second end 206 (shown in FIG. 2C). Though it will be appreciated that in other embodiments, the diameter or cross-sectional dimension 212 of the center portion 210 is greater than the diameter or cross-sectional dimension 214 of the first end 204 and/or the second end 206.

The dental device 200 includes at least one cavity 216 extending from the first end 204 or the second end 206 towards the center portion 210 and through the body 202. The at least one cavity 216 is configured to receive a pet treat through an opening 218 into the first end 204 or the second end 206. The dental device 200 also includes at least one cutout 224 extending from a first surface 220 and/or a second surface 222 of the body 202 into the cavity 216. The at least one cutout 224 provides access to at least a portion of a pet treat disposed in the corresponding cavity 216. The dental device 200 further includes at least one set of dental cleaning mechanisms 226 positioned on at least a portion of a perimeter 228 of the at least one cutout 224. The dental cleaning mechanism 226 may include, for example, bristles, nubs, brushes, or any combination thereof.

Figure 2D:
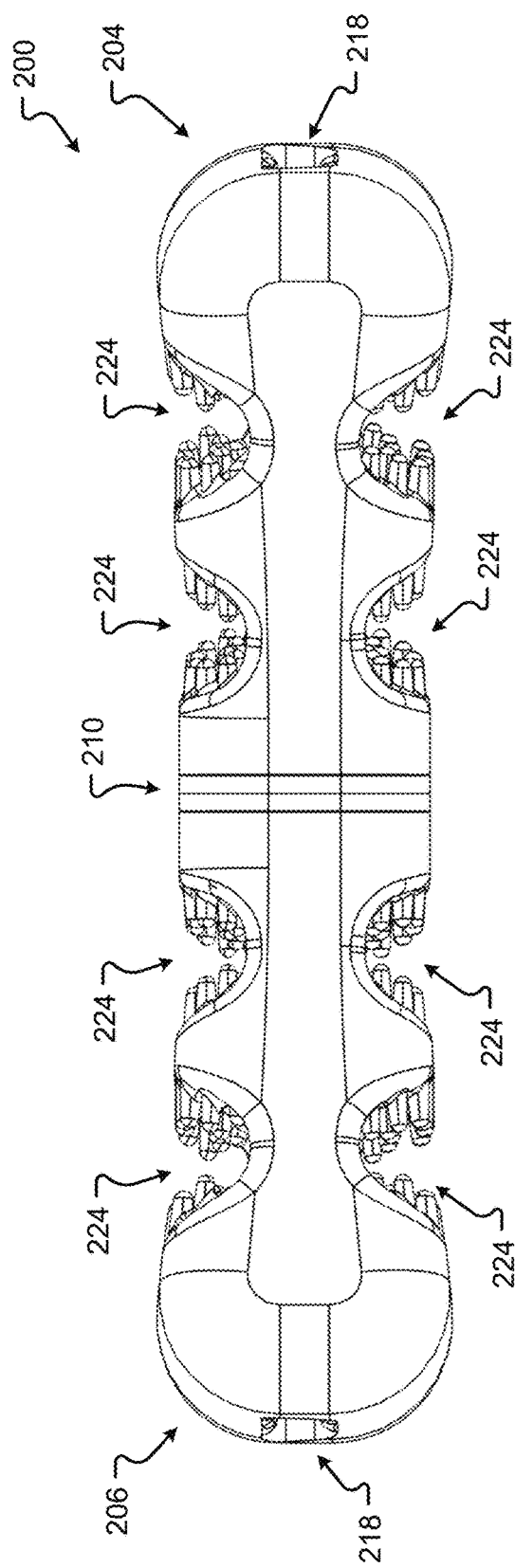
FIG. 2D is a side view of the pet dental device of FIG. 2A according to at least one embodiment of the present disclosure.
Figure 2E:
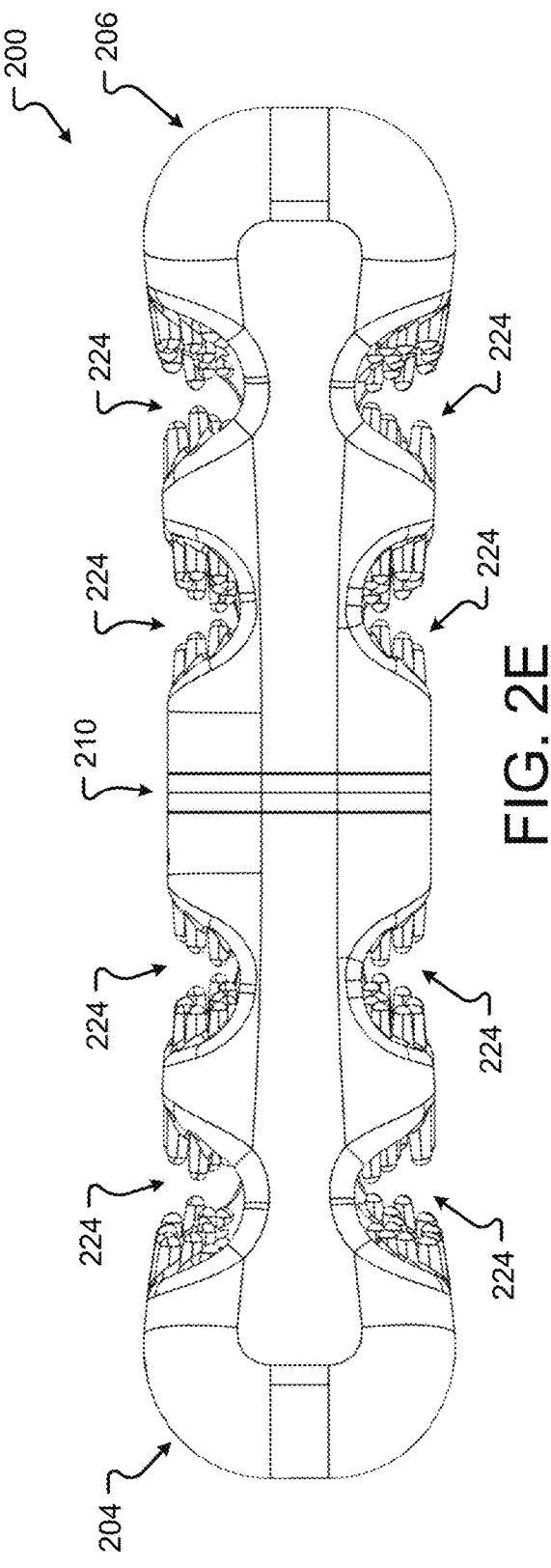
FIG. 2E is a side view of the pet dental device of FIG. 2A according to at least one embodiment of the present disclosure.

Turning to FIGS. 2B-2E a top view, a bottom view, a front view, and a rear view of the dental device 200 are respectively shown. When viewed from the top or the bottom, the dental device 200 is in the shape of a bone with the first end 204 and the second end 206 of the bone angled downward as shown in FIG. 2B. Thus, the cavity 216 is visible when viewed from the front, as shown in FIG. 2D and is not visible when viewed from the rear, as shown in FIG. 2E. It will be appreciated that the dental device 200 may be any shape or size. For example, the dental device 200 may be sized for any sized pet and may include sizes such as, for example, extra small, small, medium, large, or extra large.

As shown, the at least one cutout 224 extends from a first cutout end 230 to a second cutout end 232 along a cutout axis 234. In the illustrated embodiment, the cutout axis 234 is at an angle to the center axis 208 of the dental device 200. However, it will be appreciated that the cutout axis 234 may be at any angle, including perpendicular, relative to the center axis 208. As illustrated, the cutout 224 has an oblong, oval, or rectangular shape, though it will be appreciated that the cutout 224 may have any shape. Further, in embodiments where the dental cleaning mechanism 226 are bristles, the bristles are also at an angle to the center axis 208. In other instances, the bristles (or any dental cleaning mechanism 226) may be at any angle relative to the center axis 208 or some mechanisms of the dental cleaning mechanisms 226 may be parallel to the center axis 208 and other mechanisms of the dental cleaning mechanism 226 may be any angle relative to the center axis 208). The dental cleaning mechanism 226 may also include a reservoir for distributing cleaning products such as, for example, toothpaste. It will also be appreciated that cleaning products can be directly distributed on the dental cleaning mechanism 226. For example, in embodiments where the dental cleaning mechanism are bristles, toothpaste may be directly applied to the bristles.

As also illustrated, the dental device 200 includes four cutouts 224 on the first surface 220 and four cutouts 224 on the second surface 222. Such configuration may encourage a pet to chew the dental device 200 at different angles and/or orientations and to engage both their upper teeth and lower teeth. In other instances, the dental device 200 may have any number of cutouts 224 on the first surface 220 and/or the second surface 222. The cutouts 224 may be positioned and sized so as to encourage a pet to chew with different parts of their mouth, thereby cleaning as many of the pet's teeth as possible. For example, cutouts 224 closer to center portion 210 encourage chewing with front molars vs cutouts 224 at the first end 204 and/or the second end 206 encourage chewing with back molars.

In some embodiments, the dental device 200 may include a flange or a ledge 554 (shown in FIGS. 5A and 5B) extending from the cutout 224 so as to cover a base of the dental cleaning mechanism 226. The ledge 554 may protect a base of the dental cleaning mechanism 226, which may be more susceptible to breakage as opposed to the ends of the dental cleaning mechanism 226. Thus, the ledge 554 may also encourage the pet to chew the dental cleaning mechanism 226 towards a center of the cutout 224 or a mid portion of the dental cleaning mechanism 226.

Figure 2F:
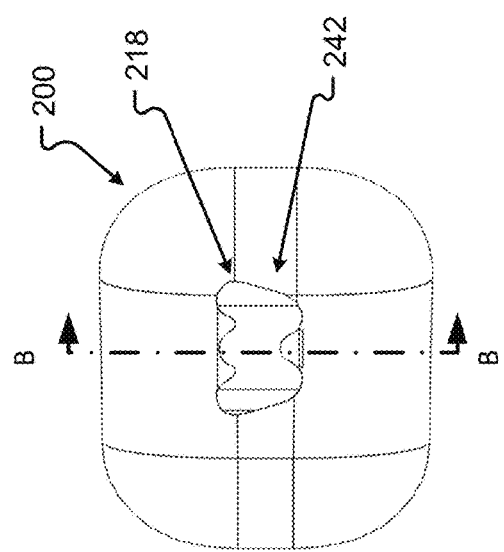
FIG. 2F is a front view of the pet dental device of FIG. 2A according to at least one embodiment of the present disclosure.
Figure 2G:
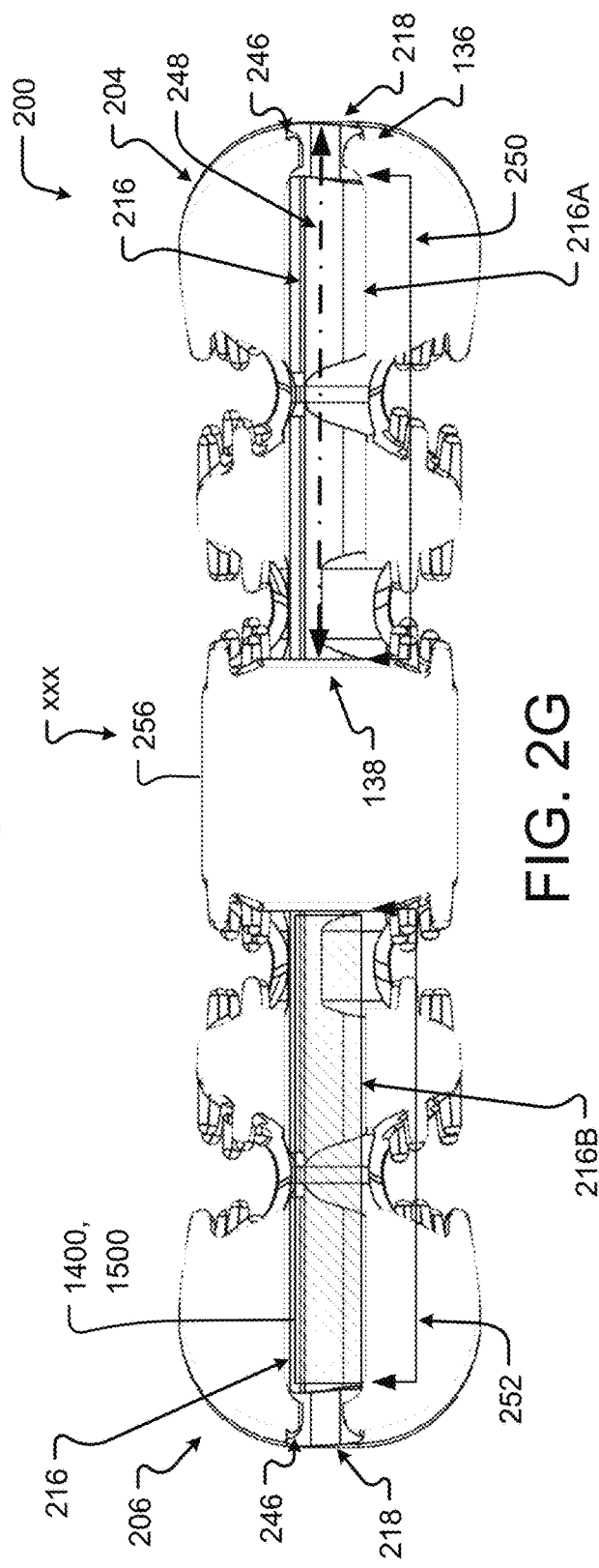
FIG. 2G is a side cross-sectional view of the pet dental device of FIG. 2A taken along line B-B shown in FIG. 2F according to at least one embodiment of the present disclosure.

Turning to FIGS. 2F and 2G, a side view and a side cross-sectional view taken along the line B-B shown in FIG. 2F are respectively shown. As shown, in particular in FIG. 2G, the cavity 216 extends from a first cavity end 236 at the first end 204 and/or the second end 206 along a cavity axis 248 to a second cavity end 238 near the center portion 210. In the illustrated embodiment, the cavity axis 248 is parallel to the center axis 208, though it will be appreciated that the cavity axis 248 can be at any angle relative to the center axis 208. As previously described, the cavity 216 opens to the first end 204 and/or the second end 206 through a cavity opening 218. A pet treat 2800, 2900 can be inserted through the cavity opening 218 and into the cavity 216. As shown in FIG. 1E, the cavity opening 218 may have a first cross-section 242 having a unique shape such as, for example, the letter "W". In other embodiments, the cavity opening 218 may have any shape such as, for example, a star, a square, a rectangle, a triangle, etc. The pet treat 2800, 2900 may have a second cross-section 2808, 2908 that is the same shape as the cavity opening 218 such that the pet treat 2800, 2900 can be inserted into the cavity 216 via the cavity opening 218. The cavity opening 218 may, in some instances, act as a key for the pet treat 2800, 2900. In other words, the cavity opening 218 may be shaped so as to only allow a pet treat 2800, 2900 with the same cross-section to be inserted into the cavity 216. The pet treat 2800, 2900 may be sized to be substantially the same as or similar to the cavity opening 218 so that the pet treat 2800, 2900 can be inserted through the cavity opening 218. In other words, the second cross-section 2808, 2908 may be sized substantially equal to or less than the first cross-section 242.

Once the pet treat 2800, 2900 is positioned in the cavity 216, the pet treat 2800, 2900 may be retained by a retaining ledge 246 that extends at least partially around the perimeter of the cavity opening 218. In some instances, the retaining ledge 246 can extend around an entirety of the perimeter. The retaining ledge 246 may be semi-flexible so as to allow the pet treat 2800, 2900 to be inserted into the cavity 216 even if the pet treat 2800, 2900 is slightly larger than the retaining ledge 246. The pet treat 2800, 2900 may be sized smaller than the cavity 216 such that the pet treat 2800, 2900 is loosely held in place so that as a pet is breaking the pet treat 2800, 2900, the pet treat 2800, 2900 slides out via the at least one cut out 224. In other words, broken portions of the pet treat 2800, 2900 is enabled to exit the dental device 200 (via the cutouts 224) rather than get stuck within the dental device 200. If the pet treat 2800, 2900 were to get stuck in a device, a pet may lose interest in the device and no longer wish to chew it. Thus, by enabling the pet treat 2800, 2900 to exit the dental device 200 more easily when broken, the pet is rewarded and encouraged to continue chewing the dental device 200 to further break and obtain more of the pet treat 2800, 2900 until the pet treat 2800, 2900 is consumed. Similarly, the cavity 216 has a cavity length 250 that may be substantially equal to or greater than a treat length 252 of the pet treat 2800, 2900. In instances where the cavity length 250 is greater than the treat length 252, the pet treat 2800, 2900 may slide or move within the cavity 216 to enable the pet treat 2800, 2900 to exit the dental device 200.

In the illustrated embodiment, the cavity 216 includes a pair of cavities. In such embodiments, a first cavity 216A of the pair of cavities extends from the first end 204 to the center portion 210 and a second cavity 216B of the pair of cavities extending from the second end 206 to the center portion 210. The first cavity 216A and the second cavity 216B do not intersect. Further, the first cavity 216A and the second cavity 216B do not contact or reach a center point 256 of the center portion 210. It will be appreciated that in other embodiments, the dental device 200 may include any number of cavities.

Though not shown, it will be appreciated that the cavity 216 can include an inner retainer within the cavity 216 so as to retain a first portion of the pet treat 2800, 2900 in a first cavity portion and second portion of the pet treat 2800, 2900 in a second cavity portion. In other words, the first portion of the pet treat 2800, 2900 may be accessible by a first set of cutouts 224 and the second portion of the pet treat 2800, 2900 may be accessible by a second set of cutouts 224. By retaining different portions of the pet treat 2800, 2900 in different portions of the cavity 216, the pet may be encouraged to chew each cutout 224 as opposed to chewing one cutout 224.

Turning to FIGS. 3A-3E, another embodiment of the dental device 300 according to at least one embodiment of the present disclosure is provided. Generally, the dental device 300 is the same as or similar to the dental devices 100, 200 except as will be described below.

Figure 3A:
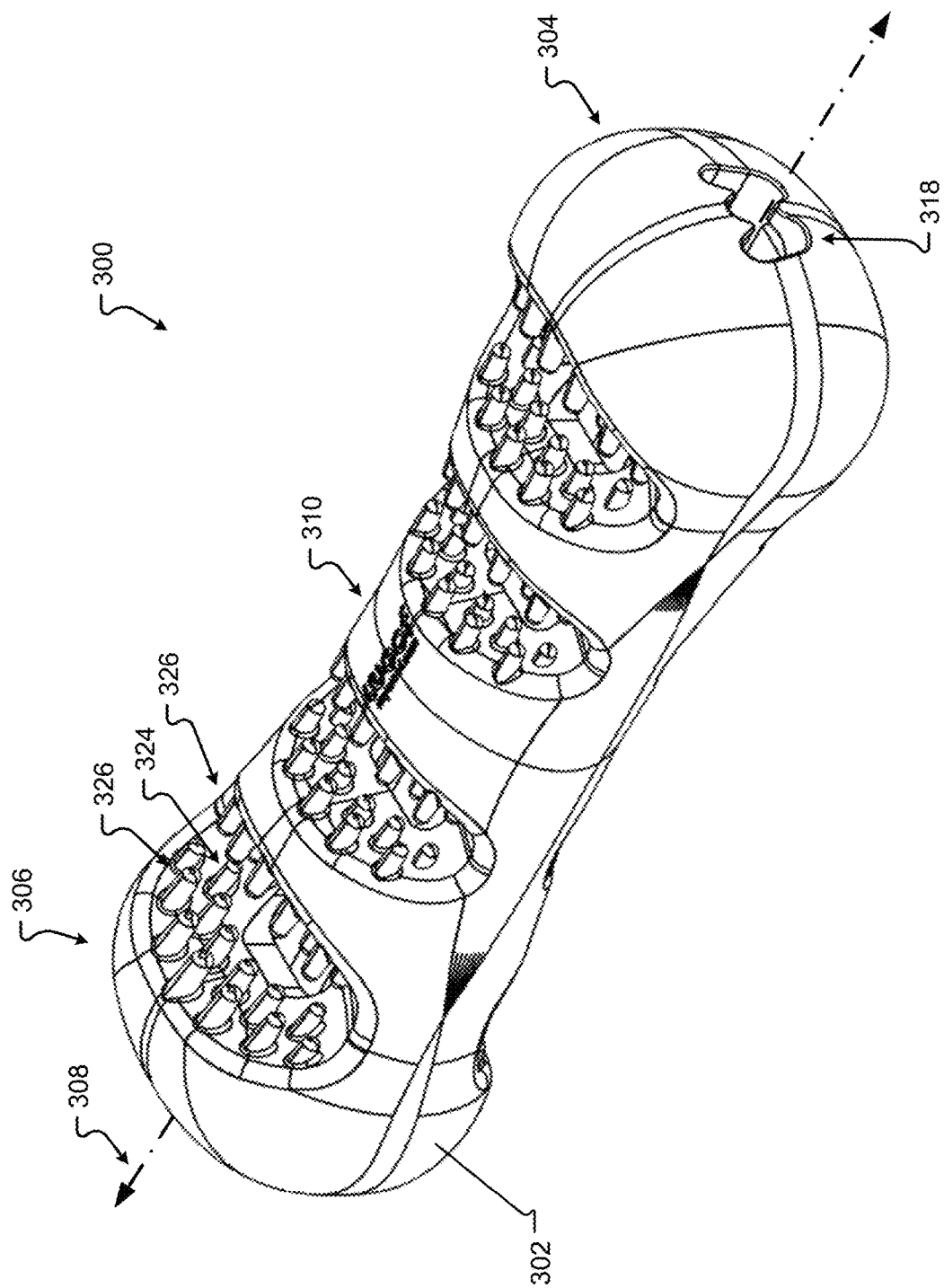
FIG. 3A is a perspective view of a pet dental device according to at least one embodiment of the present disclosure.

In FIG. 3A, the dental device 300 is shown in a perspective view. The dental device 300 includes a body 302 extending from a first end 304 to a second end 306 along a center axis 308. The body 302 has a center portion 310 between the first end 304 and the second end 306. A diameter or cross-sectional dimension 312 (e.g., a diameter, a width, a surface area, a height, etc.) of the center portion 310 is less than a diameter or cross-sectional dimension 314 of the first end 304 and the second end 306 (shown in FIG. 3B). Though it will be appreciated that in other embodiments, the diameter or cross-sectional dimension 312 of the center portion 310 is greater than the diameter or cross-sectional dimension 314 of the first end 304 and/or the second end 306.

The dental device 300 includes at least one cavity 316 extending from the first end 304 or the second end 306 towards the center portion 310 and through the body 302.

The at least one cavity 316 is configured to receive a pet treat through an opening 318 into the first end 304 or the second end 306. The dental device 300 also includes at least one cutout 324 extending from a first surface 320 and/or a second surface 322 of the body 302 into the cavity 316. The at least one cutout 324 provides access to at least a portion of a pet treat disposed in the corresponding cavity 316. The dental device 300 further includes at least one set of dental cleaning mechanisms 326 positioned on at least a portion of a perimeter 328 of the at least one cutout 324. The dental cleaning mechanism 326 may include, for example, bristles, nubs, brushes, or any combination thereof.

Turning to FIGS. 3B-3C a top view and a front view of the dental device 300 are respectively shown. When viewed from the top or the bottom, the dental device 300 is in the shape of a bone. It will be appreciated that the dental device 300 may be any shape or size. For example, the dental device 300 may be sized for any sized pet and may include sizes such as, for example, extra small, small, medium, large, or extra large.

As shown, the at least one cutout 324 extends from a first cutout end 330 to a second cutout end 332 along a cutout axis 334. In the illustrated embodiment, the cutout axis 334 is perpendicular to the center axis 308 of the dental device 300. However, it will be appreciated that the cutout axis 334 may be at any angle relative to the center axis 308. As illustrated, the cutout 324 has an oblong, oval, or rectangular shape, though it will be appreciated that the cutout 324 may have any shape. Further, in embodiments where the dental cleaning mechanism 326 are bristles, the bristles are parallel to the center axis 308. In other instances, the bristles (or any dental cleaning mechanism 326) may be at any angle relative to the center axis 308 or some mechanisms of the dental cleaning mechanisms 326 may be parallel to the center axis 308 and other mechanisms of the dental cleaning mechanism 326 may be any angle relative to the center axis 308). The dental cleaning mechanism 326 may also include a reservoir for distributing cleaning products such as, for example, toothpaste. It will also be appreciated that cleaning products can be directly distributed on the dental cleaning mechanism 326. For example, in embodiments where the dental cleaning mechanism are bristles, toothpaste may be directly applied to the bristles.

As also illustrated, the dental device 300 includes four cutouts 324 on the first surface 320 and four cutouts 324 on the second surface 322. Such configuration may encourage a pet to chew the dental device 300 at different angles and/or orientations and to engage both their upper teeth and lower teeth. In other instances, the dental device 300 may have any number of cutouts 324 on the first surface 320 and/or the second surface 322. The cutouts 324 may be positioned and sized so as to encourage a pet to chew with different parts of their mouth, thereby cleaning as many of the pet's teeth as possible. For example, cutouts 324 closer to center portion 310 encourage chewing with front molars vs cutouts 324 at the first end 304 and/or the second end 306 encourage chewing with back molars.

In some embodiments, the dental device 300 may include a flange or a ledge 554 (shown in FIGS. 5A and 5B) extending from the cutout 324 so as to cover a base of the dental cleaning mechanism 326. The ledge 554 may protect a base of the dental cleaning mechanism 326, which may be more susceptible to breakage as opposed to the ends of the dental cleaning mechanism 326. Thus, the ledge 554 may also encourage the pet to chew the dental cleaning mechanism 326 towards a center of the cutout 324 or a mid portion of the dental cleaning mechanism 326.

Figure 3D:
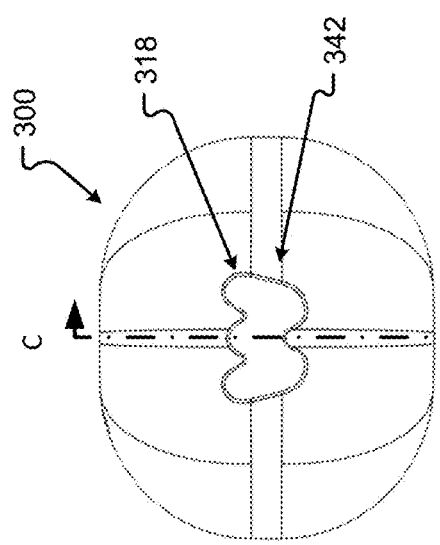
FIG. 3D is a front view of the pet dental device of FIG. 3A according to at least one embodiment of the present disclosure.
Figure 3E:
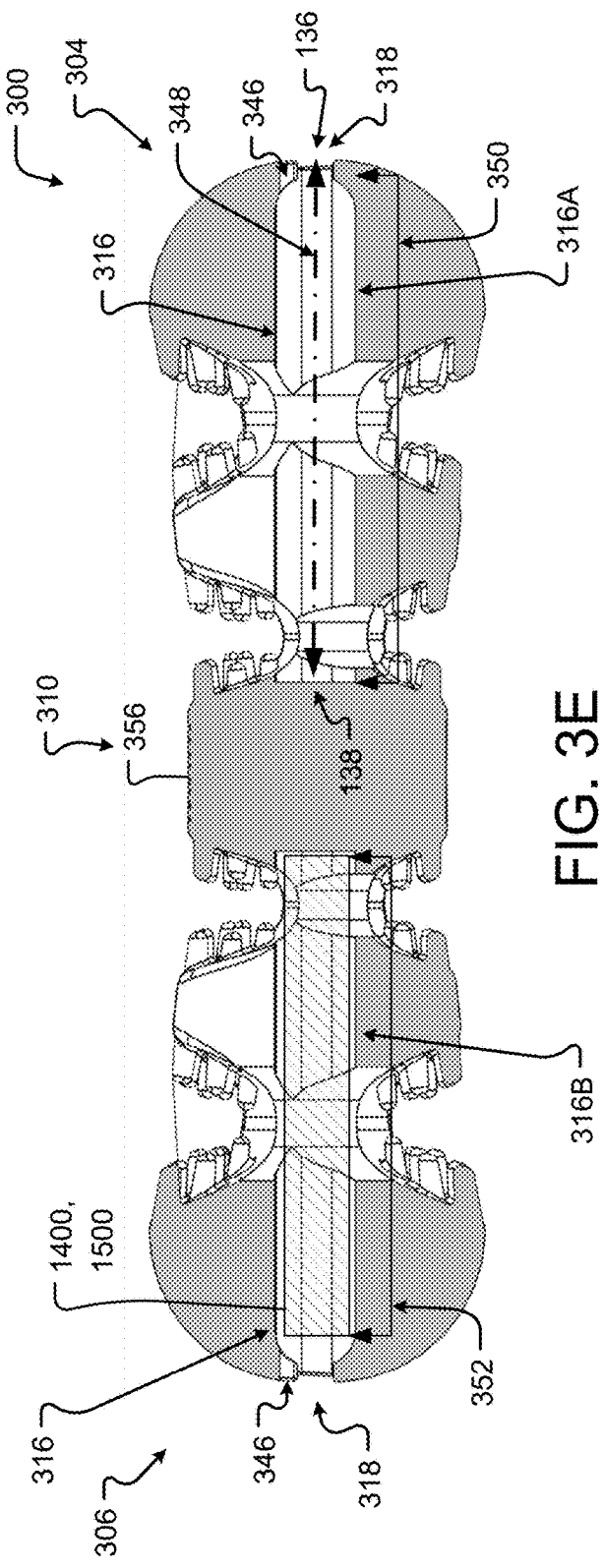
FIG. 3E is a side cross-sectional view of the pet dental device of FIG. 3A taken along line C-C shown in FIG. 3D according to at least one embodiment of the present disclosure.

Turning to FIGS. 3D and 3E, a side view and a side cross-sectional view taken along the line C-C shown in FIG. 3F are respectively shown. As shown, in particular in FIG. 3E, the cavity 316 extends from a first cavity end 336 at the first end 304 and/or the second end 306 along a cavity axis 348 to a second cavity end 338 near the center portion 310. In the illustrated embodiment, the cavity axis 348 is parallel to the center axis 308, though it will be appreciated that the cavity axis 348 can be at any angle relative to the center axis 308. As previously described, the cavity 316 opens to the first end 304 and/or the second end 306 through a cavity opening 318. A pet treat 2800, 2900 can be inserted through the cavity opening 318 and into the cavity 316. As shown in FIG. 1E, the cavity opening 318 may have a first cross-section 342 having a unique shape such as, for example, the letter "W". In other embodiments, the cavity opening 318 may have any shape such as, for example, a star, a square, a rectangle, a triangle, etc. The pet treat 2800, 2900 may have a second cross-section 2808, 2908 that is the same shape as the cavity opening 318 such that the pet treat 2800, 2900 can be inserted into the cavity 316 via the cavity opening 318. The cavity opening 318 may, in some instances, act as a key for the pet treat 2800, 2900. In other words, the cavity opening 318 may be shaped so as to only allow a pet treat 2800, 2900 with the same cross-section to be inserted into the cavity 316. The pet treat 2800, 2900 may be sized to be substantially the same as or similar to the cavity opening 318 so that the pet treat 2800, 2900 can be inserted through the cavity opening 318. In other words, the second cross-section 2808, 2908 may be sized substantially equal to or less than the first cross-section 342.

Once the pet treat 2800, 2900 is positioned in the cavity 316, the pet treat 2800, 2900 may be retained by a retaining ledge 346 that extends at least partially around the perimeter 328 of the cavity opening 318. In some instances, the retaining ledge 346 can extend around an entirety of the perimeter. The retaining ledge 346 may be semi-flexible so as to allow the pet treat 2800, 2900 to be inserted into the cavity 316 even if the pet treat 2800, 2900 is slightly larger than the retaining ledge 346. The pet treat 2800, 2900 may be sized smaller than the cavity 316 such that the pet treat 2800, 2900 is loosely held in place so that as a pet is breaking the pet treat 2800, 2900, the pet treat 2800, 2900 slides out via the at least one cut out 324. In other words, broken portions of the pet treat 2800, 2900 is enabled to exit the dental device 300 (via the cutouts 324) rather than get stuck within the dental device 300. If the pet treat 2800, 2900 were to get stuck in a device, a pet may lose interest in the device and no longer wish to chew it. Thus, by enabling the pet treat 2800, 2900 to exit the dental device 300 more easily when broken, the pet is rewarded and encouraged to continue chewing the dental device 300 to further break and obtain more of the pet treat 2800, 2900 until the pet treat 2800, 2900 is consumed. Similarly, the cavity 316 has a cavity length 350 that may be substantially equal to or greater than a treat length 352 of the pet treat 2800, 2900. In instances where the cavity length 350 is greater than the treat length 352, the pet treat 2800, 2900 may slide or move within the cavity 316 to enable the pet treat 2800, 2900 to exit the dental device 300.

In the illustrated embodiment, the cavity 316 includes a pair of cavities. In such embodiments, a first cavity 316A of the pair of cavities extends from the first end 304 to the center portion 310 and a second cavity 316B of the pair of cavities extending from the second end 306 to the center portion 310. The first cavity 316A and the second cavity 316B do not intersect. Further, the first cavity 316A and the second cavity 316B do not contact or reach a center point 356 of the center portion 310. It will be appreciated that in other embodiments, the dental device 300 may include any number of cavities.

Though not shown, it will be appreciated that the cavity 316 can include an inner retainer within the cavity 316 so as to retain a first portion of the pet treat 2800, 2900 in a first cavity portion and second portion of the pet treat 2800, 2900 in a second cavity portion. In other words, the first portion of the pet treat 2800, 2900 may be accessible by a first set of cutouts 324 and the second portion of the pet treat 2800, 2900 may be accessible by a second set of cutouts 324. By retaining different portions of the pet treat 2800, 2900 in different portions of the cavity 316, the pet may be encouraged to chew each cutout 324 as opposed to chewing one cutout 324.

Turning to FIGS. 4A-4G, another embodiment of the dental device 400 according to at least one embodiment of the present disclosure is provided. Generally, the dental device 400 is the same as or similar to the dental devices 100, 200, 300 except as will be described below.

Figure 4A:
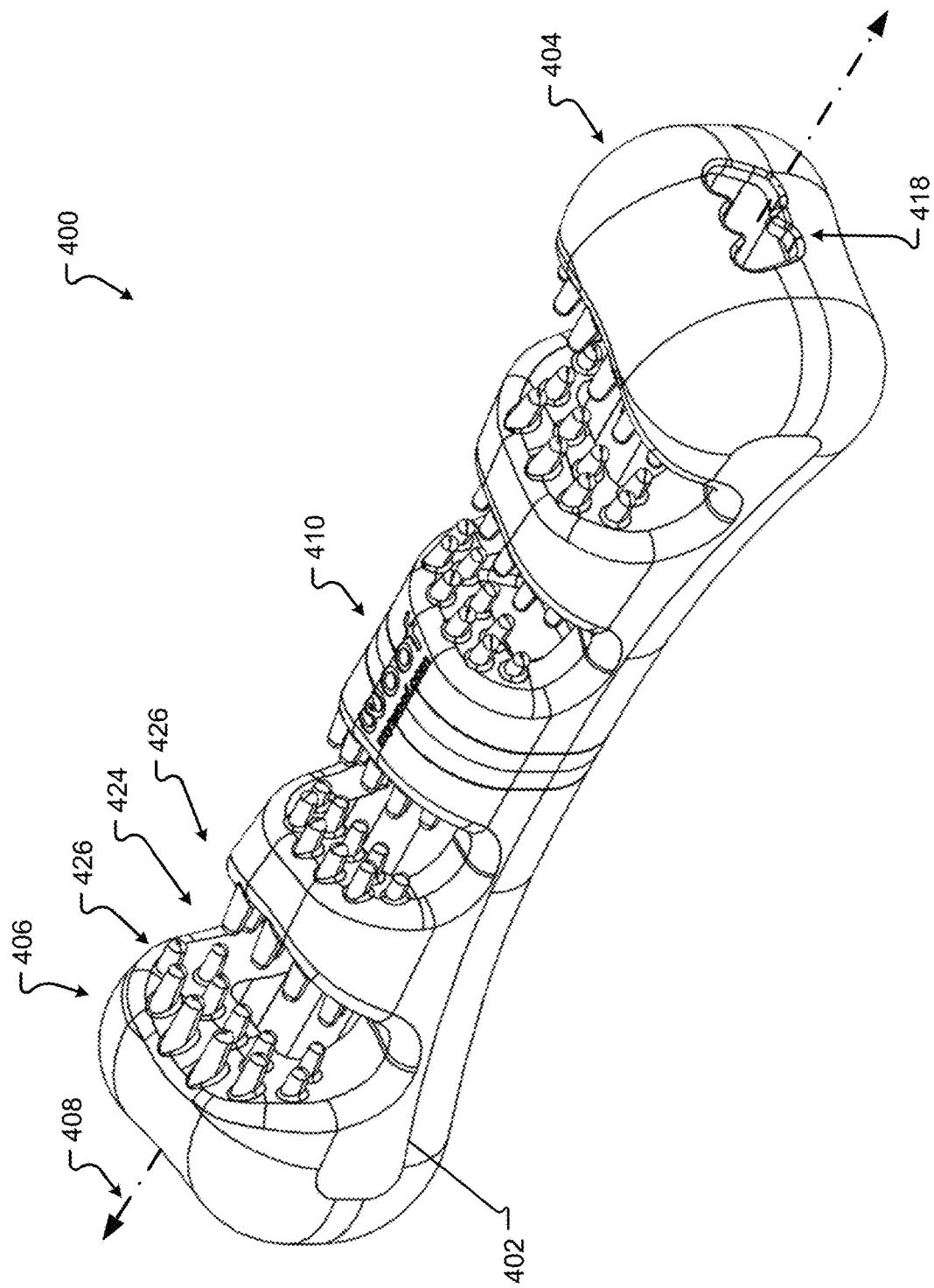
FIG. 4A is a perspective view of a pet dental device according to at least one embodiment of the present disclosure.

In FIG. 4A, the dental device 400 is shown in a perspective view. The dental device 400 includes a body 402 extending from a first end 404 to a second end 406 along a center axis 408. The body 402 has a center portion 410 between the first end 404 and the second end 406. A diameter or cross-sectional portion 412 (e.g., a diameter, a width, a surface area, a height, etc.) of the center portion 410 is less than a diameter or cross-sectional portion 414 of the first end 404 and the second end 406 (shown in FIG. 4C). Though it will be appreciated that in other embodiments, the diameter or cross-sectional portion 412 of the center portion 410 is greater than the diameter or cross-sectional portion 414 of the first end 404 and/or the second end 406.

The dental device 400 includes at least one cavity 416 extending from the first end 404 or the second end 406 towards the center portion 410 and through the body 402. The at least one cavity 416 is configured to receive a pet treat through an opening 418 into the first end 404 or the second end 406. The dental device 400 also includes at least one cutout 424 extending from a first surface 420 and/or a second surface 422 of the body 402 into the cavity 416. The at least one cutout 424 provides access to at least a portion of a pet treat disposed in the corresponding cavity 416. The dental device 400 further includes at least one set of dental cleaning mechanisms 426 positioned on at least a portion of a perimeter 428 of the at least one cutout 424. The dental cleaning mechanism 426 may include, for example, bristles, nubs, brushes, or any combination thereof.

Figure 4B:
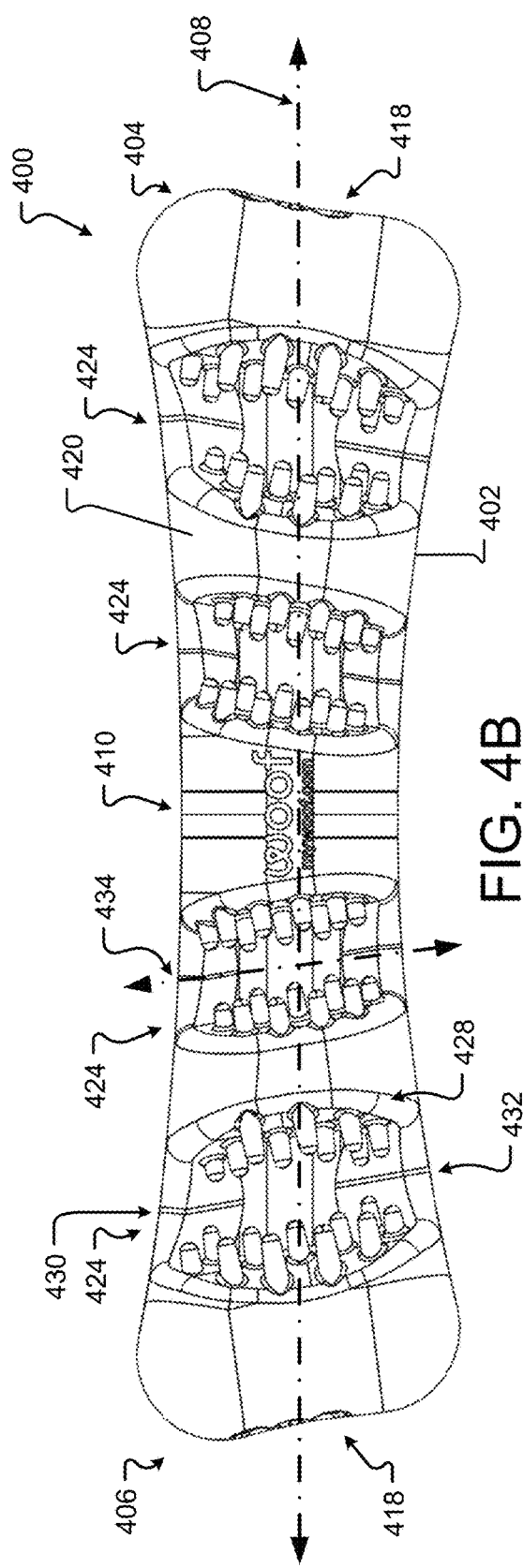
FIG. 4B is a top view of the pet dental device of FIG. 4A according to at least one embodiment of the present disclosure.
Figure 4C:
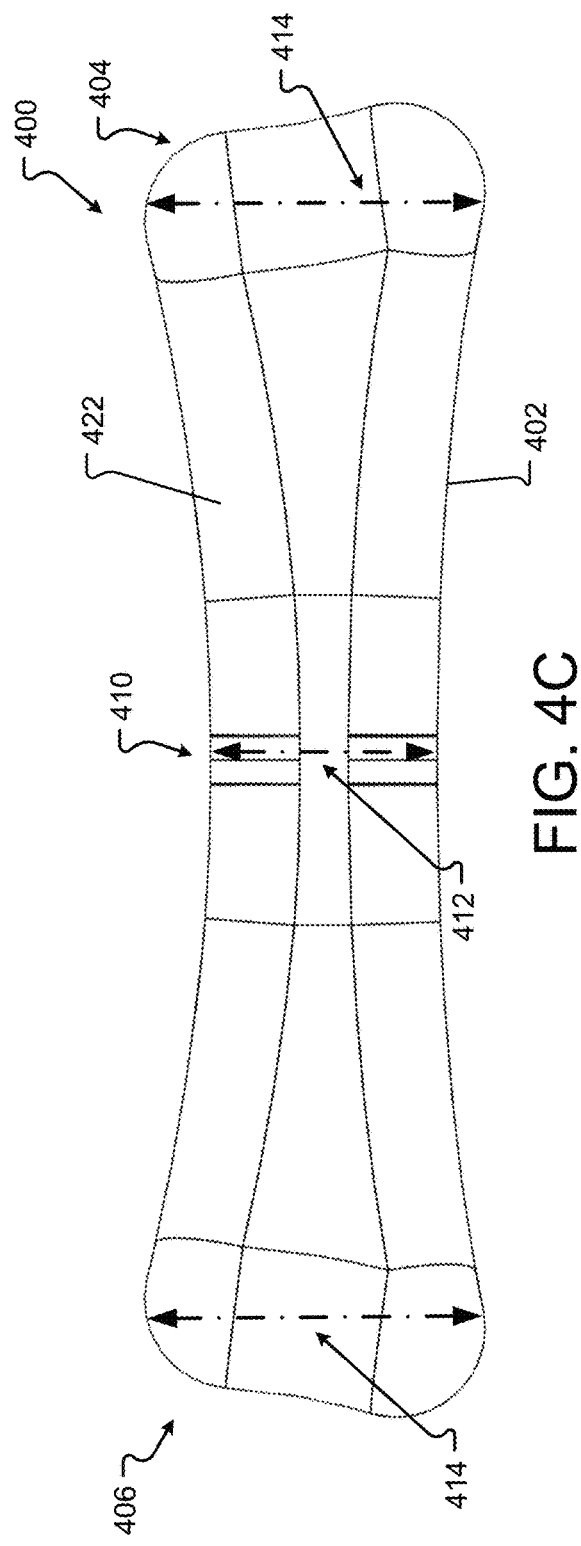
FIG. 4C is a bottom view of the pet dental device of FIG. 4A according to at least one embodiment of the present disclosure.
Figure 4D:
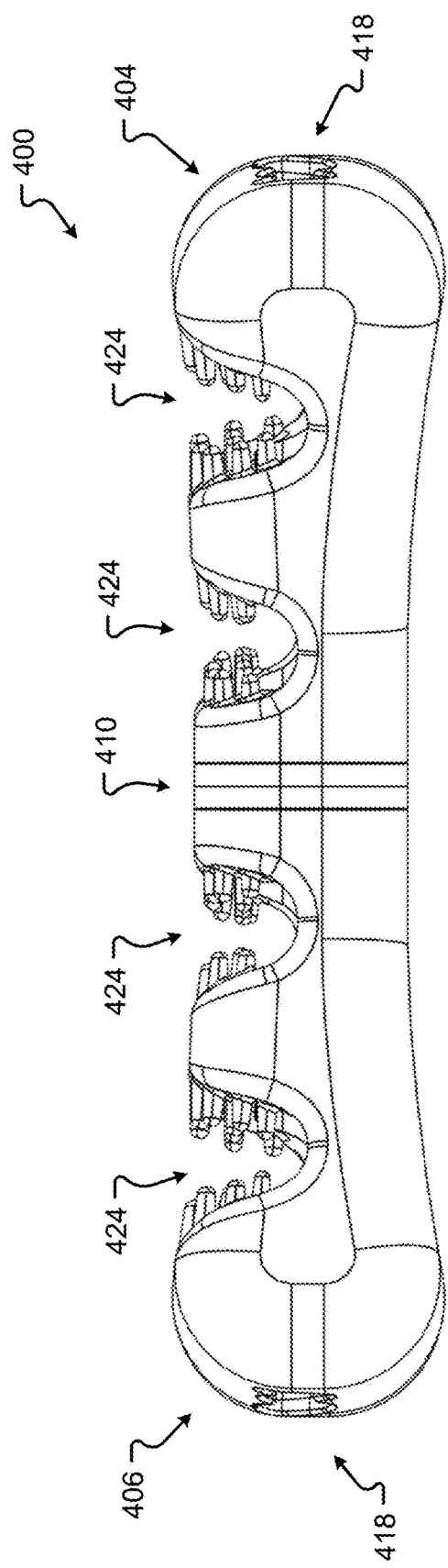
FIG. 4D is a side view of the pet dental device of FIG. 4A according to at least one embodiment of the present disclosure.
Figure 4E:
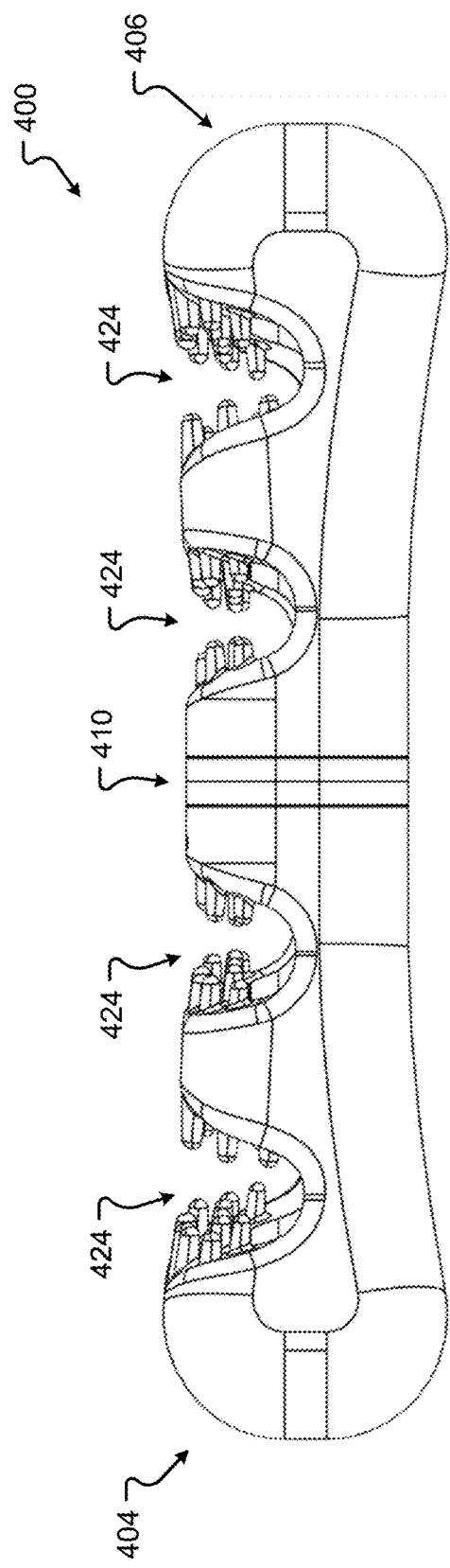
FIG. 4E is a side view of the pet dental device of FIG. 4A according to at least one embodiment of the present disclosure.

Turning to FIGS. 4B-4E a top view, a bottom view, a front view, and a rear view of the dental device 400 are respectively shown. When viewed from the top or the bottom, the dental device 400 is in the shape of a bone with the first end 404 and the second end 406 of the bone angled downward as shown in FIG. 4B. Thus, the cavity 416 is visible when viewed from the front, as shown in FIG. 4D and is not visible when viewed from the rear, as shown in FIG. 4E. It will be appreciated that the dental device 400 may be any shape or size. For example, the dental device 400 may be sized for any sized pet and may include sizes such as, for example, extra small, small, medium, large, or extra large.

As shown, the at least one cutout 424 extends from a first cutout end 430 to a second cutout end 432 along a cutout axis 434. In the illustrated embodiment, the cutout axis 434 is at an angle to the center axis 408 of the dental device 400. However, it will be appreciated that the cutout axis 434 may be at any angle, including perpendicular, relative to the center axis 408. As illustrated, the cutout 424 has an oblong, oval, or rectangular shape, though it will be appreciated that the cutout 424 may have any shape. Further, in embodiments where the dental cleaning mechanism 426 are bristles, the bristles are also at an angle to the center axis 408. In other instances, the bristles (or any dental cleaning mechanism 426) may be at any angle relative to the center axis 408 or some mechanisms of the dental cleaning mechanisms 426 may be parallel to the center axis 408 and other mechanisms of the dental cleaning mechanism 426 may be any angle relative to the center axis 408). The dental cleaning mechanism 426 may also include a reservoir for distributing cleaning products such as, for example, toothpaste. It will also be appreciated that cleaning products can be directly distributed on the dental cleaning mechanism 426. For example, in embodiments where the dental cleaning mechanism are bristles, toothpaste may be directly applied to the bristles.

As also illustrated, the dental device 400 includes four cutouts 424 on the first surface 420. Such configuration may encourage a pet to chew the dental device 400 at different angles and/or orientations. In other instances, the dental device 400 may have any number of cutouts 424 on the first surface 420 and/or the second surface 422. The cutouts 424 may be positioned and sized so as to encourage a pet to chew with different parts of their mouth, thereby cleaning as many of the pet's teeth as possible. For example, cutouts 424 closer to center portion 410 encourage chewing with front molars vs cutouts 424 at the first end 404 and/or the second end 406 encourage chewing with back molars.

In some embodiments, the dental device 400 may include a flange or a ledge 554 (shown in FIGS. 5A and 5B) extending from the cutout 424 so as to cover a base of the dental cleaning mechanism 426. The ledge 554 may protect a base of the dental cleaning mechanism 426, which may be more susceptible to breakage as opposed to the ends of the dental cleaning mechanism 426. Thus, the ledge 554 may also encourage the pet to chew the dental cleaning mechanism 426 towards a center of the cutout 424 or a mid portion of the dental cleaning mechanism 426.

Figure 4F:
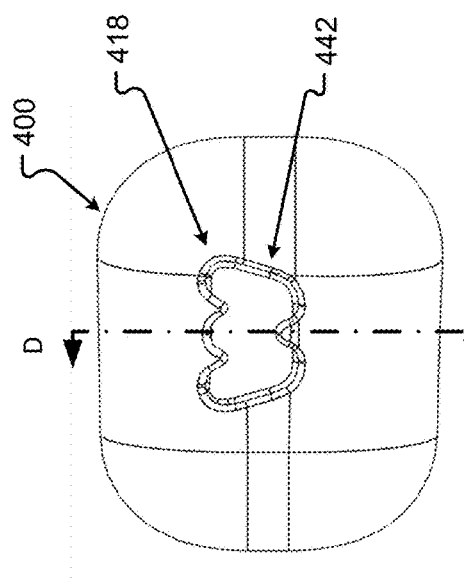
FIG. 4F is a front view of the pet dental device of FIG. 4A according to at least one embodiment of the present disclosure.
Figure 4G:
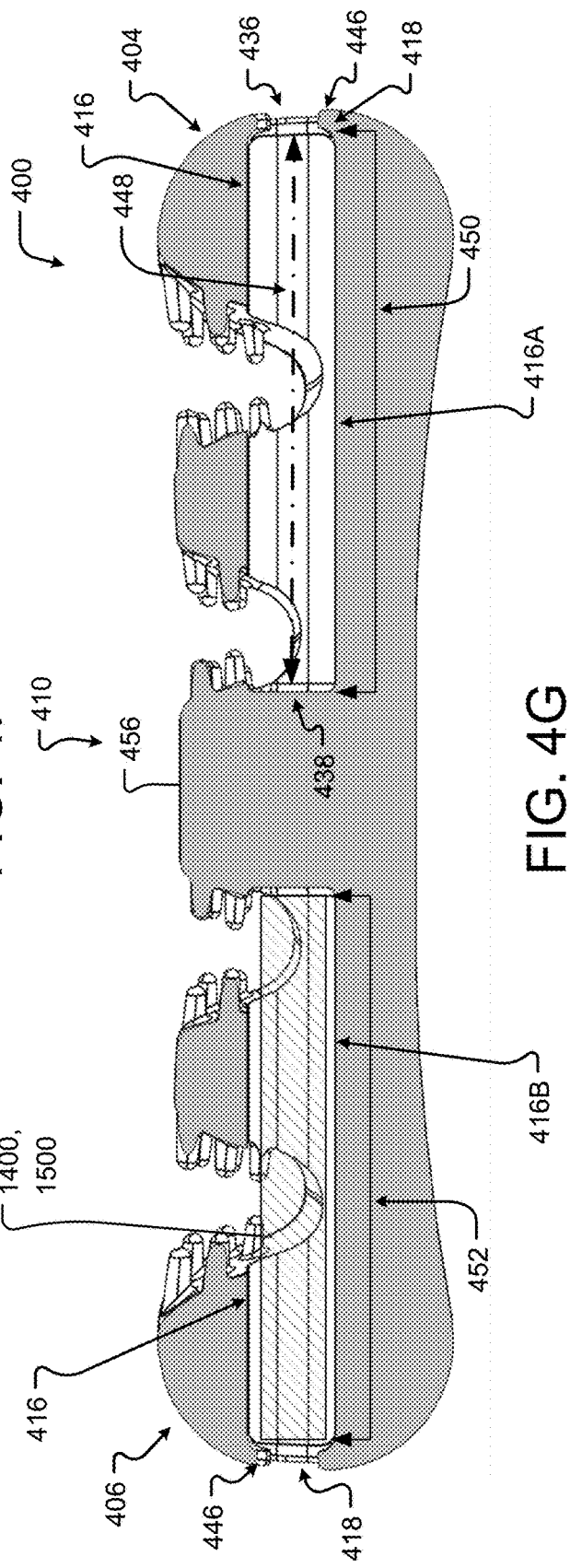
FIG. 4G is a side cross-sectional view of the pet dental device of FIG. 4A taken along line D-D shown in FIG. 4F according to at least one embodiment of the present disclosure.

Turning to FIGS. 4F and 4G, a side view and a side cross-sectional view taken along the line D-D shown in FIG. 4F are respectively shown. As shown, in particular in FIG. 4G, the cavity 416 extends from a first cavity end 436 at the first end 404 and/or the second end 406 along a cavity axis 448 to a second cavity end 438 near the center portion 410. In the illustrated embodiment, the cavity axis 448 is parallel to the center axis 408, though it will be appreciated that the cavity axis 448 can be at any angle relative to the center axis 408. As previously described, the cavity 416 opens to the first end 404 and/or the second end 406 through a cavity opening 418. A pet treat 2800, 2900 can be inserted through the cavity opening 418 and into the cavity 416. As shown in FIG. 1E, the cavity opening 418 may have a first cross-section 442 having a unique shape such as, for example, the letter "W". In other embodiments, the cavity opening 418 may have any shape such as, for example, a star, a square, a rectangle, a triangle, etc. The pet treat 2800, 2900 may have a second cross-section 2808, 2908 that is the same shape as the cavity opening 418 such that the pet treat 2800, 2900 can be inserted into the cavity 416 via the cavity opening 418. The cavity opening 418 may, in some instances, act as a key for the pet treat 2800, 2900. In other words, the cavity opening 418 may be shaped so as to only allow a pet treat 2800, 2900 with the same cross-section to be inserted into the cavity 416. The pet treat 2800, 2900 may be sized to be substantially the same as or similar to the cavity opening 418 so that the pet treat 2800, 2900 can be inserted through the cavity opening 418. In other words, the second cross-section 2808, 2908 may be sized substantially equal to or less than the first cross-section 442.

As previously described, once the pet treat 2800, 2900 is positioned in the cavity 416, the pet treat 2800, 2900 may be retained by a retaining ledge 446 that extends at least partially around the perimeter of the cavity opening 418. In some instances, the retaining ledge 446 can extend around an entirety of the perimeter. The retaining ledge 446 may be semi-flexible so as to allow the pet treat 2800, 2900 to be inserted into the cavity 416 even if the pet treat 2800, 2900 is slightly larger than the retaining ledge 446. The pet treat 2800, 2900 may be sized smaller than the cavity 416 such that the pet treat 2800, 2900 is loosely held in place so that as a pet is breaking the pet treat 2800, 2900, the pet treat 2800, 2900 slides out via the at least one cut out 424. In other words, broken portions of the pet treat 2800, 2900 is enabled to exit the dental device 400 (via the cutouts 424) rather than get stuck within the dental device 400. If the pet treat 2800, 2900 were to get stuck in a device, a pet may lose interest in the device and no longer wish to chew it. Thus, by enabling the pet treat 2800, 2900 to exit the dental device 400 more easily when broken, the pet is rewarded and encouraged to continue chewing the dental device 400 to further break and obtain more of the pet treat 2800, 2900 until the pet treat 2800, 2900 is consumed. Similarly, the cavity 416 has a cavity length 450 that may be substantially equal to or greater than a treat length 452 of the pet treat 2800, 2900. In instances where the cavity length 450 is greater than the treat length 452, the pet treat 2800, 2900 may slide or move within the cavity 416 to enable the pet treat 2800, 2900 to exit the dental device 400.

In the illustrated embodiment, the cavity 416 includes a pair of cavities. In such embodiments, a first cavity 416A of the pair of cavities extends from the first end 404 to the center portion 410 and a second cavity 416B of the pair of cavities extending from the second end 406 to the center portion 410. The first cavity 416A and the second cavity 416B do not intersect. Further, the first cavity 416A and the second cavity 416B do not contact or reach a center point 456 of the center portion 410. It will be appreciated that in other embodiments, the dental device 400 may include any number of cavities.

Though not shown, it will be appreciated that the cavity 416 can include an inner retainer within the cavity 416 so as to retain a first portion of the pet treat 2800, 2900 in a first cavity portion and second portion of the pet treat 2800, 2900 in a second cavity portion. In other words, the first portion of the pet treat 2800, 2900 may be accessible by a first set of cutouts 424 and the second portion of the pet treat 2800, 2900 may be accessible by a second set of cutouts 424. By retaining different portions of the pet treat 2800, 2900 in different portions of the cavity 416, the pet may be encouraged to chew each cutout 424 as opposed to chewing one cutout 424.

Turning to FIGS. 5A-5G, another embodiment of the dental device 500 according to at least one embodiment of the present disclosure is provided. Generally, the dental device 500 is the same as or similar to the dental device 100, 200, 300, 400 except as will be described below.

Figure 5A:
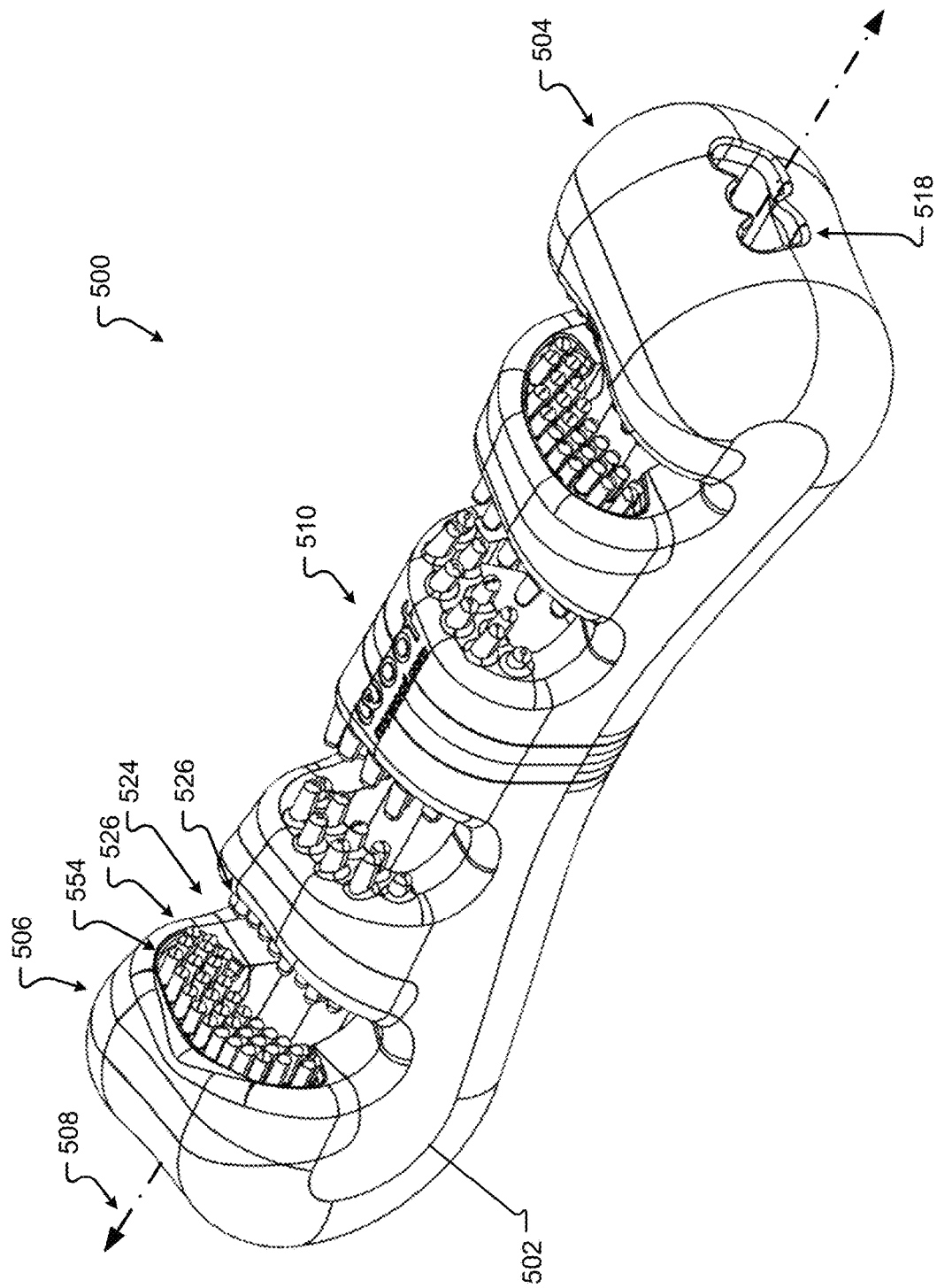
FIG. 5A is a perspective view of a pet dental device according to at least one embodiment of the present disclosure.

In FIG. 5A, the dental device 500 is shown in a perspective view. The dental device 500 includes a body 502 extending from a first end 504 to a second end 506 along a center axis 508. The body 502 has a center portion 510 between the first end 504 and the second end 506. A diameter or cross-sectional dimension 512 (e.g., a diameter, a width, a surface area, a height, etc.) of the center portion 510 is less than a diameter or cross-sectional dimension 514 of the first end 504 and the second end 506 (shown in FIG. 5C). Though it will be appreciated that in other embodiments, the diameter or cross-sectional dimension 512 of the center portion 510 is greater than the diameter or cross-sectional dimension 514 of the first end 504 and/or the second end 506.

The dental device 500 includes at least one cavity 516 extending from the first end 504 or the second end 506 towards the center portion 510 and through the body 502. The at least one cavity 516 is configured to receive a pet treat through an opening 518 into the first end 504 or the second end 506. The dental device 500 also includes at least one cutout 524 extending from a first surface 520 and/or a second surface 522 of the body 502 into the cavity 516. The at least one cutout 524 provides access to at least a portion of a pet treat disposed in the corresponding cavity 516. The dental device 500 further includes at least one set of dental cleaning mechanisms 526 positioned on at least a portion of a perimeter 528 of the at least one cutout 524. The dental cleaning mechanism 526 may include, for example, bristles, nubs, brushes, or any combination thereof.

Turning to FIGS. 5B-5E a top view, a bottom view, a front view, and a rear view of the dental device 500 are respectively shown. When viewed from the top or the bottom, the dental device 500 is in the shape of a bone with the first end 504 and the second end 506 of the bone angled downward as shown in FIG. 5B. Thus, the cavity 516 is visible when viewed from the front, as shown in FIG. 5D and is not visible when viewed from the rear, as shown in FIG. 5E. It will be appreciated that the dental device 500 may be any shape or size. For example, the dental device 500 may be sized for any sized pet and may include sizes such as, for example, extra small, small, medium, large, or extra large.

As shown, the at least one cutout 524 extends from a first cutout end 530 to a second cutout end 532 along a cutout axis 534. In the illustrated embodiment, the cutout axis 534 is at an angle to the center axis 508 of the dental device 500. However, it will be appreciated that the cutout axis 534 may be at any angle, including perpendicular, relative to the center axis 508. As illustrated, the cutout 524 has an oblong, oval, or rectangular shape, though it will be appreciated that the cutout 524 may have any shape. Further, in embodiments where the dental cleaning mechanism 526 are bristles, the bristles are also at an angle to the center axis 508. In other instances, the bristles (or any dental cleaning mechanism 526) may be at any angle relative to the center axis 508 or some mechanisms of the dental cleaning mechanisms 526 may be parallel to the center axis 508 and other mechanisms of the dental cleaning mechanism 526 may be any angle relative to the center axis 508). The dental cleaning mechanism 526 may also include a reservoir for distributing cleaning products such as, for example, toothpaste. It will also be appreciated that cleaning products can be directly distributed on the dental cleaning mechanism 526. For example, in embodiments where the dental cleaning mechanism are bristles, toothpaste may be directly applied to the bristles.

As also illustrated, the dental device 500 includes four cutouts 524 on the first surface 520. Such configuration may encourage a pet to chew the dental device 500 at different angles and/or orientations. In other instances, the dental device 500 may have any number of cutouts 524 on the first surface 520 and/or the second surface 522. The cutouts 524 may be positioned and sized so as to encourage a pet to chew with different parts of their mouth, thereby cleaning as many of the pet's teeth as possible. For example, cutouts 524 closer to center portion 510 encourage chewing with front molars vs cutouts 524 at the first end 504 and/or the second end 506 encourage chewing with back molars.

In some embodiments, the dental device 500 may include a flange or a ledge 554 extending from the cutout 524 so as to cover a base of the dental cleaning mechanism 526. The ledge 554 may protect a base of the dental cleaning mechanism 526, which may be more susceptible to breakage as opposed to the ends of the dental cleaning mechanism 526. Thus, the ledge 554 may also encourage the pet to chew the dental cleaning mechanism 526 towards a center of the cutout 524 or a mid portion of the dental cleaning mechanism 526.

Figure 5F:
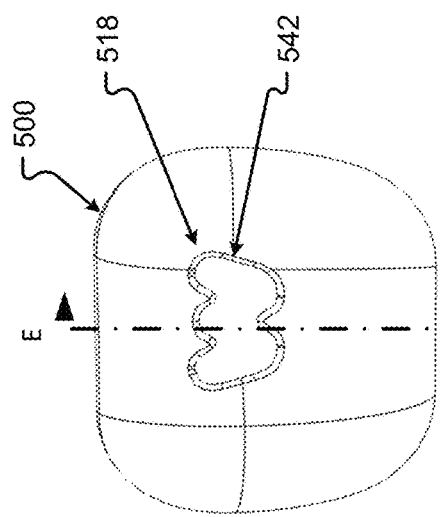
FIG. 5F is a front view of the pet dental device of FIG. 5A according to at least one embodiment of the present disclosure.
Figure 5G:
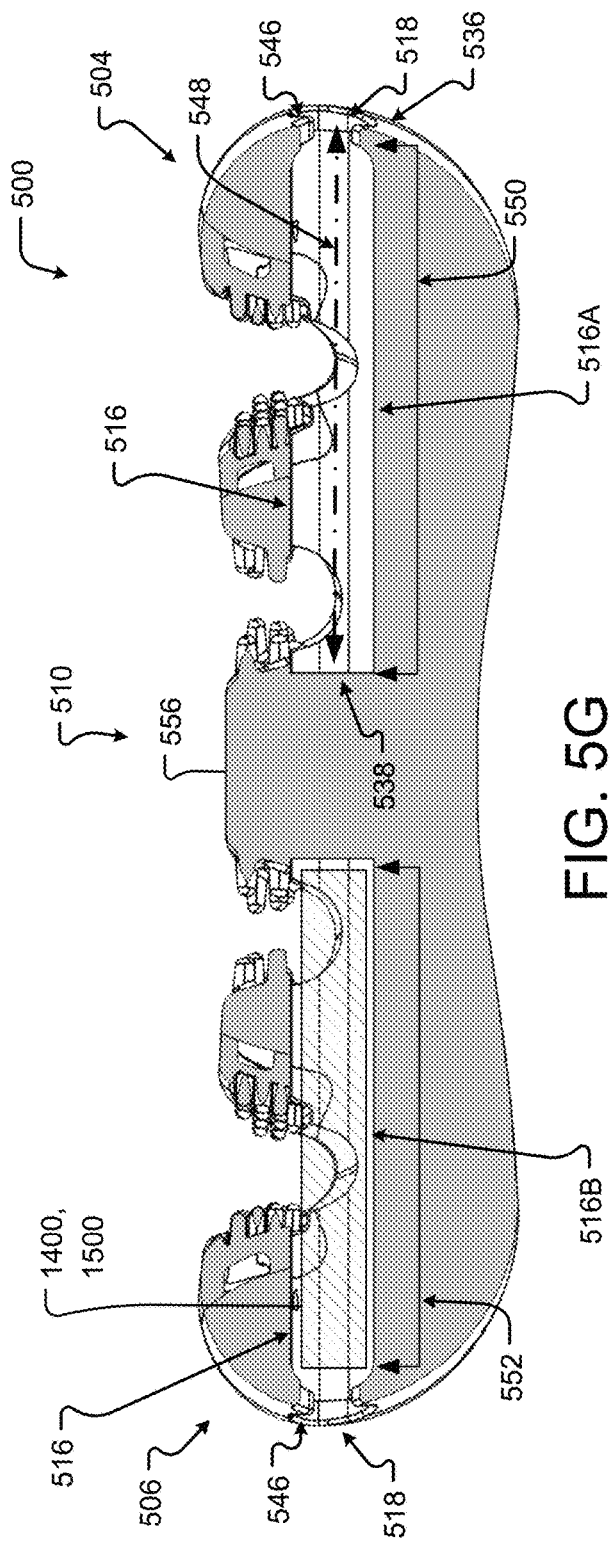
FIG. 5G is a side cross-sectional view of the pet dental device of FIG. 5A taken along line E-E shown in FIG. 5F according to at least one embodiment of the present disclosure.
Figure 6:
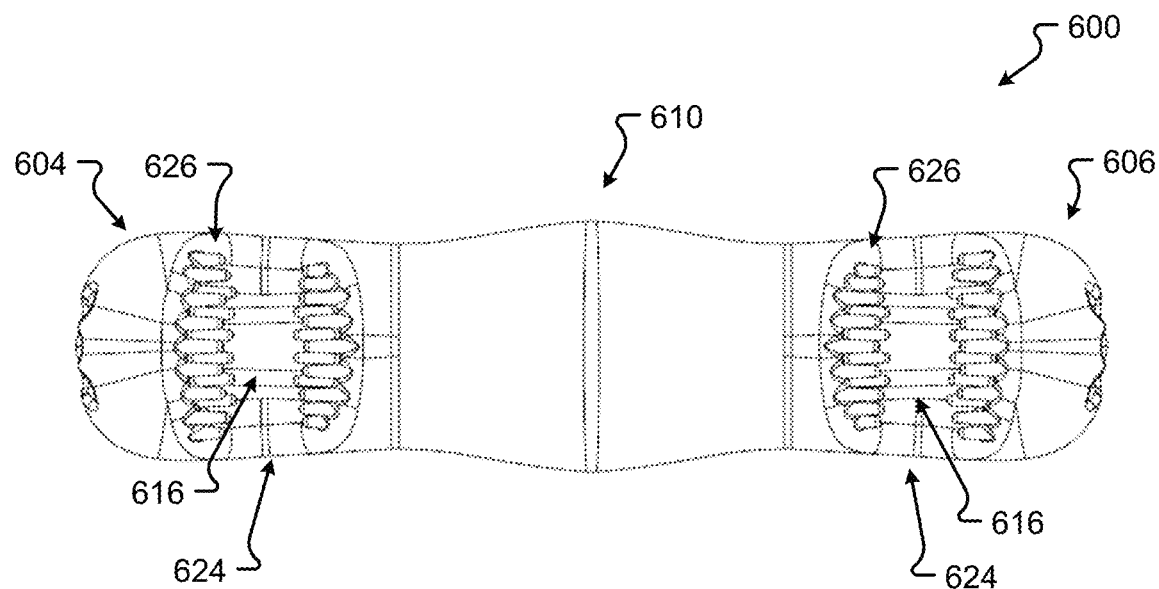
FIG. 6 is an illustration of a dental device according to at least one embodiment of the present disclosure.

Turning to FIGS. 5F and 5G, a side view and a side cross-sectional view taken along the line E-E shown in FIG. 5F are respectively shown. As shown, in particular in FIG. 5G, the cavity 516 extends from a first cavity end 536 at the first end 504 and/or the second end 506 along a cavity axis 548 to a second cavity end 538 near the center portion 510. In the illustrated embodiment, the cavity axis 548 is parallel to the center axis 508, though it will be appreciated that the cavity axis 548 can be at any angle relative to the center axis 508. As previously described, the cavity 516 opens to the first end 504 and/or the second end 506 through a cavity opening 518. A pet treat 2800, 2900 can be inserted through the cavity opening 518 and into the cavity 516. As shown in FIG. 1E, the cavity opening 518 may have a first cross-section 542 having a unique shape such as, for example, the letter "W". In other embodiments, the cavity opening 518 may have any shape such as, for example, a star, a square, a rectangle, a triangle, etc. The pet treat 2800, 2900 may have a second cross-section 2808, 2908 that is the same shape as the cavity opening 518 such that the pet treat 2800, 2900 can be inserted into the cavity 516 via the cavity opening 518. The cavity opening 518 may, in some instances, act as a key for the pet treat 2800, 2900. In other words, the cavity opening 518 may be shaped so as to only allow a pet treat 2800, 2900 with the same cross-section to be inserted into the cavity 516. The pet treat 2800, 2900 may be sized to be substantially the same as or similar to the cavity opening 518 so that the pet treat 2800, 2900 can be inserted through the cavity opening 518. In other words, the second cross-section 2808, 2908 may be sized substantially equal to or less than the first cross-section 542.

Once the pet treat 2800, 2900 is positioned in the cavity 516, the pet treat 2800, 2900 may be retained by a retaining ledge 546 that extends at least partially around the perimeter of the cavity opening 518. In some instances, the retaining ledge 546 can extend around an entirety of the perimeter. The retaining ledge 546 may be semi-flexible so as to allow the pet treat 2800, 2900 to be inserted into the cavity 516 even if the pet treat 2800, 2900 is slightly larger than the retaining ledge 546. The pet treat 2800, 2900 may be sized smaller than the cavity 516 such that the pet treat 2800, 2900 is loosely held in place so that as a pet is breaking the pet treat 2800, 2900, the pet treat 2800, 2900 slides out via the at least one cut out 524. In other words, broken portions of the pet treat 2800, 2900 is enabled to exit the dental device 500 (via the cutouts 524) rather than get stuck within the dental device 500. If the pet treat 2800, 2900 were to get stuck in a device, a pet may lose interest in the device and no longer wish to chew it. Thus, by enabling the pet treat 2800, 2900 to exit the dental device 500 more easily when broken, the pet is rewarded and encouraged to continue chewing the dental device 500 to further break and obtain more of the pet treat 2800, 2900 until the pet treat 2800, 2900 is consumed. Similarly, the cavity 516 has a cavity length 550 that may be substantially equal to or greater than a treat length 552 of the pet treat 2800, 2900. In instances where the cavity length 550 is greater than the treat length 552, the pet treat 2800, 2900 may slide or move within the cavity 516 to enable the pet treat 2800, 2900 to exit the dental device 524.

In the illustrated embodiment, the cavity 516 includes a pair of cavities. In such embodiments, a first cavity 516A of the pair of cavities extends from the first end 504 to the center portion 510 and a second cavity 516B of the pair of cavities extending from the second end 506 to the center portion 510. The first cavity 516A and the second cavity 516B do not intersect. Further, the first cavity 516A and the second cavity 516B do not contact or reach a center point 556 of the center portion 510. It will be appreciated that in other embodiments, the dental device 500 may include any number of cavities.

Though not shown, it will be appreciated that the cavity 516 can include an inner retainer within the cavity 516 so as to retain a first portion of the pet treat 2800, 2900 in a first cavity portion and second portion of the pet treat 2800, 2900 in a second cavity portion. In other words, the first portion of the pet treat 2800, 2900 may be accessible by a first set of cutouts 524 and the second portion of the pet treat 2800, 2900 may be accessible by a second set of cutouts 524. By retaining different portions of the pet treat 2800, 2900 in different portions of the cavity 516, the pet may be encouraged to chew each cutout 524 as opposed to chewing one cutout 524.

Figure 7:
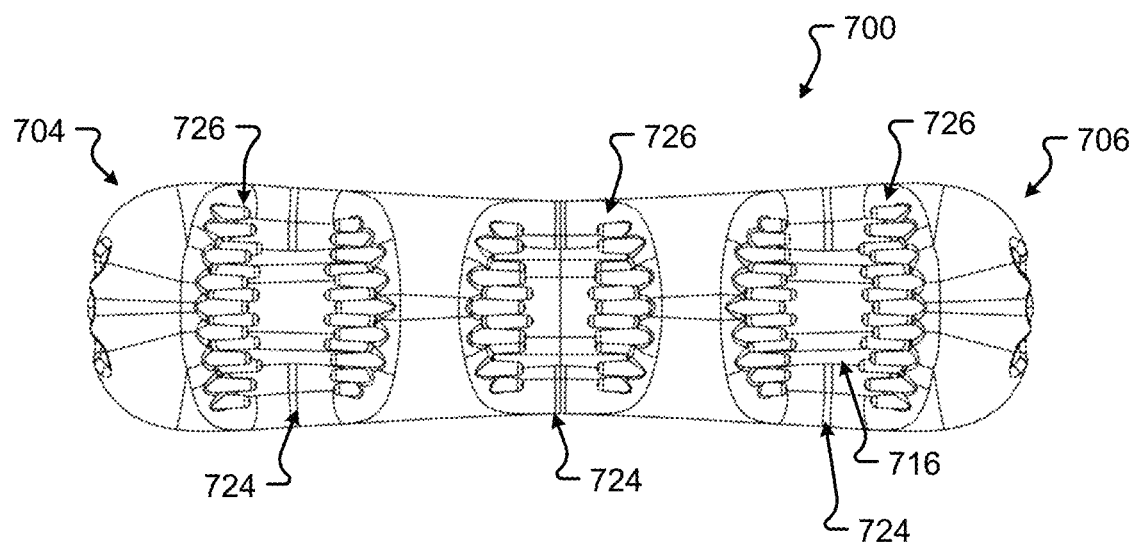
FIG. 7 is an illustration of a dental device according to at least one embodiment of the present disclosure.

FIGS. 6-13 further illustrate that a dental device may come in any shape, size, and/or combination of features. For example, in FIG. 6, a dental device 600 according to at least one embodiment of the present disclosure is shown. The device 600 has a center portion 610 that is wider than a first end 604 and/or a second end 606. The device 600 also includes cavities 616 and one or more cutouts 624 with corresponding dental cleaning mechanism 626. In FIG. 7, a dental device 700 according to at least one embodiment of the present disclosure is shown. The device 700 includes a cavity 716 that extends from a first end 704 to a second end 706 of the device 700. The device 700 also includes one or more cutout 724 with corresponding dental cleaning mechanism 726 extending into the cavity 716.

Figure 8:
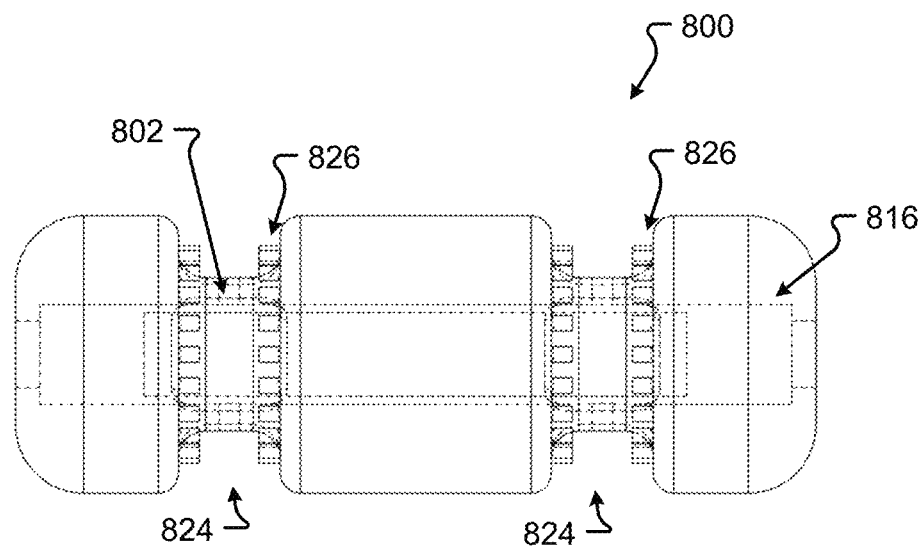
FIG. 8 is an illustration of a dental device according to at least one embodiment of the present disclosure.

In FIG. 8, a dental device 800 according to at least one embodiment of the present disclosure is shown. The device 800 includes one or more cutouts 824 and a corresponding dental cleaning mechanism 826 that extend around an entire perimeter of the device 800 such that the dental cleaning mechanism 826 will contact the pet's teeth within the cutouts 824 from any direction. The device 800 also includes a cradle 802 and one or more cavities 816 by which to hold the treat.

Figure 9:
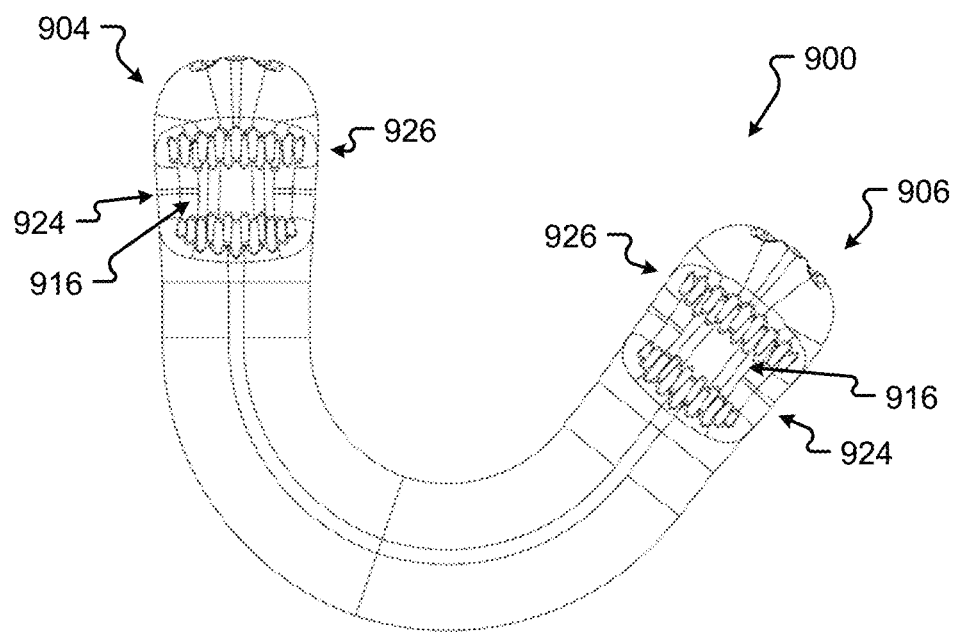
FIG. 9 is an illustration of a dental device according to at least one embodiment of the present disclosure.

In FIG. 9, a dental device 900 according to at least one embodiment of the present disclosure is shown. Device 900 is generally U-shaped and includes a cavity 916, a cutout 924, and a corresponding dental cleaning mechanism 826 at each of the first end 904 and the second end 906.

Figure 10:
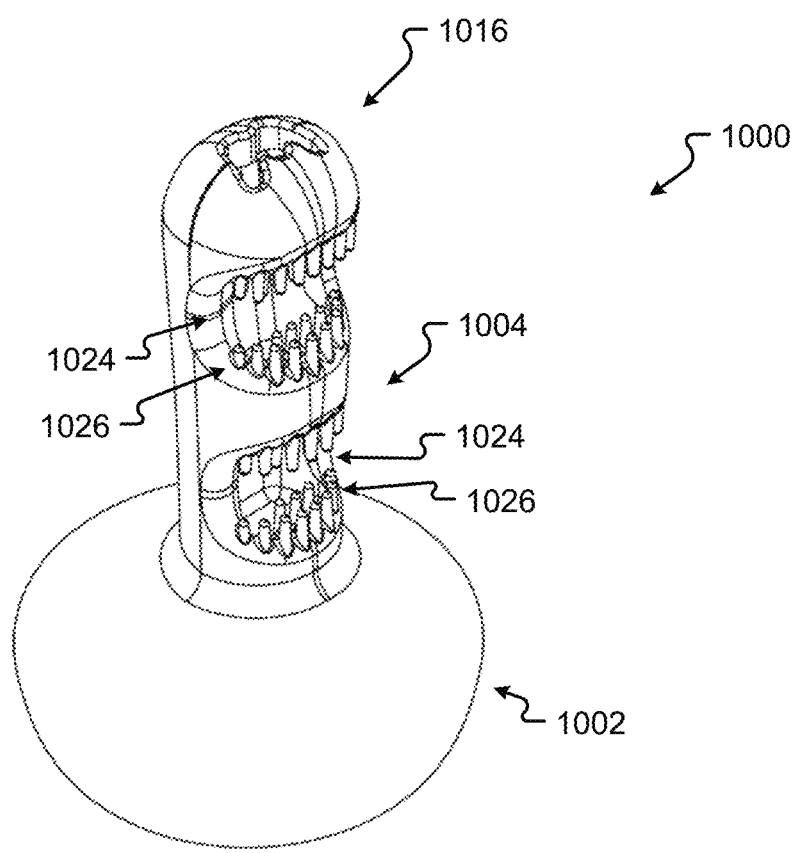
FIG. 10 is an illustration of a dental device according to at least one embodiment of the present disclosure.

In FIG. 10, a dental device 1000 according to at least one embodiment of the present disclosure is shown. The device 1000 includes a base 1002 and an extension 1004 extending from the base 1002. The base 1002 is capable of wobbling, rolling, or otherwise self-correcting so as to position the extension 1004 above the base 1002. The extension 1004 includes a cavity 1016 and one or more cutouts 1024 and corresponding dental cleaning mechanisms 1026.

Figure 11B:
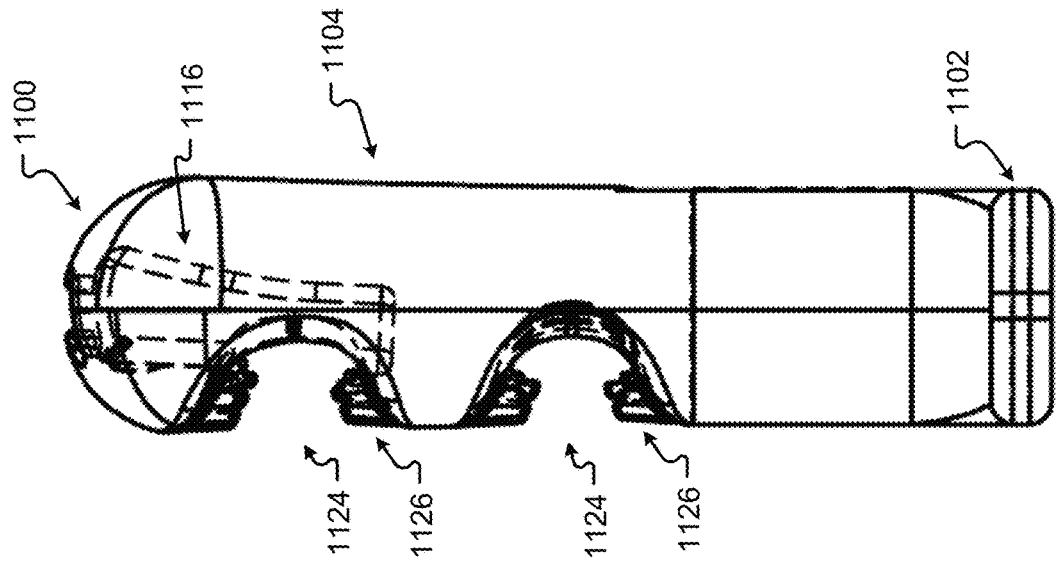
FIG. 11B is a side view of the pet dental device of FIG. 11A according to at least one embodiment of the present disclosure.
Figure 11A:
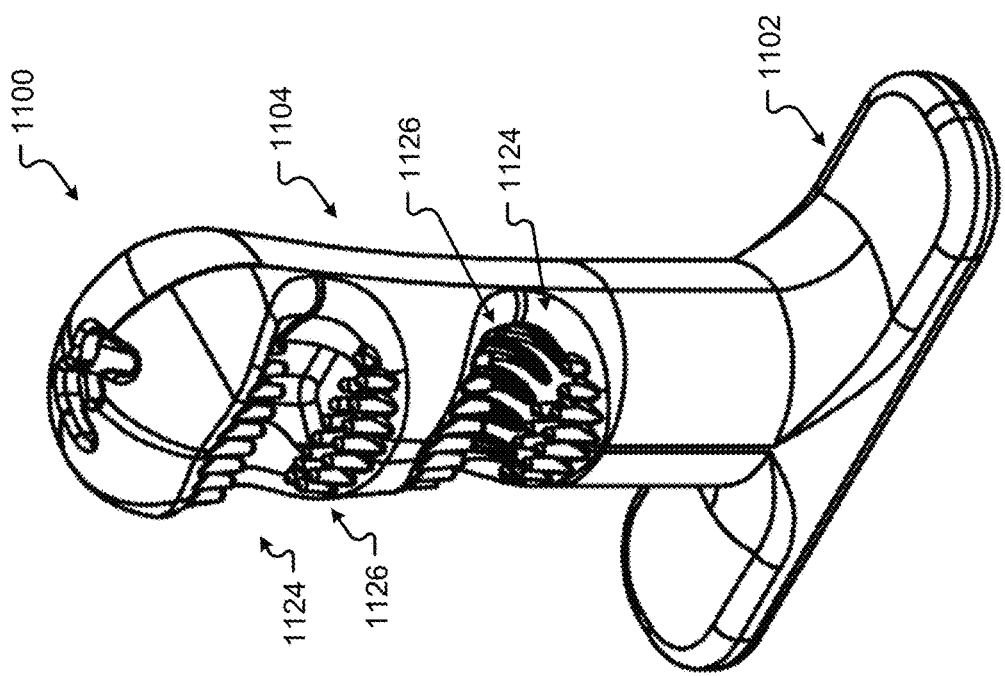
FIG. 11A is a perspective view of a pet dental device according to at least one embodiment of the present disclosure.

In FIGS. 11A-11D, a dental device 1100 according to at least one embodiment of the present disclosure is shown in a perspective view, a side view, a top view, and a bottom view, respectively. The device 1100 includes a base 1102 and an extension 1104 extending from the base 1102. The base 1102 is configured to keep the device 1100 stationary and provides points of contact for the pet's paws such that the pet can hold the device 1100 steady by standing or pressing the base 1102 against the ground. As shown in FIG. 11B, the dental device 1100 may include two cutouts 1124. Further, the cavity 1116 may extend and open into one opening 1124 and not the other opening 1124. It will be appreciated that in other embodiments, the extension 1104 may include one or more cavities 1116, one or more cutouts 1124, and corresponding dental cleaning mechanisms 1126 and the one or more cavities 1116 may extend into any number of cutouts 1124.

Figure 11C:
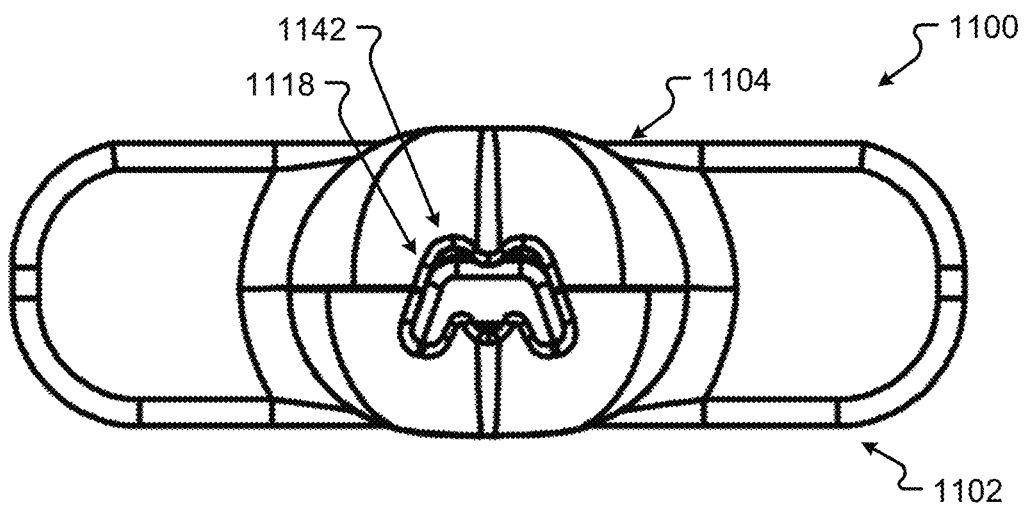
FIG. 11C is a top view of the pet dental device of FIG. 11A according to at least one embodiment of the present disclosure.
Figure 11D:
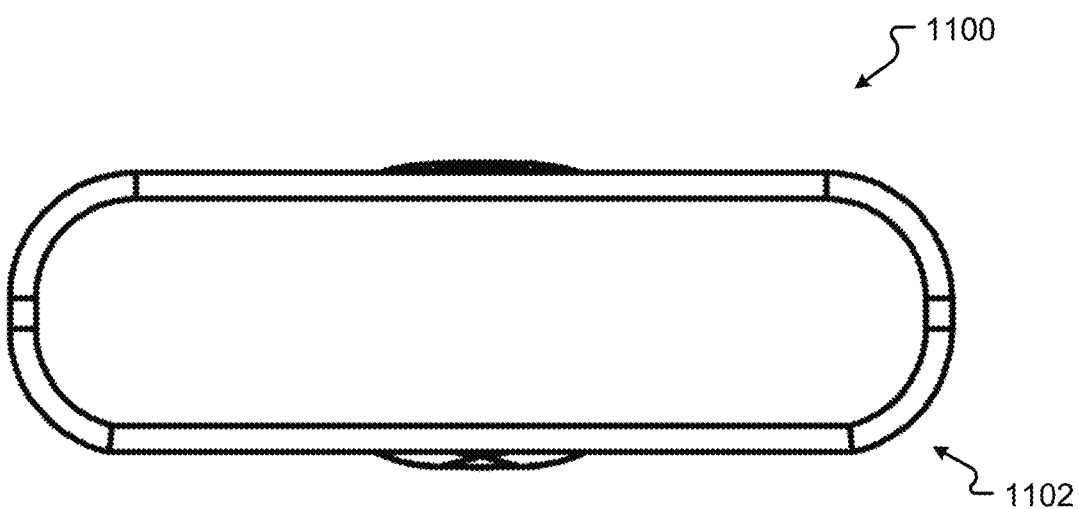
FIG. 11D is a bottom view of the pet dental device of FIG. 11A according to at least one embodiment of the present disclosure.

As shown in FIG. 11C, the dental device 1100 includes an opening 1118 that extends into the cavity 1116 and that enables insertion of a treat 2800, 2900 into the cavity 1116. As previously described, the treat 2800, 2900 may be shaped or formed into the same cross-section as a cross-section 1142 of the opening 1118. As also shown in FIG. 11C and FIG. 11D, the base 1102 is rectangular shaped with rounded corners. It will be appreciated that in other embodiments, the base 1102 may be any shape such as, for example, square, circular, oval, triangular, or the like.

Figure 12:
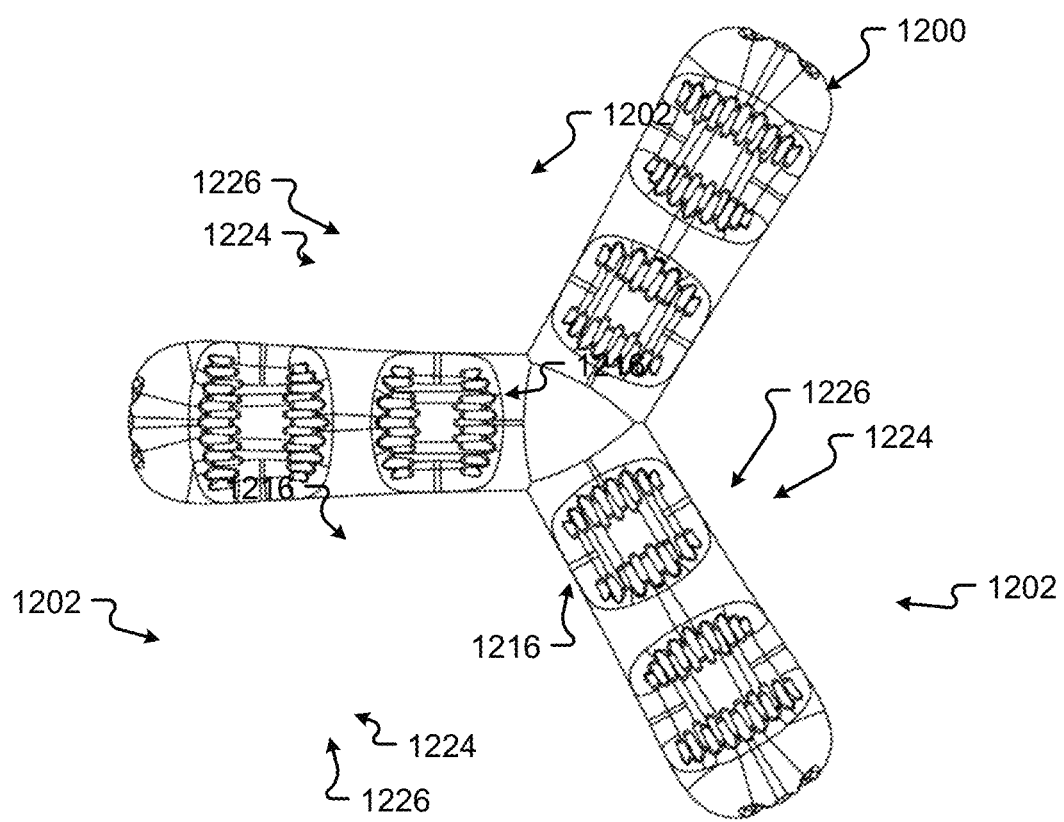
FIG. 12 is an illustration of a dental device according to at least one embodiment of the present disclosure.

In FIG. 12, a dental device 1200 according to at least one embodiment of the present disclosure is shown. The device 1200 includes one or more segments 1202. In the illustrated embodiment the device 1200 includes three segments 1202, though it will be appreciated that the device 1200 can include one segment, two segments, or more than two segments. Each segment 1202 includes one or more cavities 1216, one or more cutouts 1224, and corresponding dental cleaning mechanisms 1226.

Figure 13A:
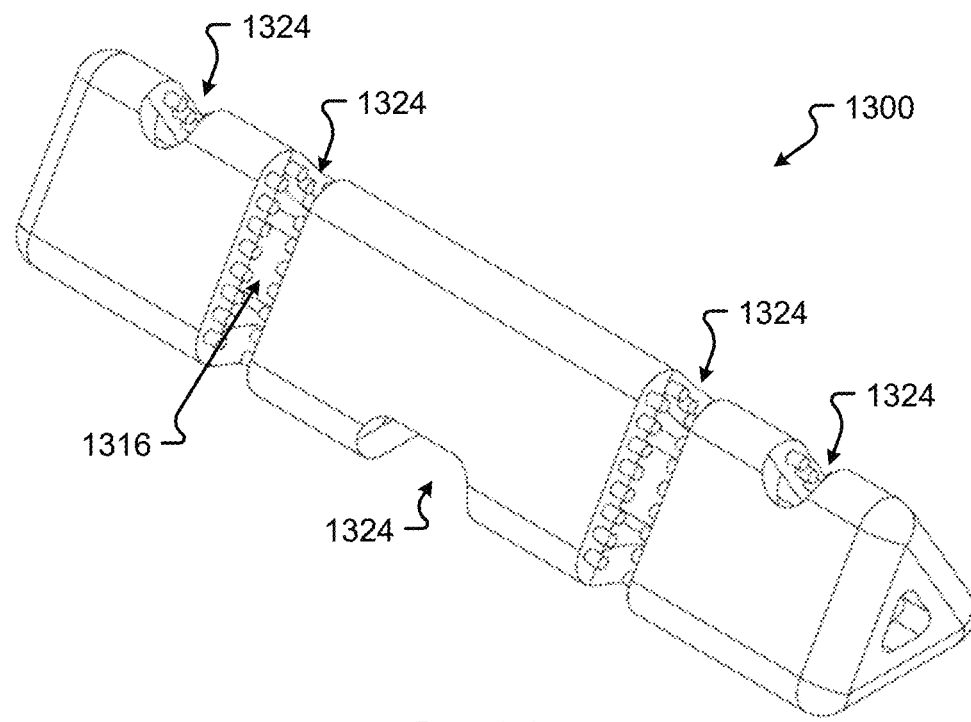
FIG. 13A is an illustration of a dental device according to at least one embodiment of the present disclosure.
Figure 13B:
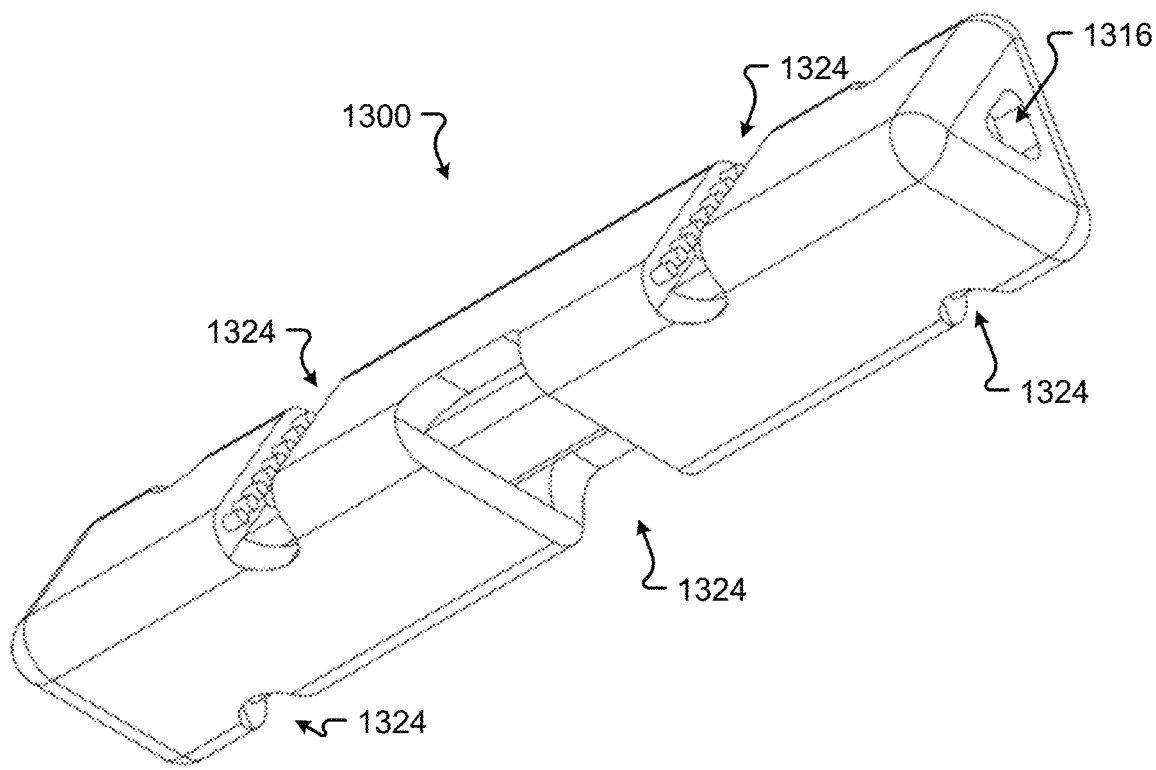
FIG. 13B is a second illustration of the dental device of FIG. 13A according to at least one embodiment of the present disclosure.

In FIGS. 13A-13B, a dental device 1300 according to at least one embodiment of the present disclosure is shown. The device 1300 includes a body having one or more cavities 1316 and one or more cutouts 1224. As shown, the device 1300 has a triangular cross-section having three sides. In other embodiments, the device 1300 may have any cross-section such as, for example, circular, square, rectangular, oval, etc.

Turning to FIGS. 14A-14E, another embodiment of the dental device 1400 according to at least one embodiment of the present disclosure is provided. Generally, the dental device 1400 is the same as or similar to the dental devices 100, 200 except as will be described below.

Figure 14A:
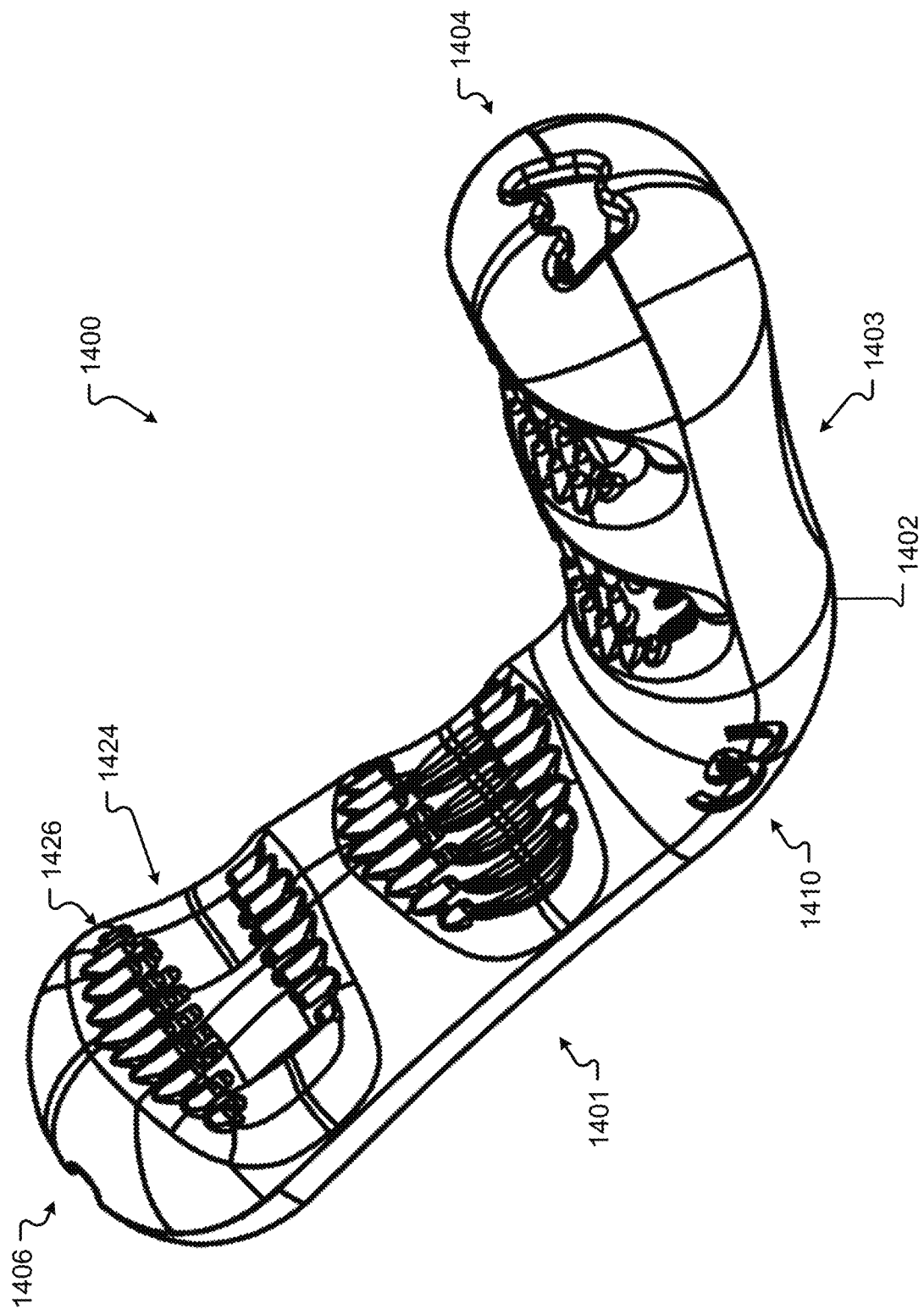
FIG. 14A is a perspective view of a pet dental device according to at least one embodiment of the present disclosure.

In FIG. 14A, the dental device 1400 is shown in a perspective view. The dental device 1400 includes a body 1402 extending from a first end 1404 to a second end 1406. The body 1402 has a first portion 1401 and a second portion 1403 extending from a center portion 1410 between the first end 1404 and the second end 1406, respectively. The first portion 1401 and the second portion 1403 each extend at an angle relative to each other from the center portion 1410 (as also visible in FIGS. 14D-14E). The angle between the first portion 1401 and the second portion 1403 may be, for example, 90 degrees or perpendicular to each other. In other embodiments, the angle between the first portion 1401 and the second portion 1403 may be any angle greater than or less than 90 degrees.

Figure 14B:
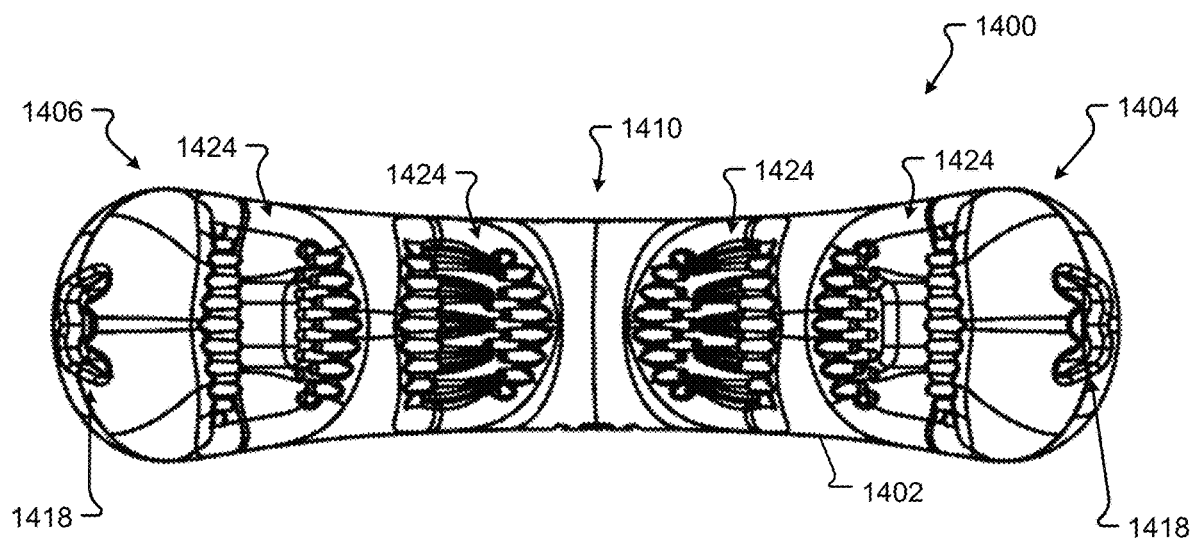
FIG. 14B is a top view of the pet dental device of FIG. 14A according to at least one embodiment of the present disclosure.
Figure 14C:
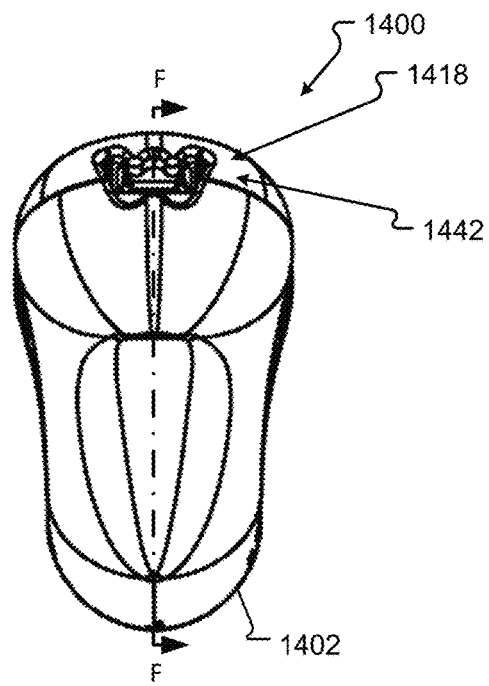
FIG. 14C is a front view of the pet dental device of FIG. 14A according to at least one embodiment of the present disclosure.

Turning to FIGS. 14B-14C a top view and a front view of the dental device 1400 are respectively shown. When viewed from the top or the bottom, the dental device 1400 is generally wider near the first end 1404 or the second end 1406 relative to the center portion 1410. It will be appreciated that the dental device 1400 may be any shape or size. For example, the dental device 1400 may be sized for any sized pet and may include sizes such as, for example, extra small, small, medium, large, or extra large.

As illustrated, the cutout 1424 has an oblong, oval, or rectangular shape, though it will be appreciated that the cutout 1424 may have any shape. The dental cleaning mechanism 1426 may also include a reservoir for distributing cleaning products such as, for example, toothpaste. It will also be appreciated that cleaning products can be directly distributed on the dental cleaning mechanism 1426. For example, in embodiments where the dental cleaning mechanism are bristles, toothpaste may be directly applied to the bristles.

As also illustrated, the dental device 1400 includes four cutouts 1424 total, with two cutouts 1424 on the first portion 1401 and two cutouts 1424 on the second portion 1403. Such configuration may encourage a pet to chew the dental device 1400 at different angles and/or orientations. In other instances, the dental device 1400 may have any number of cutouts 1424 on the first portion 1401 and/or the second portion 1403. The cutouts 1424 may be positioned and sized so as to encourage a pet to chew with different parts of their mouth, thereby cleaning as many of the pet's teeth as possible. For example, cutouts 1424 closer to center portion 1410 encourage chewing with front molars vs cutouts 1424 at the first end 1404 and/or the second end 1406 encourage chewing with back molars.

Turning to FIGS. 14D and 14E, a side view and a side cross-sectional view taken along the line F-F shown in FIG. 14C are respectively shown. The dental device 1400 includes at least one cavity 1416 extending from the first end 1404 or the second end 1406 towards the center portion 1410 and through the body 1402. The at least one cavity 1416 is configured to receive a pet treat 2800, 2900 through an opening 1418 into the first end 1404 or the second end 1406. The at least one cutout 1424 provides access to at least a portion of the pet treat 2800, 2900 disposed in the corresponding cavity 1416. The dental device 1400 further includes at least one set of dental cleaning mechanisms 1426 positioned on at least a portion of a perimeter of the at least one cutout 1424. The dental cleaning mechanism 1426 may include, for example, bristles, nubs, brushes, or any combination thereof.

As shown, in particular in FIG. 14E, the cavity 1416 may extend to a first cutout 1424A and not the second cutout 1424B. It will be appreciated that in other embodiments, the cavity 1416 may extend to any number of cutouts 1424. As previously described, the cavity 1416 opens to the first end 1404 and/or the second end 1406 through a cavity opening 1418. A pet treat 2800, 2900 can be inserted through the cavity opening 1418 and into the cavity 1416. As previously described and as shown in FIG. 14C, the cavity opening 1418 may have a first cross-section 1442 having a unique shape such as, for example, the letter "W". In other embodiments, the cavity opening 1418 may have any shape such as, for example, a star, a square, a rectangle, a triangle, etc. The pet treat 2800, 2900 may have a second cross-section 2808, 2908 that is the same shape as the cavity opening 1418 such that the pet treat 2800, 2900 can be inserted into the cavity 1416 via the cavity opening 1418.

Once the pet treat 2800, 2900 is positioned in the cavity 1416, the pet treat 2800, 2900 may be retained by an inner retainer 1446 that extends at an angle into the cavity 1416 and near the cavity opening 1418. The inner retainer 1446 is shaped like a flap, but in other embodiments, the inner retainer 1446 may be any shape. The inner retainer 1446 may be semi-flexible and angled so as to allow the pet treat 2800, 2900 to be inserted into the cavity 1416 even if the pet treat 2800, 2900 is slightly larger than the retaining ledge 1446. The pet treat 2800, 2900 may be sized smaller than the cavity 1416 such that the pet treat 2800, 2900 is loosely held in place so that as a pet is breaking the pet treat 2800, 2900, the pet treat 2800, 2900 slides out via the at least one cut out 1424

In the illustrated embodiment, the cavity 1416 includes a pair of cavities. In such embodiments, a first cavity 1416A of the pair of cavities extends to the first cutout 1424A and a second cavity 1416B of the pair of cavities extends to another of the first cutout 1424A. The first cavity 1416A and the second cavity 1416B do not intersect. Further, the first cavity 1416A and the second cavity 1416B do not contact or reach a center point 1456 of the center portion 1410. It will be appreciated that in other embodiments, the dental device 1400 may include any number of cavities.

Figure 14F:
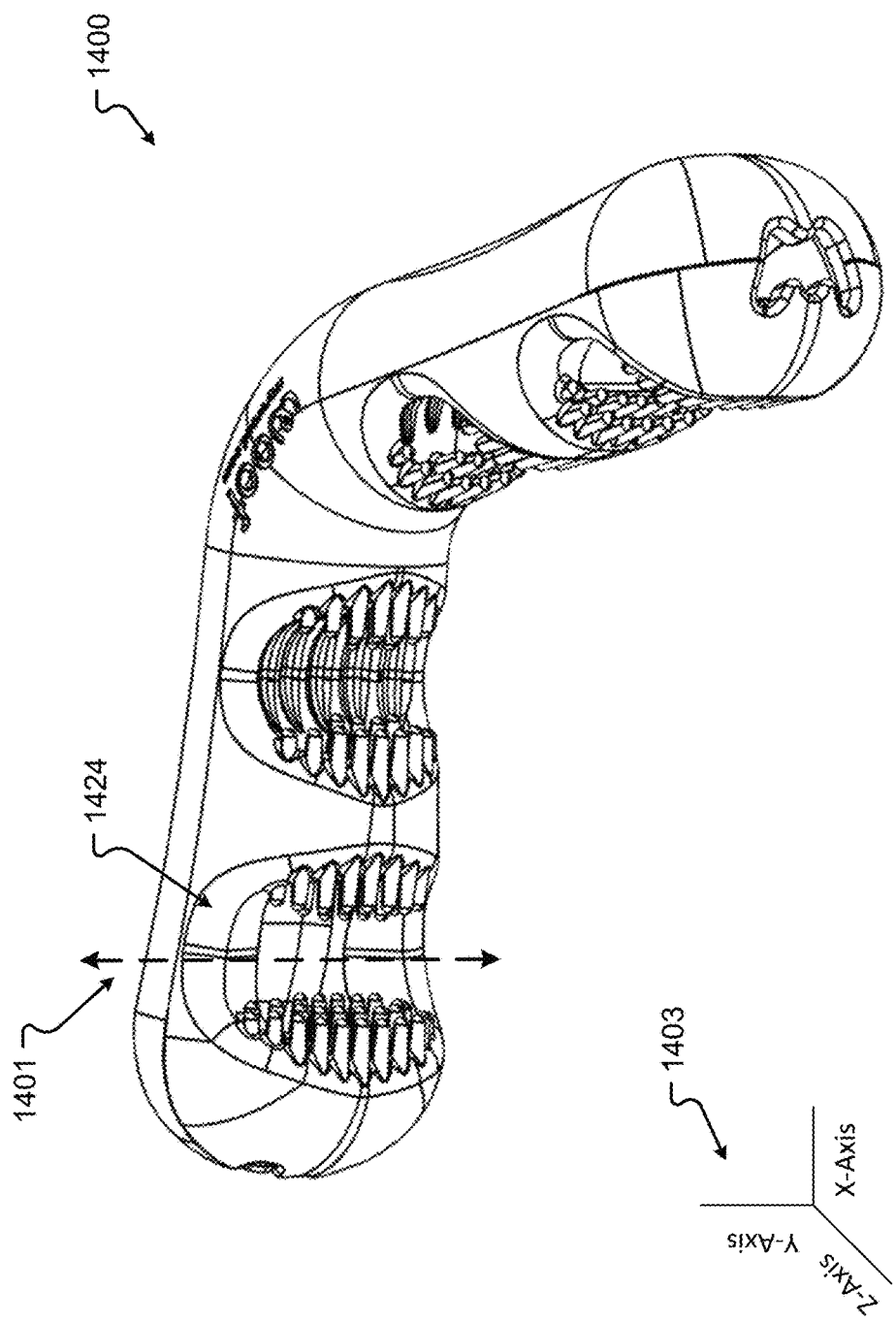
FIG. 14F is a view of a pet dental device of FIG. 14A at rest according to at least one embodiment of the present disclosure.

FIG. 14F is a view of the pet dental device 1400 at rest according to at least one embodiment of the present disclosure. More specifically, when the pet dental device 1400 is at rest, an axis 1401 of the at least one cutout 1424 is perpendicular to a surface of a floor defined by the Z-axis and the X-axis of a 3-axis 1403, as shown. In other instances, the at least one cutout 1424 may face the surface of the floor (and the axis 1401 may be parallel to the surface of the floor). In other words, when the pet dental device 1400 is at rest, the at least one cutout 1424 faces outward or downward and does not face upward. Such configuration encourages a pet to interact with the toy and to move the toy such that the at least one cutout 1424 faces upward and exposes the treat upward. This interaction is beneficial to the pet and provides mental stimulation and enrichment, which encourages the pet to play or interact with the toy for longer durations.

Turning to FIGS. 15A-15D, another embodiment of the dental device 1500 according to at least one embodiment of the present disclosure is provided. Generally, the dental device 1500 is the same as or similar to the dental devices 100, 200 except as will be described below.

Figure 15A:
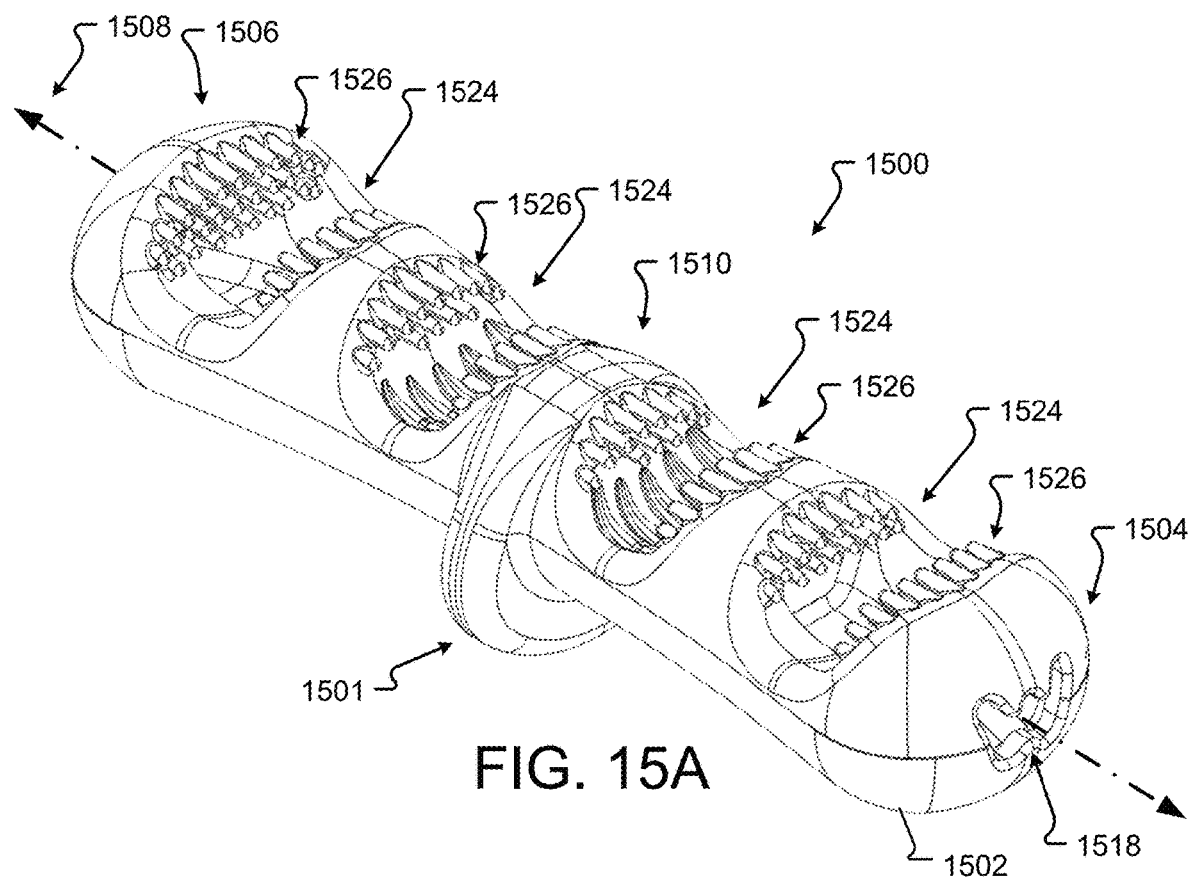
FIG. 15A is a perspective view of a pet dental device according to at least one embodiment of the present disclosure.
Figure 15B:
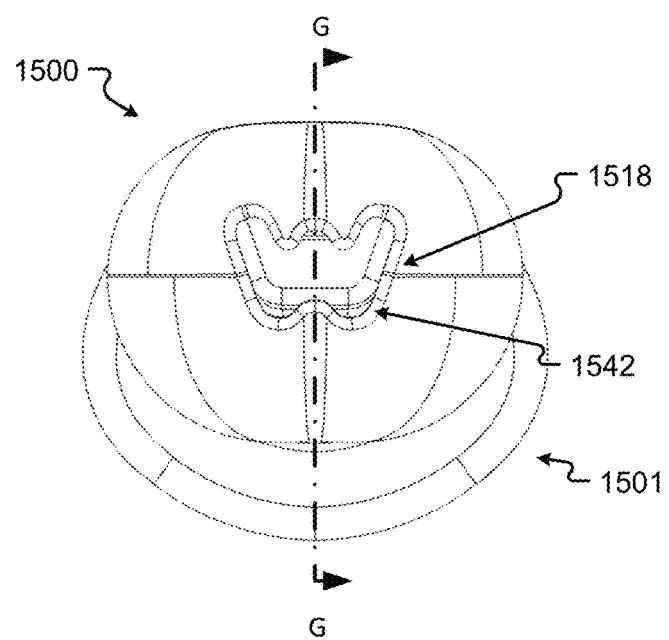
FIG. 15B is a front view of the pet dental device of FIG. 15A according to at least one embodiment of the present disclosure.

In FIG. 15A, the dental device 1500 is shown in a perspective view and in FIG. 15B, the dental device 1500 is shown in a front view. The dental device 1500 includes a body 1502 extending from a first end 1504 to a second end 1506 along a center axis 1508. The dental device 1500 includes an extension 1501 which extends from the body 1502 at a center portion 1510 of the dental device 1500. The extension 1501 may extend perpendicularly relative to the center axis 1508 and partially around the body 1502. In other words, the extension 1501 may extend partially around a perimeter of the body 1502. It will be appreciated that in other embodiments, the extension 1501 may extend around the entire perimeter of the body 1502 (as shown in FIGS. 16A-16D). In the illustrated embodiment, the extension 1501 has a round or oval shape when viewed from the front, as visible in FIG. 15B. It will be appreciated that in other embodiments, the extension 1501 may have any shape. The extension 1501 may enable the dental device 1500 to wobble or otherwise move, which may encourage a pet to play with the dental device 1500. The extension 1501 also provides an additional surface or feature for a pet to play with or chew.

Turning to FIGS. 15C and 15D, a side view and a side cross-sectional view taken along the line G-G shown in FIG. 15B are respectively shown. The dental device 1500 includes at least one cavity 1516 extending from the first end 1504 or the second end 1506 towards the center portion 1510 and through the body 1502. The at least one cavity 1516 is configured to receive a pet treat 2800, 2900 through an opening 1518 into the first end 1504 or the second end 1506. The at least one cutout 1524 provides access to at least a portion of the pet treat 2800, 2900 disposed in the corresponding cavity 1516. The dental device 1500 further includes at least one set of dental cleaning mechanisms 1526 positioned on at least a portion of a perimeter of the at least one cutout 1524. The dental cleaning mechanism 1526 may include, for example, bristles, nubs, brushes, or any combination thereof.

As illustrated and previously described, the cutout 1524 has an oblong, oval, or rectangular shape, though it will be appreciated that the cutout 1524 may have any shape. The dental cleaning mechanism 1526 may also include a reservoir for distributing cleaning products such as, for example, toothpaste. It will also be appreciated that cleaning products can be directly distributed on the dental cleaning mechanism 1526. For example, in embodiments where the dental cleaning mechanism are bristles, toothpaste may be directly applied to the bristles.

As also illustrated, the dental device 1500 includes four cutouts 1524 total, with two cutouts 1524 between the center portion 1510 and the first end 1504 and two cutouts 1524 between the center portion 1510 and the second end 1506. In other instances, the dental device 1500 may have any number of cutouts 1524. The cutouts 1524 may be positioned and sized so as to encourage a pet to chew with different parts of their mouth, thereby cleaning as many of the pet's teeth as possible.

As shown, in particular in FIG. 15D, the cavity 1516 may extend to a first cutout 1524A and not the second cutout 1524B. It will be appreciated that in other embodiments, the cavity 1516 may extend to any number of cutouts 1524. As previously described, the cavity 1516 opens to the first end 1504 and/or the second end 1506 through a cavity opening 1518. A pet treat 2800, 2900 can be inserted through the cavity opening 1518 and into the cavity 1516. As previously described and as shown in FIG. 15C, the cavity opening 1518 may have a first cross-section 1542 having a unique shape such as, for example, the letter "W". In other embodiments, the cavity opening 1518 may have any shape such as, for example, a star, a square, a rectangle, a triangle, etc. The pet treat 2800, 2900 may have a second cross-section 2808, 2908 that is the same shape as the cavity opening 1518 such that the pet treat 2800, 2900 can be inserted into the cavity 1516 via the cavity opening 1518.

In the illustrated embodiment, the cavity 1516 includes a pair of cavities. In such embodiments, a first cavity 1516A of the pair of cavities extends to the first cutout 1524A and a second cavity 1516B of the pair of cavities extends to another of the first cutout 1524A. The first cavity 1516A and the second cavity 1516B do not intersect. Further, the first cavity 1516A and the second cavity 1516B do not contact or reach a center point 1556 of the center portion 1510. It will be appreciated that in other embodiments, the dental device 1500 may include any number of cavities.

Once the pet treat 2800, 2900 is positioned in the cavity 1516, the pet treat 2800, 2900 may be retained by an inner retainer 1546 that extends at an angle into the cavity 1516 and near the cavity opening 1518. The inner retainer 1546 is shaped like a flap, but in other embodiments, the inner retainer 1546 may be any shape. The inner retainer 1546 may be semi-flexible and angled so as to allow the pet treat 2800, 2900 to be inserted into the cavity 1516 even if the pet treat 2800, 2900 is slightly larger than the retaining ledge 1546. The pet treat 2800, 2900 may be sized smaller than the cavity 1516 such that the pet treat 2800, 2900 is loosely held in place so that as a pet is breaking the pet treat 2800, 2900, the pet treat 2800, 2900 slides out via the at least one cut out 1524.

Turning to FIGS. 16A-16D, another embodiment of the dental device 1600 according to at least one embodiment of the present disclosure is provided. Generally, the dental device 1600 is the same as or similar to the dental device 1500 except as will be described below.

Figure 16A:
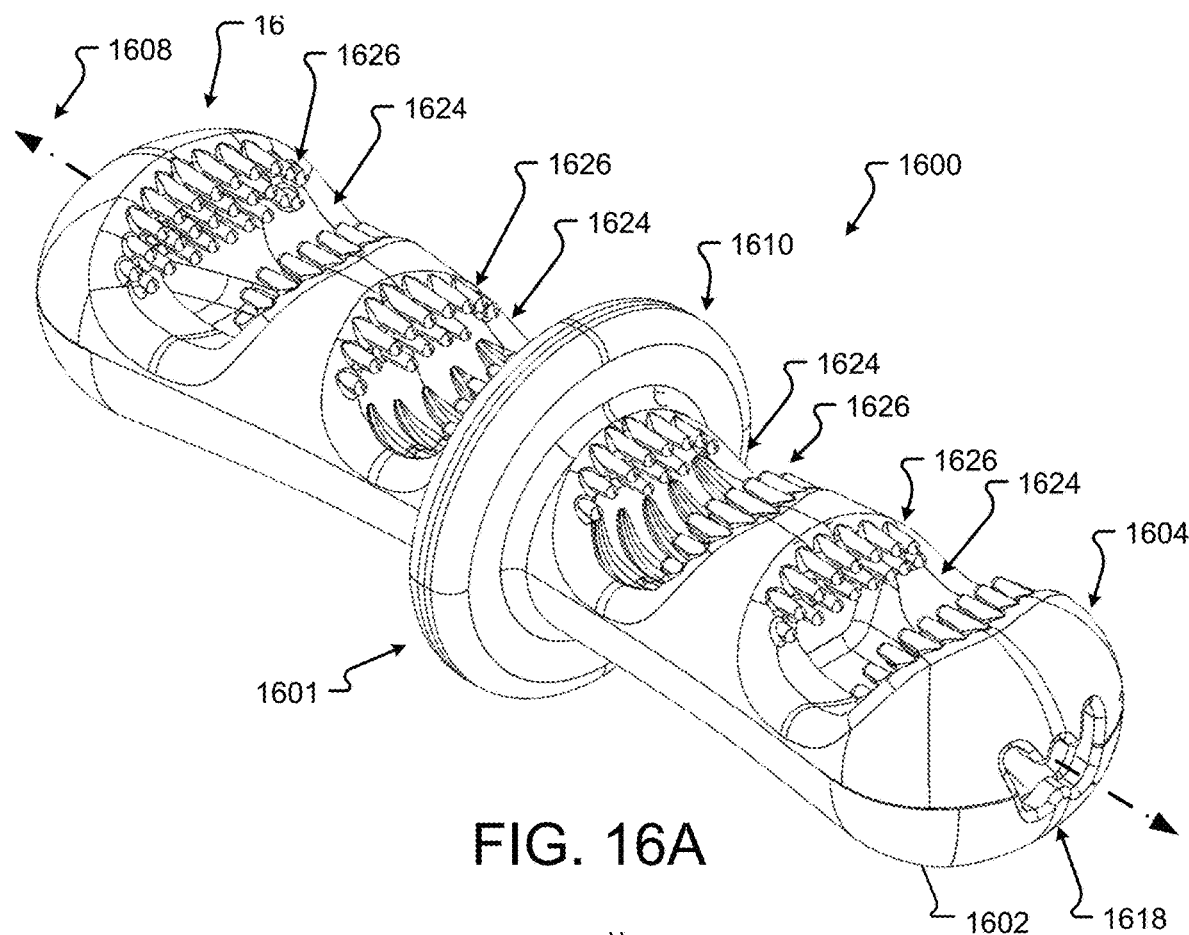
FIG. 16A is a perspective view of a pet dental device according to at least one embodiment of the present disclosure.
Figure 16B:
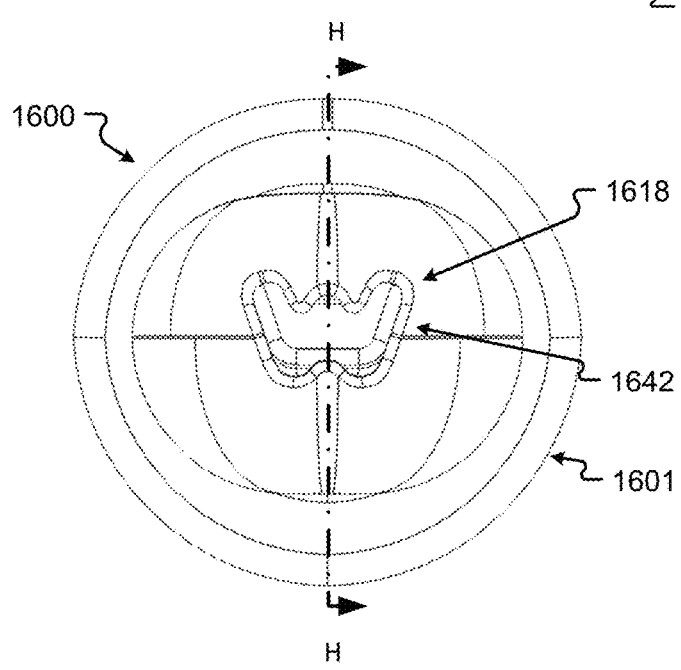
FIG. 16B is a front view of the pet dental device of FIG. 16A according to at least one embodiment of the present disclosure.

In FIG. 16A, the dental device 1600 is shown in a perspective view and in FIG. 16B, the dental device 1600 is shown in a front view. The dental device 1600 includes a body 1602 extending from a first end 1604 to a second end 1606 along a center axis 1608. The dental device 1600 includes an extension 1601 which extends from the body 1602 at a center portion 1610 of the dental device 1600. The extension 1601 may extend perpendicularly relative to the center axis 1608 and around the entire body 1602. In other words, the extension 1601 may extend entirely around a perimeter of the body 1602. It will be appreciated that in other embodiments, the extension 1601 may extend around a portion of the perimeter of the body 1602 (as shown in FIGS. 15A-15D). In the illustrated embodiment, the extension 1601 has a round or oval shape when viewed from the front, as visible in FIG. 16B. It will be appreciated that in other embodiments, the extension 1601 may have any shape. The extension 1601 may enable the dental device 1600 to wobble, which may encourage a pet to play with the dental device 1600. The extension 1601 also provide an additional surface or feature for a pet to play with or chew.

As also illustrated, the dental device 1600 includes four cutouts 1624 total. In other instances, the dental device 1600 may have any number of cutouts 1624. The cutouts 1624 may be positioned and sized so as to encourage a pet to chew with different parts of their mouth, thereby cleaning as many of the pet's teeth as possible. For example, cutouts 1624 closer to center portion 1610 encourage chewing with front molars vs cutouts 1624 at the first end 1604 and/or the second end 1606 encourage chewing with back molars.

Turning to FIGS. 16C and 16D, a side view and a side cross-sectional view taken along the line H-H shown in FIG. 16B are respectively shown. The dental device 1600 includes at least one cavity 1616 extending from the first end 1604 or the second end 1606 towards the center portion 1610 and through the body 1602. The at least one cavity 1616 is configured to receive a pet treat through an opening 1618 into the first end 1604 or the second end 1606. The at least one cutout 1624 provides access to at least a portion of a pet treat disposed in the corresponding cavity 1616. The dental device 1600 further includes at least one set of dental cleaning mechanisms 1626 positioned on at least a portion of a perimeter of the at least one cutout 1624. The dental cleaning mechanism 1626 may include, for example, bristles, nubs, brushes, or any combination thereof.

As illustrated, the cutout 1624 has an oblong, oval, or rectangular shape, though it will be appreciated that the cutout 1624 may have any shape. The dental cleaning mechanism 1626 may also include a reservoir for distributing cleaning products such as, for example, toothpaste. It will also be appreciated that cleaning products can be directly distributed on the dental cleaning mechanism 1626. For example, in embodiments where the dental cleaning mechanism are bristles, toothpaste may be directly applied to the bristles.

As shown, in particular in FIG. 16D, the cavity 1616 may extend to a first cutout 1624A and not the second cutout 1624B. It will be appreciated that in other embodiments, the cavity 1616 may extend to any number of cutouts 1624. As previously described, the cavity 1616 opens to the first end 1604 and/or the second end 1606 through a cavity opening 1618. A pet treat 2800, 2900 can be inserted through the cavity opening 1618 and into the cavity 1616. As previously described and as shown in FIG. 16C, the cavity opening 1618 may have a first cross-section 1642 having a unique shape such as, for example, the letter "W". In other embodiments, the cavity opening 1618 may have any shape such as, for example, a star, a square, a rectangle, a triangle, etc. The pet treat 2800, 2900 may have a second cross-section 2808, 2908 that is the same shape as the cavity opening 1618 such that the pet treat 2800, 2900 can be inserted into the cavity 1616 via the cavity opening 1618.

In the illustrated embodiment, the cavity 1616 includes a pair of cavities. In such embodiments, a first cavity 1616A of the pair of cavities extends to the first cutout 1624A and a second cavity 1616B of the pair of cavities extends to another of the first cutout 1624A. The first cavity 1616A and the second cavity 1616B do not intersect. Further, the first cavity 1616A and the second cavity 1616B do not contact or reach a center point 1656 of the center portion 1610. It will be appreciated that in other embodiments, the dental device 1600 may include any number of cavities.

Once the pet treat 2800, 2900 is positioned in the cavity 1616, the pet treat 2800, 2900 may be retained by an inner retainer 1646 that extends at an angle into the cavity 1616 and near the cavity opening 1618. The inner retainer 1646 is shaped like a flap, but in other embodiments, the inner retainer 1646 may be any shape. The inner retainer 1646 may be semi-flexible and angled so as to allow the pet treat 2800, 2900 to be inserted into the cavity 1616 even if the pet treat 2800, 2900 is slightly larger than the retaining ledge 1646. The pet treat 2800, 2900 may be sized smaller than the cavity 1616 such that the pet treat 2800, 2900 is loosely held in place so that as a pet is breaking the pet treat 2800, 2900, the pet treat 2800, 2900 slides out via the at least one cut out 1624.

Turning to FIGS. 17A-17D, another embodiment of the dental device 1700 according to at least one embodiment of the present disclosure is provided. Generally, the dental device 1700 is the same as or similar to the dental device 100 except as will be described below.

Figure 17A:
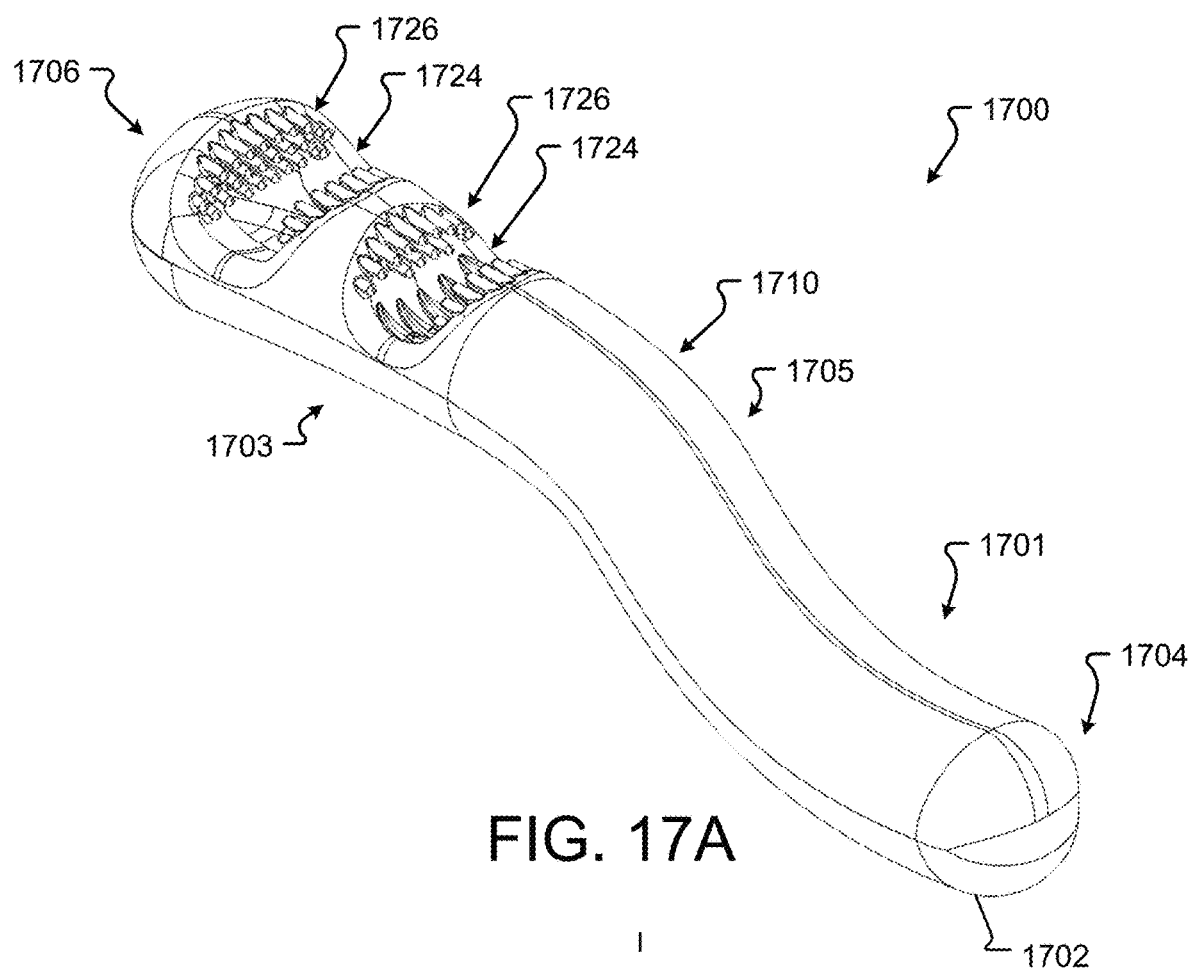
FIG. 17A is a perspective view of a pet dental device according to at least one embodiment of the present disclosure.
Figure 17B:
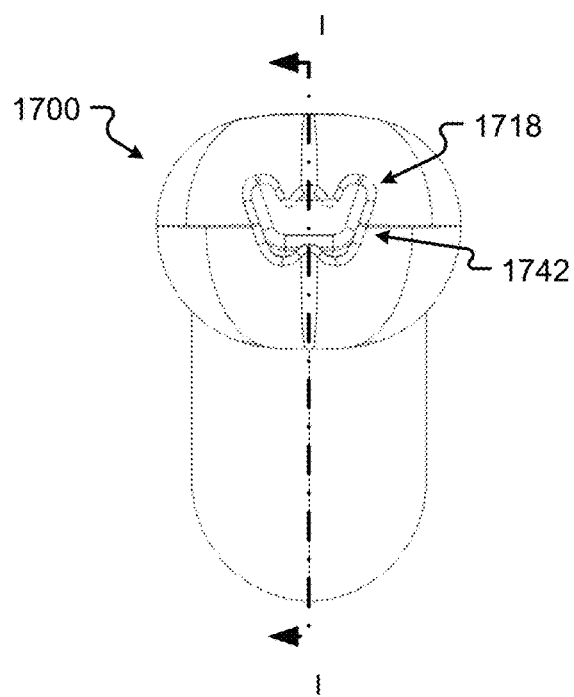
FIG. 17B is a front view of the pet dental device of FIG. 17A according to at least one embodiment of the present disclosure.

In FIG. 17A, the dental device 1700 is shown in a perspective view and in FIG. 17B, the dental device 1700 is shown in a front view. The dental device 1700 includes a body 1702 extending from a first end 1704 to a second end 1706. The body 1702 has a first portion 1701 and a second portion 1703, each extending from a center portion 1710 to the first end 1704 and the second end 1706, respectively. The first portion 1701 and the second portion 1703 extend in planes that are parallel to each other and spaced apart from each other, as visible in FIGS. 17C and 17D. It will be appreciated that the first portion 1701 and the second portion 1703 may extend in planes at an angle to each other and/or adjacent to each other. The dental device 1700 includes a transition portion 1705 at the center portion 1710 and between the first portion 1701 and the second portion 1703. The transition portion 1705 may be curved as shown, though in other embodiments the transition portion 1705 may be angle shape. The shape of the dental device 1700 may encourage a pet to hold and stabilize the dental device 1700 at the first portion 1701 such that the second portion 1703 is raised and closer to the pet's mouth. Thus, the pet can hold the dental device 1700 at the first portion 1701 to chew the second portion 1703.

Turning to FIGS. 17C and 17D, a side view and a side cross-sectional view taken along the line I-I shown in FIG.

17B are respectively shown. The dental device 1700 includes at least one cavity 1716 extending from the second end 1706 towards the center portion 1710 and through the body 1702. It will be appreciated that the at least one cavity 1716 can extend from the first end 1704 or any portion of the dental device 1700. The at least one cavity 1716 is configured to receive a pet treat through an opening 1718 into the second end 1706. The at least one cutout 1724 provides access to at least a portion of a pet treat disposed in the corresponding cavity 1716. The dental device 1700 further includes at least one set of dental cleaning mechanisms 1726 positioned on at least a portion of a perimeter of the at least one cutout 1724. The dental cleaning mechanism 1726 may include, for example, bristles, nubs, brushes, or any combination thereof.

As illustrated, the cutout 1724 has an oblong, oval, or rectangular shape, though it will be appreciated that the cutout 1724 may have any shape. The dental cleaning mechanism 1726 may also include a reservoir for distributing cleaning products such as, for example, toothpaste. It will also be appreciated that cleaning products can be directly distributed on the dental cleaning mechanism 1726. For example, in embodiments where the dental cleaning mechanism are bristles, toothpaste may be directly applied to the bristles.

As also illustrated, the dental device 1700 includes two cutouts 1724 on the second portion 1703. Such configuration may encourage a pet to chew the dental device 1700 at the second portion 1703 while holding the dental device 1700 by the first portion 1701. In other instances, the dental device 1700 may have any number of cutouts 1724 on the first portion 1701 and/or the second portion 1703. The cutouts 1724 may be positioned and sized so as to encourage a pet to chew with different parts of their mouth, thereby cleaning as many of the pet's teeth as possible. For example, cutouts 1724 closer to center portion 1710 encourage chewing with front molars vs cutouts 1724 at the first end 1704 and/or the second end 1706 encourage chewing with back molars.

As shown, in particular in FIG. 17D, the cavity 1716 may extend to a first cutout 1724A and not the second cutout 1724B. It will be appreciated that in other embodiments, the cavity 1716 may extend to any number of cutouts 1724. As previously described, the cavity 1716 opens to the second end 1706 through a cavity opening 1718. A pet treat 2800, 2900 can be inserted through the cavity opening 1718 and into the cavity 1716. As previously described and as shown in FIG. 17C, the cavity opening 1718 may have a first cross-section 1742 having a unique shape such as, for example, the letter "W". In other embodiments, the cavity opening 1718 may have any shape such as, for example, a star, a square, a rectangle, a triangle, etc. The pet treat 2800, 2900 may have a second cross-section 2808, 2908 that is the same shape as the cavity opening 1718 such that the pet treat 2800, 2900 can be inserted into the cavity 1716 via the cavity opening 1718.

Once the pet treat 2800, 2900 is positioned in the cavity 1716, the pet treat 2800, 2900 may be retained by an inner retainer 1746 that extends at an angle into the cavity 1716 and near the cavity opening 1718. The inner retainer 1746 is shaped like a flap, but in other embodiments, the inner retainer 1746 may be any shape. The inner retainer 1746 may be semi-flexible and angled so as to allow the pet treat 2800, 2900 to be inserted into the cavity 1716 even if the pet treat 2800, 2900 is slightly larger than the inner retainer 1746. The pet treat 2800, 2900 may be sized smaller than the cavity 1716 such that the pet treat 2800, 2900 is loosely held in place so that as a pet is breaking the pet treat 2800, 2900, the pet treat 2800, 2900 slides out via the at least one cut out 1724.

Turning to FIGS. 18A-18D, another embodiment of the dental device 1800 according to at least one embodiment of the present disclosure is provided. Generally, the dental device 1800 is the same as or similar to the dental device 1700 except as will be described below.

Figures 18A, 18B:
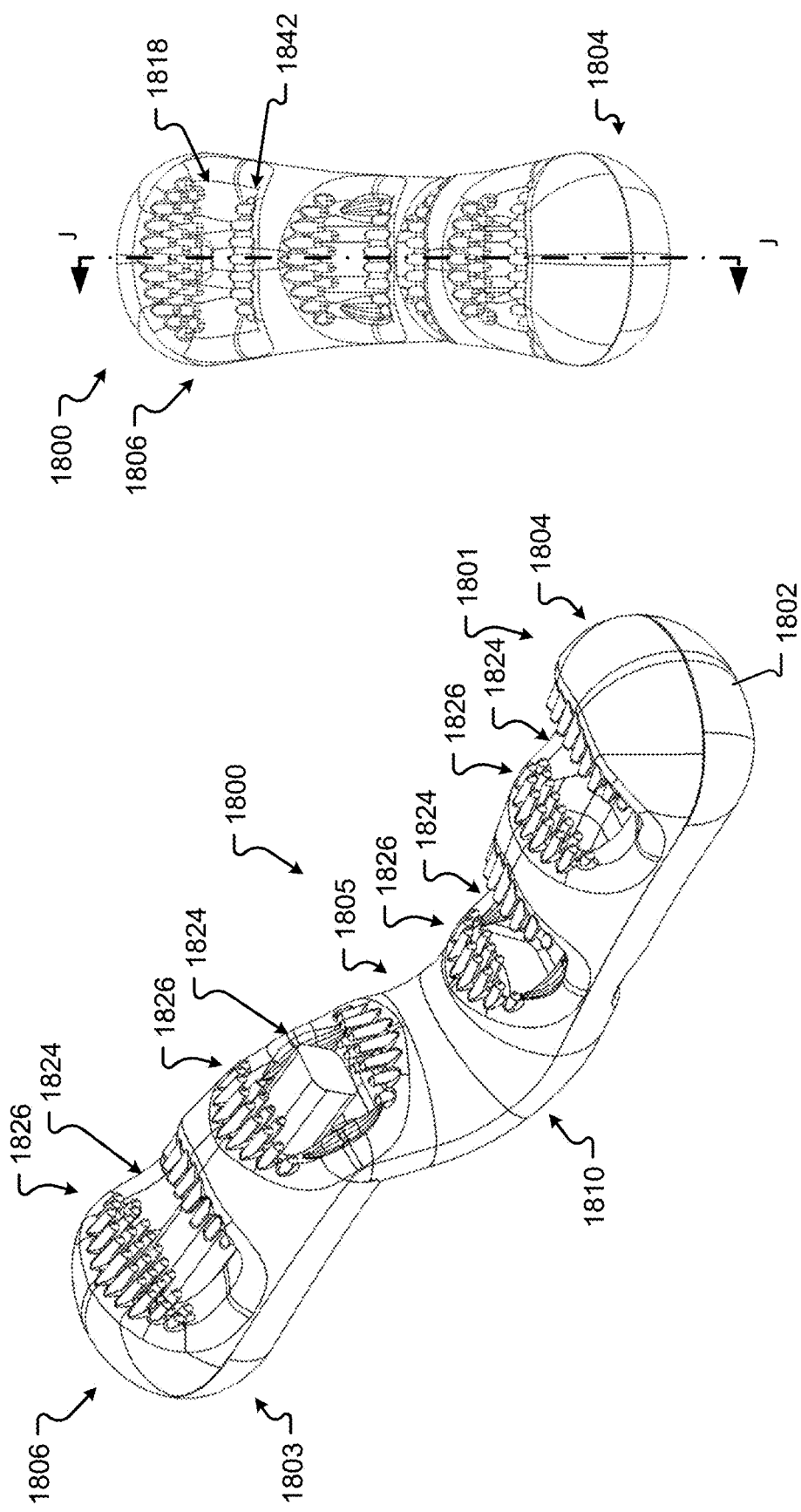
FIG. 18A is a perspective view of a pet dental device according to at least one embodiment of the present disclosure.
FIG. 18B is a top view of the pet dental device of FIG. 18A according to at least one embodiment of the present disclosure.

In FIG. 18A, the dental device 1800 is shown in a perspective view and in FIG. 18B, the dental device 1800 is shown in a front view. The dental device 1800 includes a body 1802 extending from a first end 1804 to a second end 1806. The body 1802 has a first portion 1801 and a second portion 1803, each extending from a center portion 1810 to the first end 1804 and the second end 1806, respectively. The first portion 1801 and the second portion 1803 extend in planes that are parallel to each other and spaced apart from each other, as visible in FIGS. 18C and 18D. It will be appreciated that the first portion 1801 and the second portion 1803 may extend in planes at an angle to each other and/or adjacent to each other. The dental device 1800 includes a transition portion 1805 at the center portion 1810. The transition portion 1805 may be curved as shown, though in other embodiments the transition portion 1805 may be angle shape. The shape of the dental device 1800 may encourage a pet to hold and stabilize the dental device 1800 at the first portion 1801 such that the second portion 1803 is raised and closer to the pet's mouth. Thus, the pet can hold the dental device 1800 at the first portion 1801 to chew the second portion 1803.

Figure 18C:
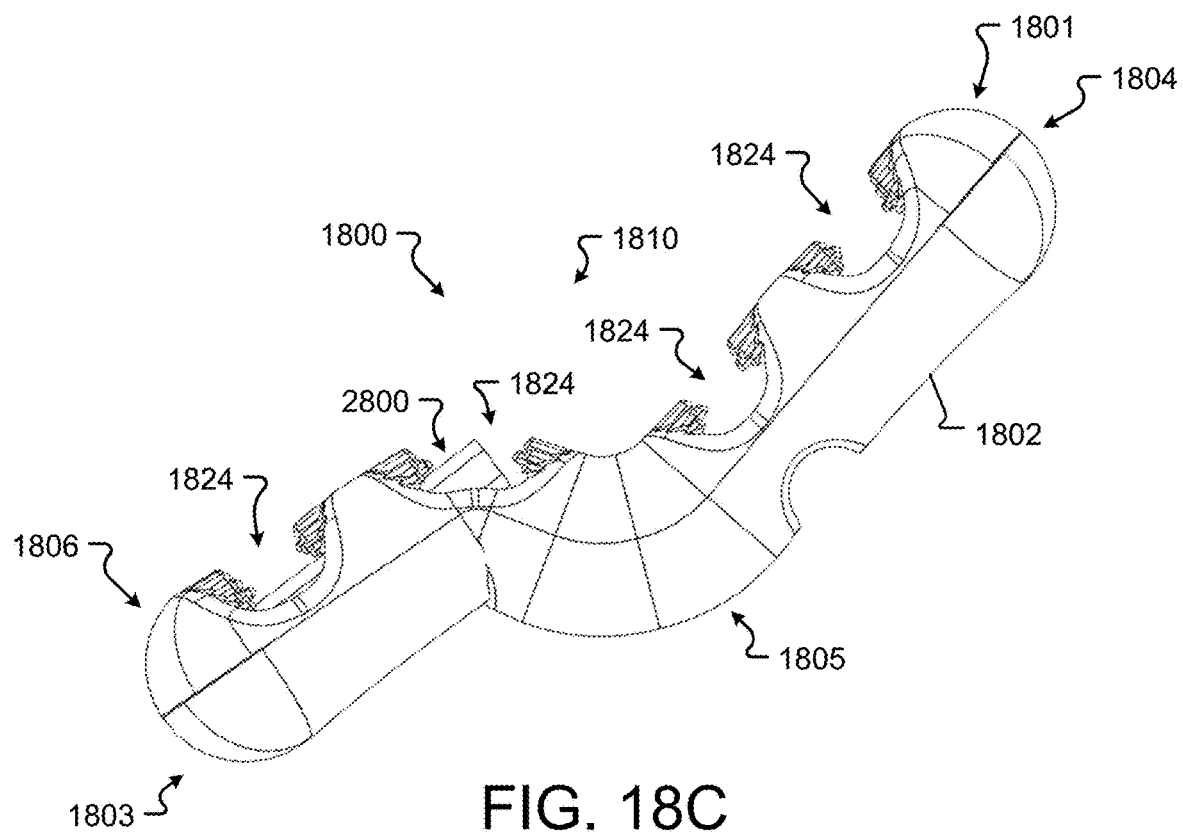
FIG. 18C is a side view of the pet dental device of FIG. 18A according to at least one embodiment of the present disclosure.
Figure 18D:
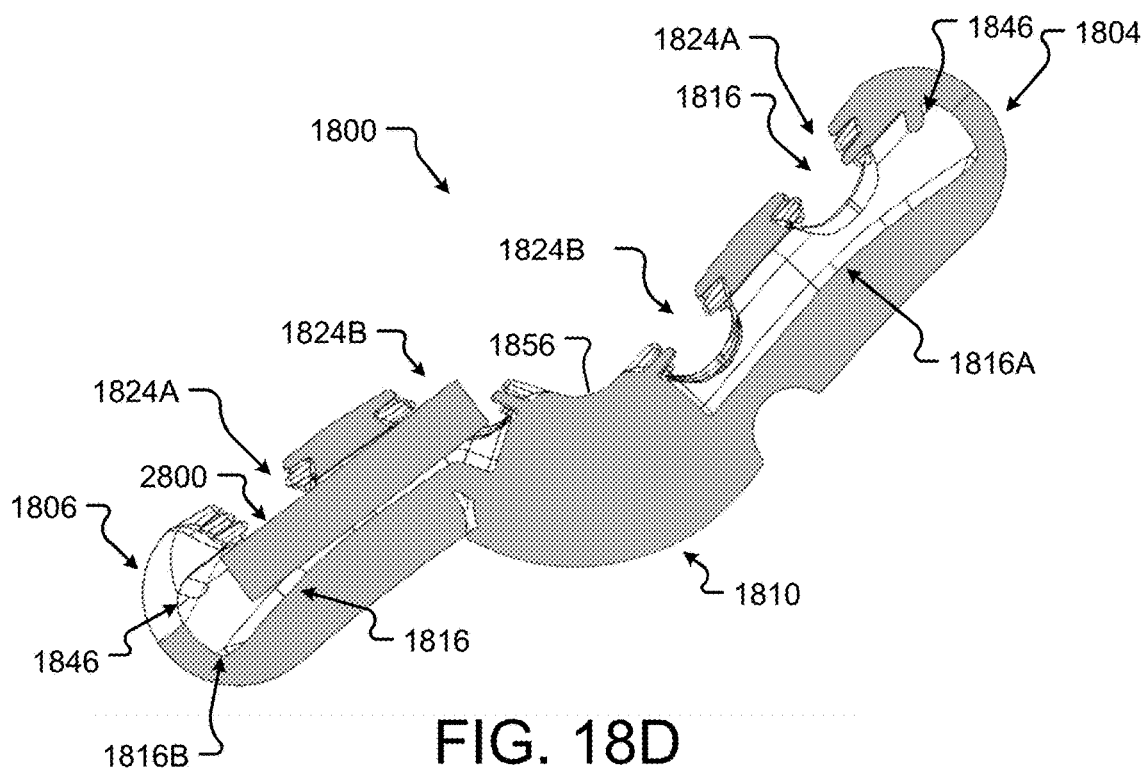
FIG. 18D is a side cross-sectional view of the pet dental device of FIG. 18A taken along line J-J shown in FIG. 18A according to at least one embodiment of the present disclosure.

Turning to FIGS. 18C and 18D, a side view and a side cross-sectional view taken along the line J-J shown in FIG. 18B are respectively shown. The dental device 1800 includes at least one cavity 1816 extending from the first end 1804 and/or the second end 1806 towards the center portion 1810 and through the body 1802. The at least one cavity 1816 is configured to receive a pet treat through an opening 1818 (not shown) into the first end 1804 and/or the second end 1806. The at least one cutout 1824 provides access to at least a portion of a pet treat disposed in the corresponding cavity 1816. The dental device 1800 further includes at least one set of dental cleaning mechanisms 1826 positioned on at least a portion of a perimeter of the at least one cutout 1824. The dental cleaning mechanism 1826 may include, for example, bristles, nubs, brushes, or any combination thereof.

As illustrated, the cutout 1824 has an oblong, oval, or rectangular shape, though it will be appreciated that the cutout 1824 may have any shape. The dental cleaning mechanism 1826 may also include a reservoir for distributing cleaning products such as, for example, toothpaste. It will also be appreciated that cleaning products can be directly distributed on the dental cleaning mechanism 1826. For example, in embodiments where the dental cleaning mechanism are bristles, toothpaste may be directly applied to the bristles.

As also illustrated, the dental device 1800 includes two cutouts 1824 on the first portion 1801 and two cutouts 1824 on the second portion 1803. Such configuration may encourage a pet to chew the dental device 1800 at the second portion 1803 while holding the dental device 1800 by the first portion 1801 or vice versa. In other instances, the dental device 1800 may have any number of cutouts 1824 on the first portion 1801 and/or the second portion 1803. The cutouts 1824 may be positioned and sized so as to encourage a pet to chew with different parts of their mouth, thereby cleaning as many of the pet's teeth as possible. For example, cutouts 1824 closer to center portion 1810 encourage chewing with front molars vs cutouts 1824 at the first end 1804 and/or the second end 1806 encourage chewing with back molars.

As shown, in particular in FIG. 18D, the cavity 1816 may extend to a first cutout 1824A and not the second cutout 1824B. It will be appreciated that in other embodiments, the cavity 1816 may extend to any number of cutouts 1824. As previously described, the cavity 1816 opens to the first end 1804 and/or the second end 1806 through a cavity opening 1818. A pet treat 2800 can be inserted through the cavity opening 1818 and into the cavity 1816. As previously described and as shown in FIG. 18C, the cavity opening 1818 may have a first cross-section 1842 having a unique shape such as, for example, the letter "W". In other embodiments, the cavity opening 1818 may have any shape such as, for example, a star, a square, a rectangle, a triangle, etc. The pet treat 2800, 2900 may have a second cross-section 2808, 2908 that is the same shape as the cavity opening 1818 such that the pet treat 2800, 2900 can be inserted into the cavity 1816 via the cavity opening 1818.

In the illustrated embodiment, the cavity 1816 includes a pair of cavities. In such embodiments, a first cavity 1816A of the pair of cavities extends to the first cutout 1824A and a second cavity 1816B of the pair of cavities extends to another of the first cutout 1824A. The first cavity 1816A and the second cavity 1816B do not intersect. Further, the first cavity 1816A and the second cavity 1816B do not contact or reach a center point 1856 of the center portion 1810. It will be appreciated that in other embodiments, the dental device 1800 may include any number of cavities.

Once the pet treat 2800, 2900 is positioned in the cavity 1818, the pet treat 2800, 2900 may be retained by an inner retainer 1846 that extends at an angle into the cavity 1818 and near the cavity opening 1818. The inner retainer 1846 is shaped like a flap, but in other embodiments, the inner retainer 1846 may be any shape. The inner retainer 1846 may be semi-flexible and angled so as to allow the pet treat 2800, 2900 to be inserted into the cavity 1818 even if the pet treat 2800, 2900 is slightly larger than the retaining ledge 1846. The pet treat 2800, 2900 may be sized smaller than the cavity 1818 such that the pet treat 2800, 2900 is loosely held in place so that as a pet is breaking the pet treat 2800, 2900, the pet treat 2800, 2900 slides out via the at least one cut out 1824.

Figure 19A:
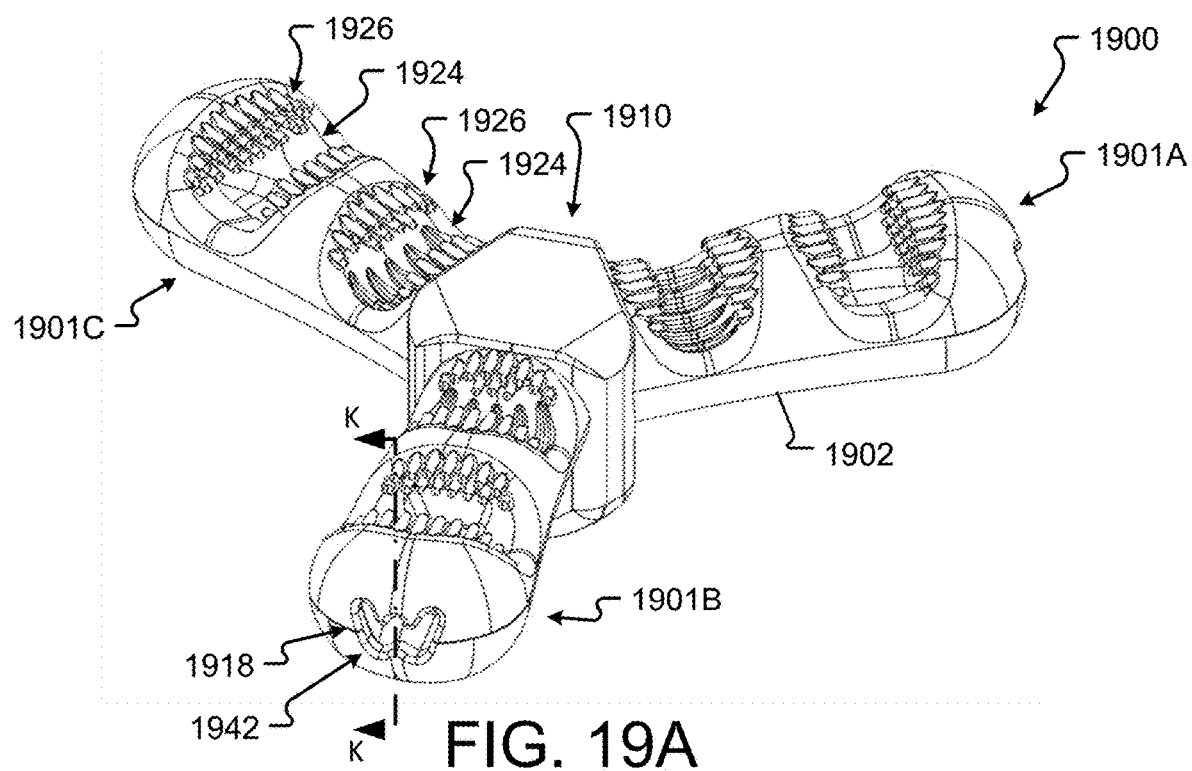
FIG. 19A is a perspective view of a pet dental device according to at least one embodiment of the present disclosure.
Figure 19B:
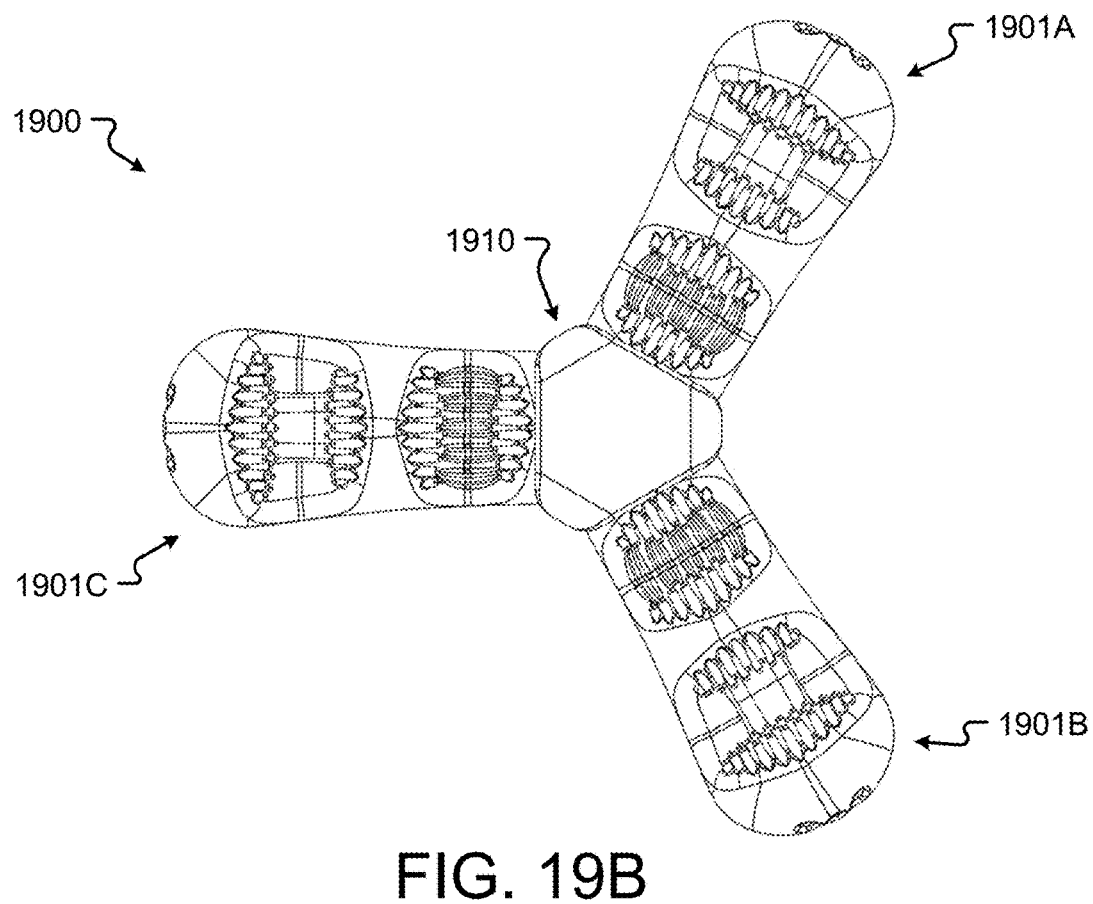
FIG. 19B is a front view of the pet dental device of FIG. 19A according to at least one embodiment of the present disclosure.
Figure 19C:
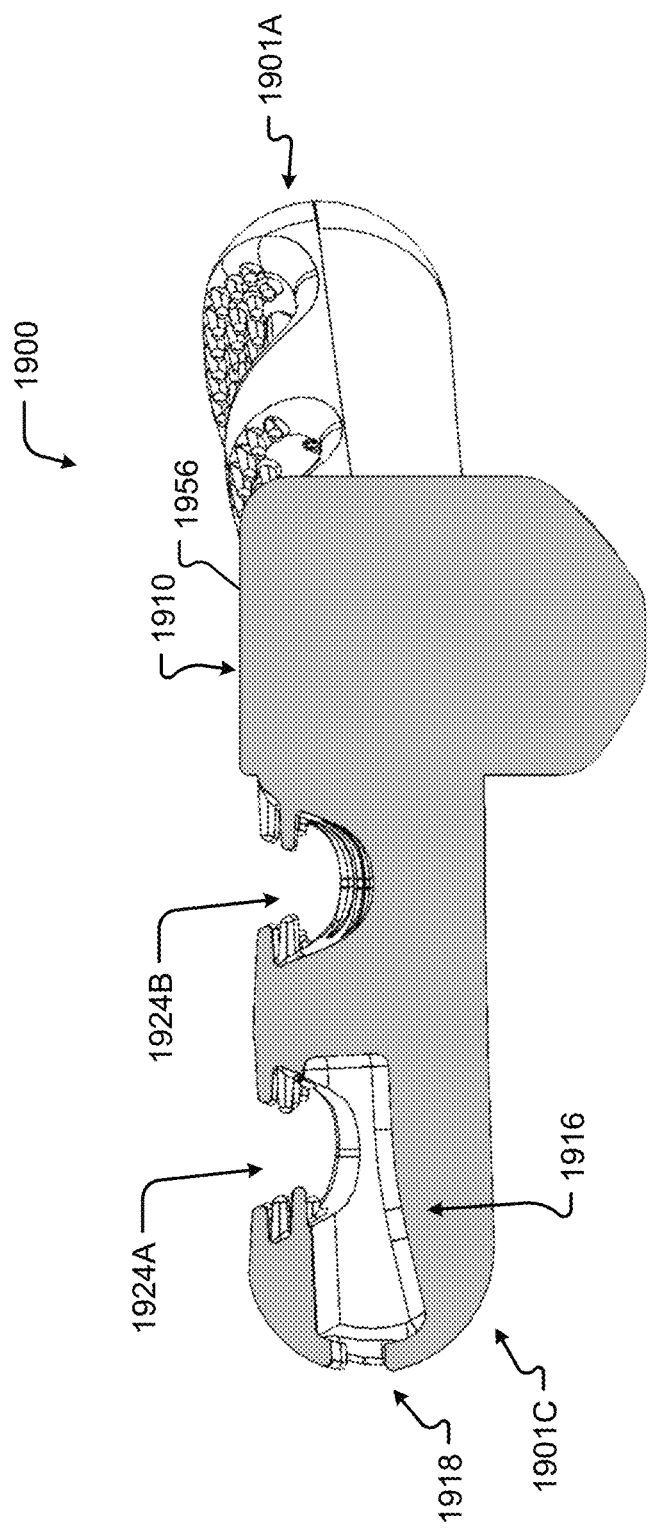
FIG. 19C is a side cross-sectional view of the pet dental device of FIG. 19A taken along line K-K shown in FIG. 19B according to at least one embodiment of the present disclosure.

Turning to FIGS. 19A-19C, another embodiment of the dental device 1900 according to at least one embodiment of the present disclosure is provided. Generally, the dental device 1900 is the same as or similar to the dental devices 100, 200, 1400, etc. except as will be described below.

In FIG. 19A, the dental device 1900 is shown in a perspective view. The dental device 1900 includes a body 1902 having a center portion 1910. The body 1902 has a first portion 1901A, a second portion 1901B, and a third portion 1901C each extending from the center portion 1910. The first portion 1901A, the second portion 1901B, and the third portion 1901C extend at an angle relative to each other from the center portion 1910 (as shown in FIG. 19B). The angle between each portion 1901A, 1901B, and 1901C may be, for example, 120 degrees. In other embodiments, the angle between portion 1901A, 1901B, and 1901C may be any angle greater than or less than 120 degrees. Further the angle between each portion 1901A, 1901B, and 1901C may be different from each other. For example, an angle between the first portion 1901A and the second portion 1901B may be 90 degrees, an angle between the second portion 1901B and the third portion 1901C may be 100 degrees, and an angle between the third portion 1901C and the first portion 1901A may be 170 degrees.

The dental device 1900 includes at least one cavity 1916 extending from an end of the first portion 1901A, the second portion 1901B, and/or the third portion 1901C towards the center portion 1910 and through the body 1902. The at least one cavity 1916 is configured to receive a pet treat through an opening 1918 into the first end 1904 or the second end 1906. The at least one cutout 1924 provides access to at least a portion of a pet treat disposed in the corresponding cavity 1916. The dental device 1900 further includes at least one set of dental cleaning mechanisms 1926 positioned on at least a portion of a perimeter of the at least one cutout 1924. The dental cleaning mechanism 1926 may include, for example, bristles, nubs, brushes, or any combination thereof.

As illustrated, the cutout 1924 has an oblong, oval, or rectangular shape, though it will be appreciated that the cutout 1924 may have any shape. The dental cleaning mechanism 1926 may also include a reservoir for distributing cleaning products such as, for example, toothpaste. It will also be appreciated that cleaning products can be directly distributed on the dental cleaning mechanism 1926. For example, in embodiments where the dental cleaning mechanism are bristles, toothpaste may be directly applied to the bristles.

As also illustrated, the dental device 1900 includes two cutouts 1924 on each portion 1901A, 1901B, and 1901C. In other instances, the dental device 1900 may have any number of cutouts 1924 on each portion 1901A, 1901B, and 1901C. The cutouts 1924 may be positioned and sized so as to encourage a pet to chew with different parts of their mouth, thereby cleaning as many of the pet's teeth as possible. For example, cutouts 1924 closer to center portion 1910 encourage chewing with front molars vs cutouts 1924 at the first end 1904 and/or the second end 1906 encourage chewing with back molars.

Turning to FIG. 19C, a side cross-sectional view taken along the line K-K shown in FIG. 19A is shown. As shown, the cavity 1916 may extend to a first cutout 1924A and not the second cutout 1924B. It will be appreciated that in other embodiments, the cavity 1916 may extend to any number of cutouts 1924. As previously described, the cavity 1916 opens to the first end 1904 and/or the second end 1906 through a cavity opening 1918. A pet treat 2800, 2900 can be inserted through the cavity opening 1918 and into the cavity 1916. As previously described and as shown in FIG. 19A, the cavity opening 1918 may have a first cross-section 1942 having a unique shape such as, for example, the letter "W". In other embodiments, the cavity opening 1918 may have any shape such as, for example, a star, a square, a rectangle, a triangle, etc. The pet treat 2800, 2900 may have a second cross-section 2808, 2908 that is the same shape as the cavity opening 1918 such that the pet treat 2800, 2900 can be inserted into the cavity 1916 via the cavity opening 1918. The pet treat 2800, 2900 may be sized smaller than the cavity 1916 such that the pet treat 2800, 2900 is loosely held in place so that as a pet is breaking the pet treat 2800, 2900, the pet treat 2800, 2900 slides out via the at least one cut out 1924.

In the illustrated embodiment, the cavity 1916 includes three cavities wherein each portion 1901A, 1901B, and 1901C has a cavity 1916. In such embodiments, none of the cavities intersect each other and do not contact or reach a center point 1956 of the center portion 1910. It will be appreciated that in other embodiments, the dental device 1900 may include any number of cavities.

FIGS. 20A-27D describe variations of a cavity that may receive a pet treat 2800, 2900. It will be appreciated that any dental device described herein may include any variation of a cavity described in the FIGS. 20A-27D or in any portion of the present disclosure.

Figure 20A:
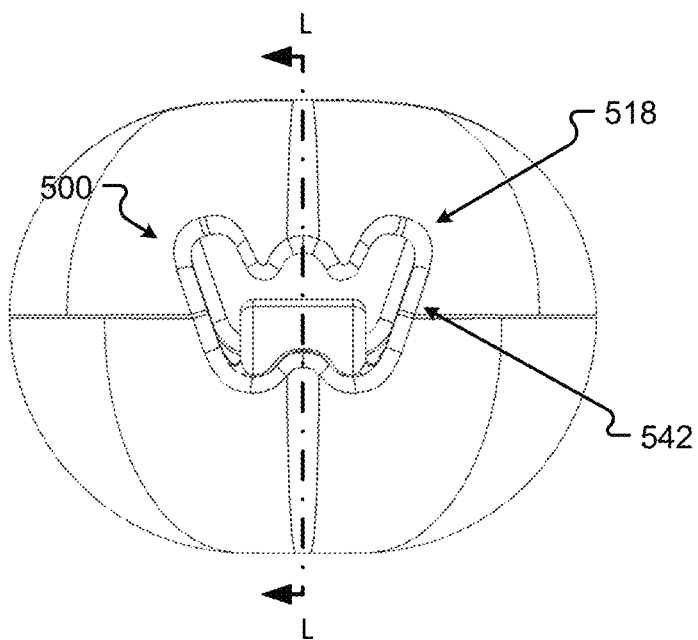
FIG. 20A is a front view of a pet dental device and a retaining flap according to at least one embodiment of the present disclosure.
Figure 20B:
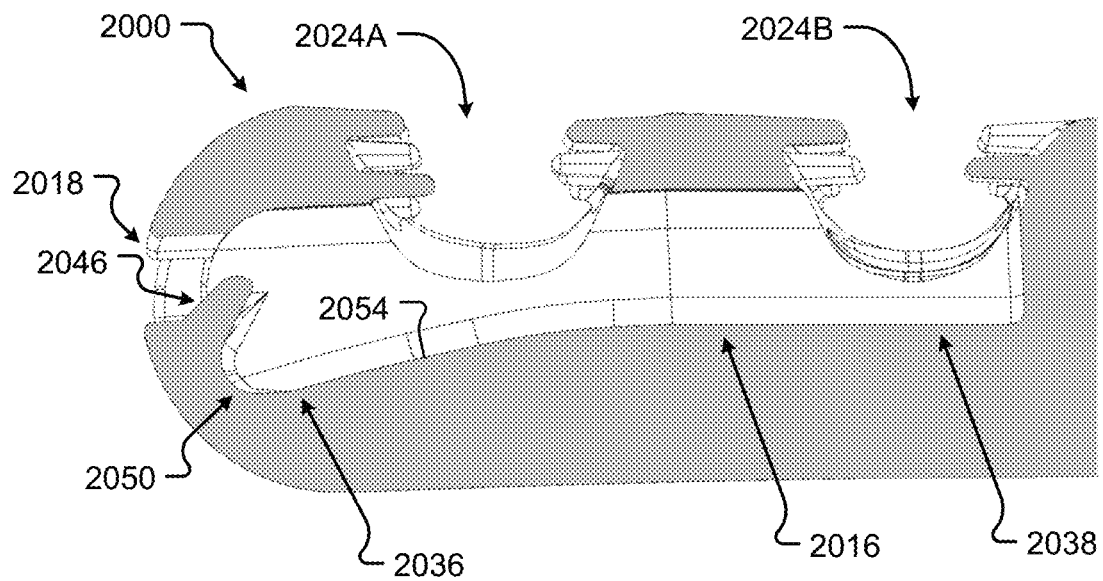
FIG. 20B is a side cross-sectional view of the pet dental device of FIG. 20A taken along line L-L according to at least one embodiment of the present disclosure.

FIG. 20A is a front view of a pet dental device 2000 and an inner retainer 2046 and FIG. 20B is a side cross-sectional view of the pet dental 2000 device of FIG. 20A taken along line L-L. As shown, a cavity 2016 of the pet dental device 200 extends from a first cavity end 2036 to a second cavity end 2038. The cavity 2016 opens into a first cutout 2024A and a second cutout 2024B, though it will be appreciated that the cavity 2016 may open to any number of cutouts. The cavity 2016 also includes an opening 2018 through which a pet treat 2800, 2900 can be inserted through. As shown, the cavity 2016 includes an inner retainer 2046 in the shape of an angled flap that is angled away from the opening 2018. The inner retainer 2046 is positioned near a bottom surface 2054 of the cavity 2016. The inner retainer 2046 also partially defines a trough 2050 such that after the treat 2800, 2900 is slid over the inner retainer 2046 an end of the treat 2800, 2900 may be captured and positioned in the trough 2050. Once the treat 2800, 2900 is captured in the trough 2050, the treat 2800, 2900 may be secured in the cavity 2016 by the trough 2050 and the inner retainer 2046. The trough 2050 also extends below the opening 2018 such that the treat 2800, 2900 can also be retained in the through 2050 without the inner retainer 2046, as shown in FIGS. 21A-21D.

Figure 21B:
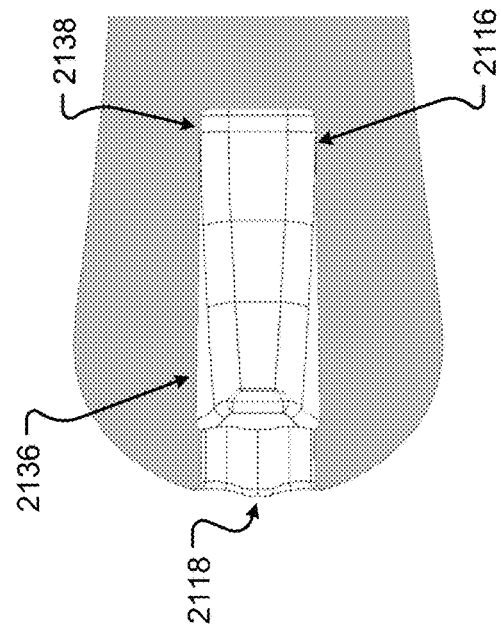
FIG. 21B is a top cross-sectional view of the pet dental device of FIG. 21A according to at least one embodiment of the present disclosure.
Figure 21D:
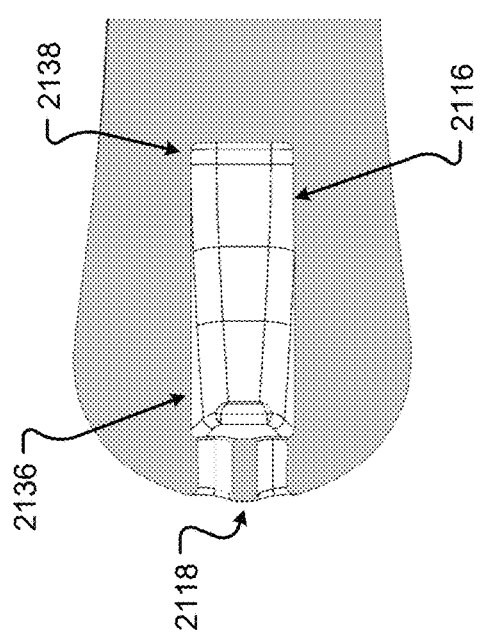
FIG. 21D is a top cross-sectional view of the pet dental device of FIG. 21C according to at least one embodiment of the present disclosure.
Figure 21A:
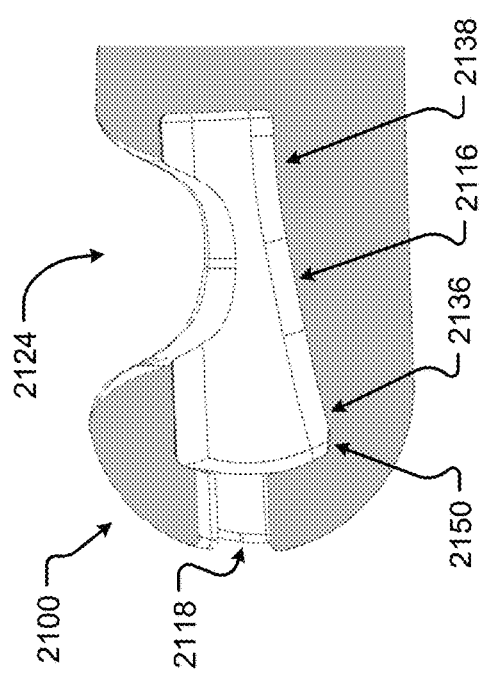
FIG. 21A is a side cross-sectional view of an end of a pet dental device highlighting a cavity of the pet dental device according to at least one embodiment of the present disclosure.
Figure 21C:
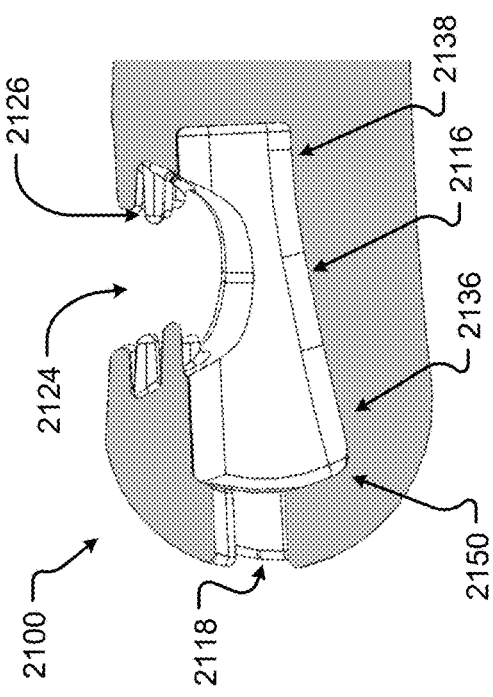
FIG. 21C is a side cross-sectional view of the pet dental device of FIG. 21A with bristles according to at least one embodiment of the present disclosure.

FIG. 21A is a side cross-sectional view of an end of a pet dental device 2100 highlighting a cavity 2116 of the pet dental device; FIG. 21B is a top cross-sectional view of the pet dental device 2100 of FIG. 21A; FIG. 21C is a side cross-sectional view of the pet dental device 2100 of FIG. 21A with a dental cleaning mechanism 2126; and FIG. 21D is a top cross-sectional view of the pet dental device of FIG. 21C. The dental device 2100 is generally the same as or similar to the dental device 2000, except that the dental device 2100 does not include an inner retainer. The cavity 2116 of the pet dental device 210 extends from a first cavity end 2136 to a second cavity end 2138. The cavity 2116 opens into a cutout 2124, though it will be appreciated that the cavity 2116 may open to any number of cutouts. The cavity 2116 also includes an opening 2118 through which a pet treat 2800, 2900 can be inserted through. As shown, the cavity 2116 also includes a trough 2150 such that after the treat 2800, 2900 is slid or pushed into the cavity 2116 an end of the treat 2800, 2900 may be captured and positioned in the trough 2150. Once the treat 2800, 2900 is captured in the trough 2150, the treat 2800, 2900 may be secured in the cavity 2116 by the trough 2150.

Figure 22B:
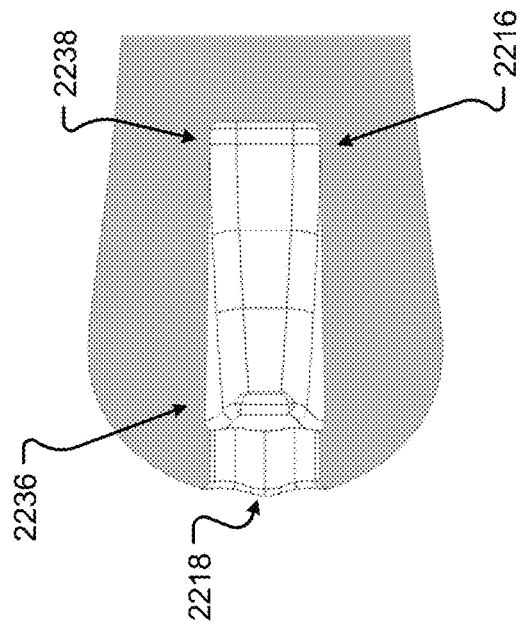
FIG. 22B is a top cross-sectional view of the pet dental device of FIG. 22A according to at least one embodiment of the present disclosure.
Figure 22D:
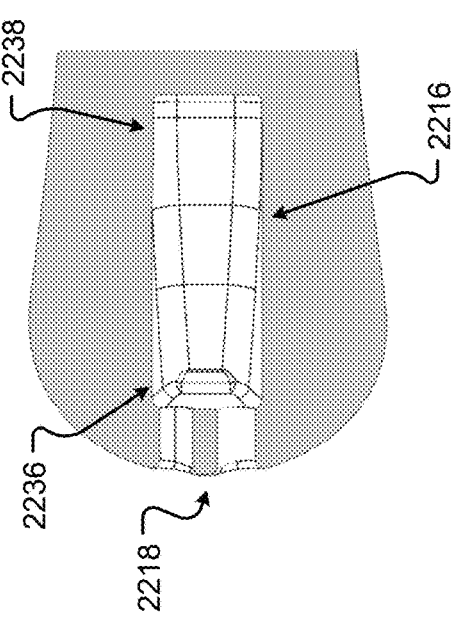
FIG. 22D is a top cross-sectional view of the pet dental device of FIG. 22C according to at least one embodiment of the present disclosure.
Figure 22A:
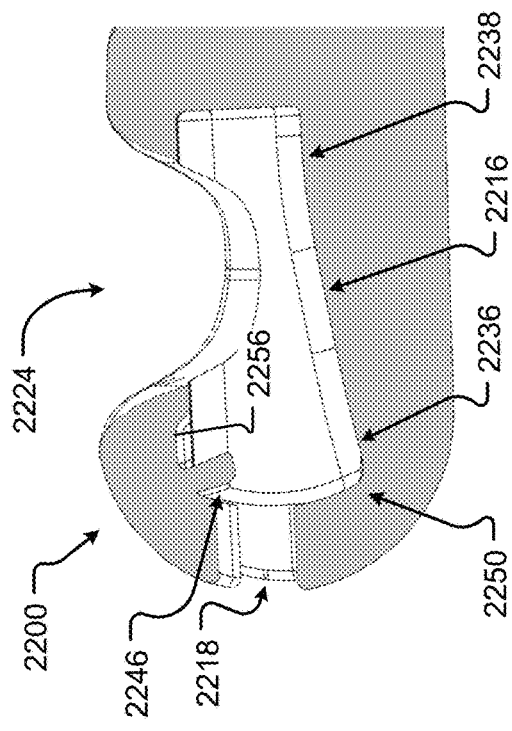
FIG. 22A is a side cross-sectional view of an end of a pet dental device highlighting a cavity of the pet dental device according to at least one embodiment of the present disclosure.
Figure 22C:
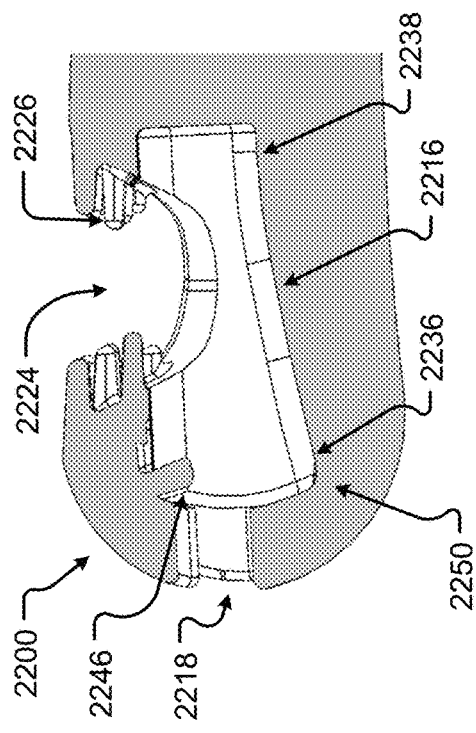
FIG. 22C is a side cross-sectional view of the pet dental device of FIG. 22A with bristles according to at least one embodiment of the present disclosure.

FIG. 22A is a side cross-sectional view of an end of a pet dental device highlighting a cavity of the pet dental device; FIG. 22B is a top cross-sectional view of the pet dental device of FIG. 22A; FIG. 22C is a side cross-sectional view of the pet dental device of FIG. 22A with a dental cleaning mechanism 2226; and FIG. 22D is a top cross-sectional view of the pet dental device of FIG. 22C. The dental device 2200 is generally the same as or similar to the dental device 2000 and 2100, except that the dental device 2200 includes an inner retainer 2246 near an upper surface 2256 of the cavity 2216. More specifically, the cavity 2216 of the pet dental device 220 extends from a first cavity end 2236 to a second cavity end 2238. The cavity 2216 opens into a cutout 2224, though it will be appreciated that the cavity 2216 may open to any number of cutouts. The cavity 2216 also includes an opening 2218 through which a pet treat 2800, 2900 can be inserted through. As shown, the cavity 2216 also includes the inner retainer 2246 which may take the form of an angled flat, though the inner retainer 2246 may be any shape. The cavity 2216 also includes a trough 2250 such that after the treat 2800, 2900 is slid or pushed into the cavity 2216 an end of the treat 2800, 2900 may be captured and positioned in the trough 2250. Once the treat 2800, 2900 is captured in the trough 2250, the treat 2800, 2900 may be secured in the cavity 2216 by the trough 2250 and/or the inner retainer 2246.

FIG. 23A is a side cross-sectional view of an end of a pet dental device highlighting a cavity of the pet dental device; FIG. 23B is a top cross-sectional view of the pet dental device of FIG. 23A; FIG. 23C is a side cross-sectional view of the pet dental device of FIG. 23A with a dental cleaning mechanism 2326; and FIG. 23D is a top cross-sectional view of the pet dental device of FIG. 23C. The dental device 2300 is generally the same as or similar to the dental device 2100 and includes a ledge 2352. More specifically, the cavity 2316 of the pet dental device 230 extends from a first cavity end 2336 to a second cavity end 2338. The cavity 2316 opens into a cutout 2324, though it will be appreciated that the cavity 2316 may open to any number of cutouts. The cavity 2316 also includes an opening 2318 through which a pet treat 2800, 2900 can be inserted through. As shown, the cavity 2316 also includes the ledge 2352 which extends from the opening 2318 to a trough 2350. The ledge 2352 may help prevent a treat 2800, 2900 from moving out of the cavity 2316 via the opening 2318. More specifically, after the treat 2800, 2900 is slid or pushed into the cavity 2316 an end of the treat 2800, 2900 may be captured and positioned in the trough 2350. Once the treat 2800, 2900 is captured in the trough 2350, the treat 2800, 2900 may be secured in the cavity 2316 by the trough 2350 and by the ledge 2352.

FIG. 24A is a side cross-sectional view of an end of a pet dental device highlighting a cavity of the pet dental device; FIG. 24B is a top cross-sectional view of the pet dental device of FIG. 24A; FIG. 24C is a side cross-sectional view of the pet dental device of FIG. 24A with a dental cleaning mechanism 2426; and FIG. 24D is a top cross-sectional view of the pet dental device of FIG. 24C. The dental device 2400 is generally the same as or similar to the dental device 2200 and 2300. More specifically, the cavity 2416 of the pet dental device 240 extends from a first cavity end 2436 to a second cavity end 2438. The cavity 2416 opens into a cutout 2424, though it will be appreciated that the cavity 2416 may open to any number of cutouts. The cavity 2416 also includes an opening 2418 through which a pet treat 2800, 2900 can be inserted through. As shown, the cavity 2416 also includes the ledge 2452 which extends from the opening 2418 to a trough 2450. The ledge 2452 may help prevent a treat 2800, 2900 from moving out of the cavity 2416 via the opening 2418. More specifically, after the treat 2800, 2900 is slid or pushed into the cavity 2416 an end of the treat 2800, 2900 may be captured and positioned in the trough 2450. Additionally, the dental device 2400 may include an inner retainer 2446 positioned near an upper surface 2456 of the cavity 2416. Once the treat 2800, 2900 is captured in the trough 2450, the treat 2800, 2900 may be secured in the cavity 2416 by the trough 2450, the ledge 2452, and the inner retainer 2446.

Figure 25B:
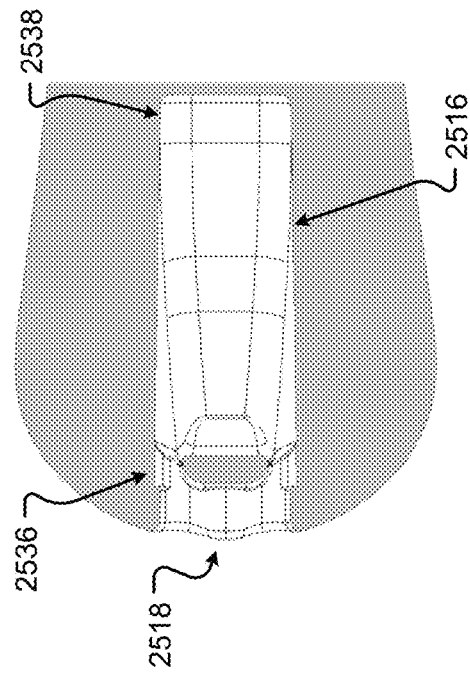
FIG. 25B is a top cross-sectional view of the pet dental device of FIG. 25A according to at least one embodiment of the present disclosure.
Figure 25D:
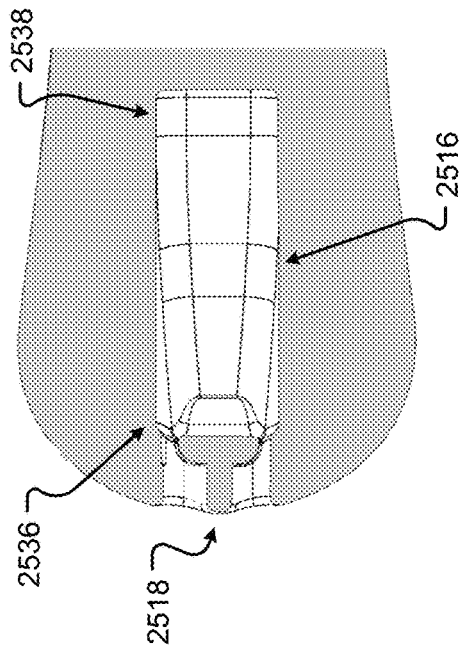
FIG. 25D is a top cross-sectional view of the pet dental device of FIG. 25C according to at least one embodiment of the present disclosure.
Figure 25A:
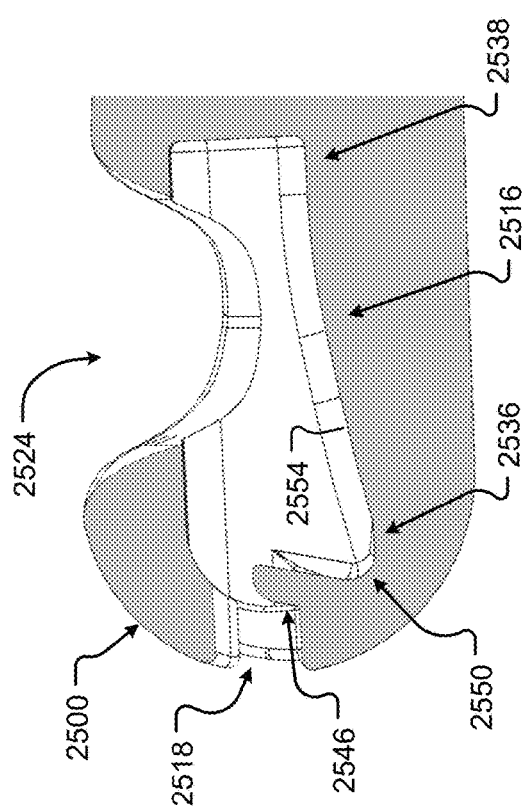
FIG. 25A is a side cross-sectional view of an end of a pet dental device highlighting a cavity of the pet dental device according to at least one embodiment of the present disclosure.
Figure 25C:
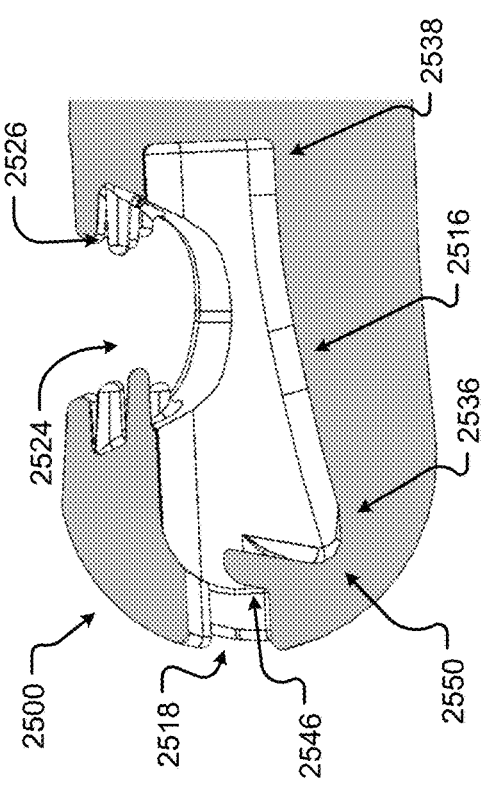
FIG. 25C is a side cross-sectional view of the pet dental device of FIG. 25A with bristles according to at least one embodiment of the present disclosure.

FIG. 25A is a side cross-sectional view of an end of a pet dental device highlighting a cavity of the pet dental device; FIG. 25B is a top cross-sectional view of the pet dental device of FIG. 25A; FIG. 25C is a side cross-sectional view of the pet dental device of FIG. 25A with a dental cleaning mechanism 2526; and FIG. 25D is a top cross-sectional view of the pet dental device of FIG. 25C. The dental device 2400 is generally the same as or similar to the dental device 2000. As shown, a cavity 2516 of the pet dental device 250 extends from a first cavity end 2536 to a second cavity end 2538. The cavity 2516 opens into a cutout 2524, though it will be appreciated that the cavity 2516 may open to any number of cutouts. The cavity 2516 also includes an opening 2518 through which a pet treat 2800, 2900 can be inserted through. As shown, the cavity 2516 includes an inner retainer 2546 in the shape of an angled flap that is angled away from the opening 2518. The inner retainer 2546 is positioned near a bottom surface 2554 of the cavity 2516. The inner retainer 2546 also partially defines a trough 2550 such that after the treat 2800, 2900 is slid over the inner retainer 2546 an end of the treat 2800, 2900 may be captured and positioned in the trough 2550. Once the treat 2800, 2900 is captured in the trough 2550, the treat 2800, 2900 may be secured in the cavity 2516 by the trough 2550 and the inner retainer 2546.

Figure 26B:
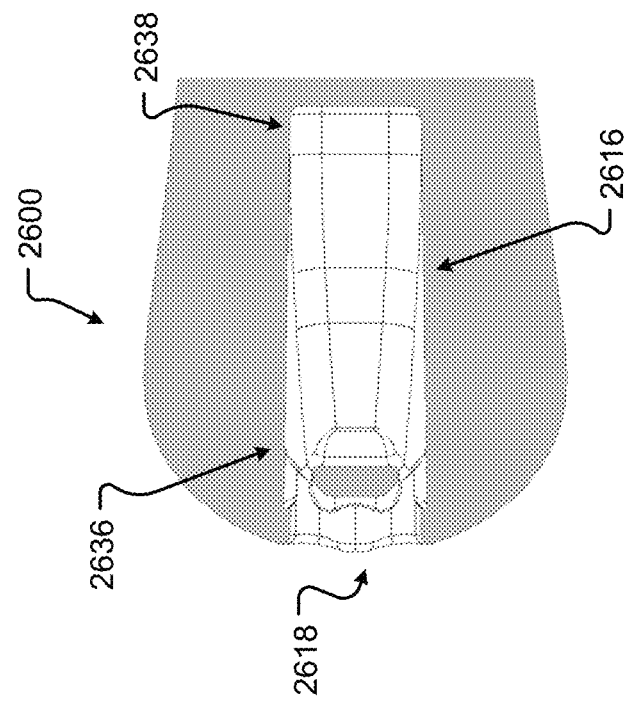
FIG. 26B is a top cross-sectional view of the pet dental device of FIG. 26A according to at least one embodiment of the present disclosure.
Figure 26A:
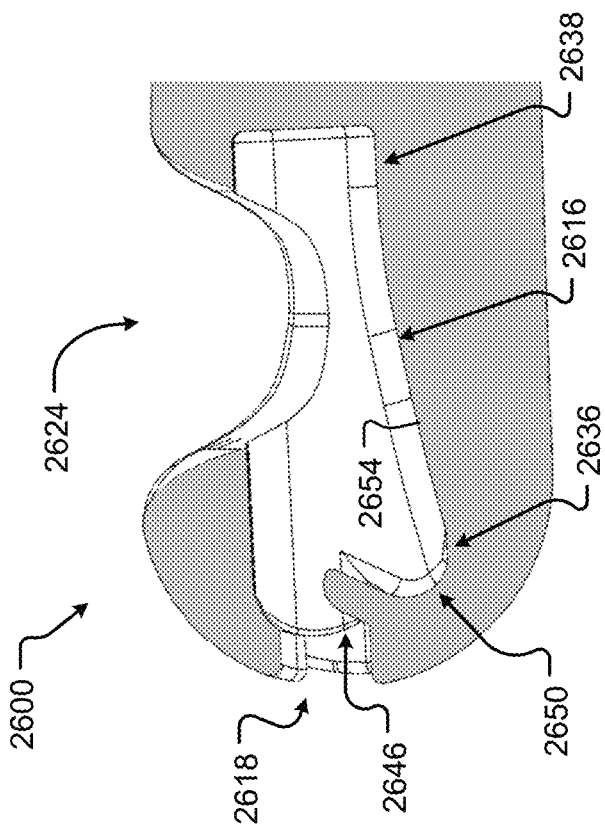
FIG. 26A is a side cross-sectional view of an end of a pet dental device highlighting a cavity of the pet dental device according to at least one embodiment of the present disclosure.

FIG. 26A is a side cross-sectional view of an end of a pet dental device highlighting a cavity of the pet dental device and FIG. 26B is a top cross-sectional view of the pet dental device of FIG. 26A. The dental device 2600 is generally the same as or similar to the dental device 2500. As shown, a cavity 2616 of the pet dental device 260 extends from a first cavity end 2636 to a second cavity end 2638. The cavity 2616 opens into a cutout 2624, though it will be appreciated that the cavity 2616 may open to any number of cutouts. The cavity 2616 also includes an opening 2618 through which a pet treat 2800, 2900 can be inserted through. As shown, the cavity 2616 includes an inner retainer 2646 in the shape of an angled flap that is angled away from the opening 2618. The inner retainer 2646 is positioned near a bottom surface 2654 of the cavity 2616. As illustrated, the inner retainer 2646 is angled more away from the opening 2618 relative to an angle of the inner retainer 2546 relative to the opening 2518 of the dental device 2500. The inner retainer 2646 also partially defines a trough 2650 such that after the treat 2800, 2900 is slid over the inner retainer 2646 an end of the treat 2800, 2900 may be captured and positioned in the trough 2650. Once the treat 2800, 2900 is captured in the trough 2650, the treat 2800, 2900 may be secured in the cavity 2616 by the trough 2650 and the inner retainer 2646.

Figure 27B:
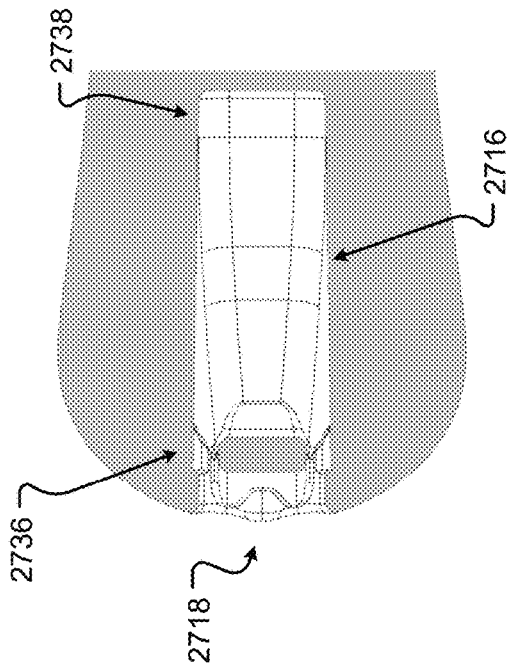
FIG. 27B is a top cross-sectional view of the pet dental device of FIG. 27A according to at least one embodiment of the present disclosure.
Figure 27D:
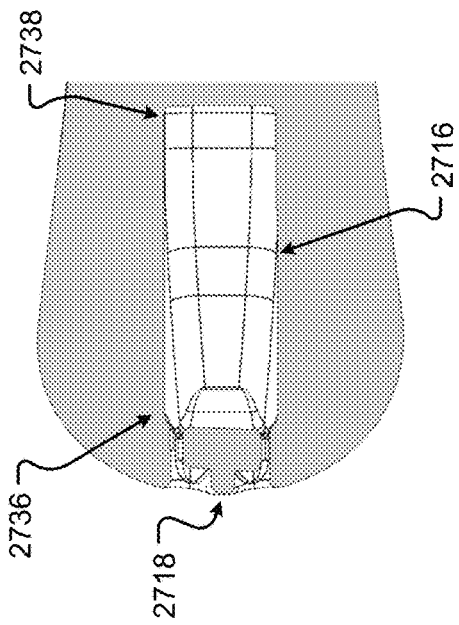
FIG. 27D is a top cross-sectional view of the pet dental device of FIG. 27C according to at least one embodiment of the present disclosure.
Figure 27A:
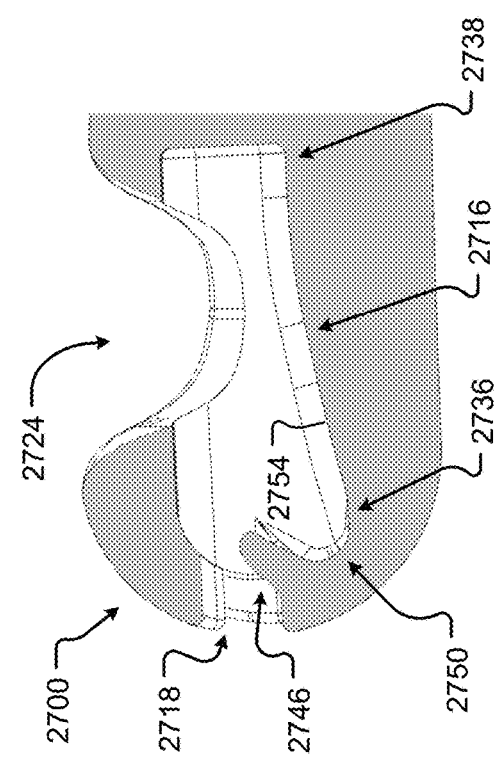
FIG. 27A is a side cross-sectional view of an end of a pet dental device highlighting a cavity of the pet dental device according to at least one embodiment of the present disclosure.
Figure 27C:
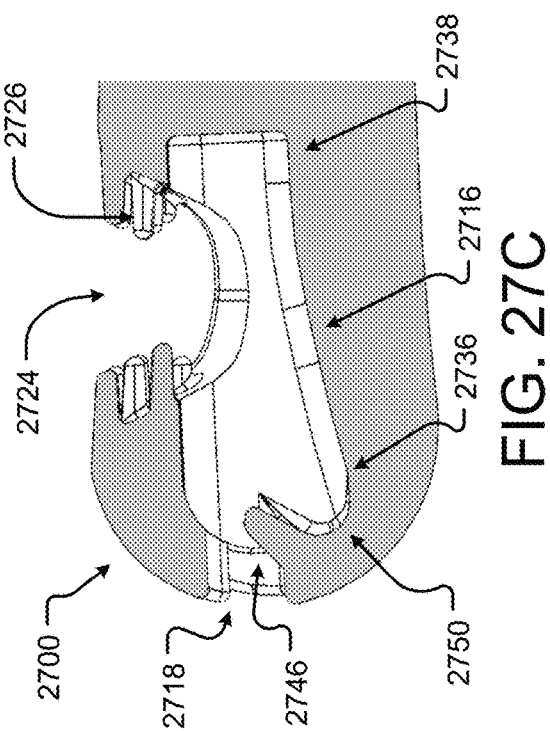
FIG. 27C is a side cross-sectional view of the pet dental device of FIG. 27A with bristles according to at least one embodiment of the present disclosure.

FIG. 27A is a side cross-sectional view of an end of a pet dental device highlighting a cavity of the pet dental device; FIG. 27B is a top cross-sectional view of the pet dental device of FIG. 27A; FIG. 27C is a side cross-sectional view of the pet dental device of FIG. 27A with a dental cleaning mechanism 2726; and FIG. 27D is a top cross-sectional view of the pet dental device of FIG. 27C. The dental device 2700 is generally the same as or similar to the dental device 2500 and 2600. As shown, a cavity 2716 of the pet dental device 270 extends from a first cavity end 2736 to a second cavity end 2738. The cavity 2716 opens into a cutout 2724, though it will be appreciated that the cavity 2716 may open to any number of cutouts. The cavity 2716 also includes an opening 2718 through which a pet treat 2800, 2900 can be inserted through. As shown, the cavity 2716 includes an inner retainer 2746 in the shape of an angled flap that is angled away from the opening 2718. The inner retainer 2746 is positioned near a bottom surface 2754 of the cavity 2716. As illustrated, the inner retainer 2746 is angled more away from the opening 2718 relative to an angle of the inner retainer 2546 relative to the opening 2518 of the dental device 2500 and also an angle of the inner retainer 2646 relative to the opening 2618 of the dental device 2600. The inner retainer 2746 also partially defines a trough 2750 such that after the treat 2800, 2900 is slid over the inner retainer 2746 an end of the treat 2800, 2900 may be captured and positioned in the trough 2750. Once the treat 2800, 2900 is captured in the trough 2750, the treat 2800, 2900 may be secured in the cavity 2716 by the trough 2750 and the inner retainer 2746.

Figures 28A, 28B:
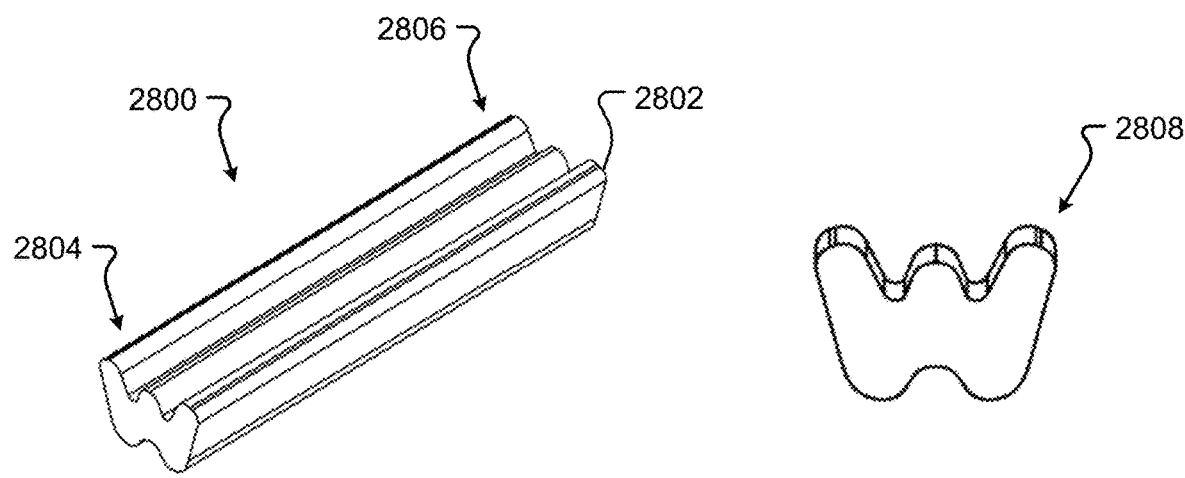
FIG. 28A is an isometric view of a pet treat according to at least one embodiment of the present disclosure.
FIG. 28B is a front view of a pet treat according to at least one embodiment of the present disclosure.
Figures 29A, 29B:
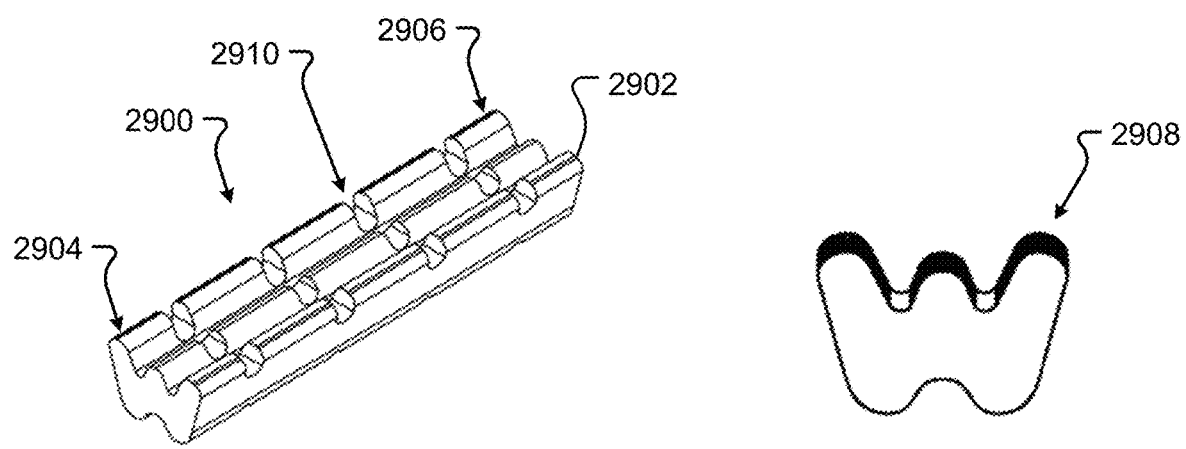
FIG. 29A is an isometric view of a pet treat according to at least one embodiment of the present disclosure.
FIG. 29B is a front view of a pet treat according to at least one embodiment of the present disclosure.

FIGS. 28A-28B illustrate an isometric view and a front view of the pet treat 2800. The pet treat 2800 includes a body 2802 extending from a first end 2804 to a second end 2806 and the second cross-section 2808. As shown the second cross-section 2808 is in the shape of a "W" to match the shape of a cavity opening of any of the dental devices described above. It will be appreciated that in other embodiments, the second cross-section 2808 may be any shape to match the cavity opening. FIGS. 29A-29B illustrate an isometric view and a front view of the pet treat 2900. The pet treat 2900 is the same as the pet treat 2800 except that the pet treat 2900 includes one or more notches 2910 that encourages breaking of the pet treat 2900 at the notches 2910. The pet treat 2900 also includes a body 2902 extending from a first end 2904 to a second end 2906 and the second cross-section 2908. As shown the second cross-section 2908 is in the shape of a "W" to match the shape of a cavity opening of any of the dental devices described above. It will be appreciated that in other embodiments, the second cross-section 2908 may be any shape to match the cavity opening.

As previously described, the pet treat 2800, 2900 may be developed in a way such that it encourages this brushing action with any dental device described above, while also being sufficiently accessible to maintain a pet's interest. It may also be designed to with sufficient exposure to break apart quickly enough to prevent overbrushing. Once consumed, the treat can be replaced with a new treat for a later brushing session.

It will be appreciated that the dental device 100-2700 may be made of any material(s) and any combination of materials. For example, the dental device 100-2700 may be formed of a different material than the body 102-2702 of the dental device 100-2700. In such examples, the dental device 100-2700 may be formed of a material softer than the material of the body 102-1902. In other embodiments, the dental device 100-2700 and the dental cleaning mechanism 126-2726 may be formed from the same material. In any embodiment, the dental cleaning mechanism 126-2726 may be replaceable when the dental cleaning mechanism 126-2726 is worn or otherwise damaged. In other words, the dental cleaning mechanism 126-2726 may be molded separately to the body of the device 100-2700 then joined after. For instance, in embodiments where the dental cleaning mechanism 126-2726 are bristles, the bristles could be formed as a "block" which is then bonded or fused with the basic bone shape. The benefit of this system is that the bristles could be made of a different (ex: softer) material, while the body is made of a harder, more durable material so the pet would get both gentle teeth cleaning and a durable dental device 100-2700. In one embodiment, this "bristle block" may have features to enable it to more easily lock-in, be molded to, or fuse with the main device body. Also, the two components could be made of different materials altogether (ex: silicone bristles and a vulcanized rubber body).

It will also be appreciated that the dental device 100-2700 may include any combination of features. For example, a dental device may not include any cutouts on the second surface as shown in the dental device 400, 500 and may include a cavity that is inclined or at an angle relative to a center axis of the dental device as shown in the dental device 100. In another example, a dental device may have cutouts that are perpendicular to or at any angle relative to a center axis of the dental device. In still other embodiments, the cutouts may positioned opposite one another (i.e. on a top surface and a bottom surface) which allows dogs to access the treat more easily and also for treats to escape the device more easily, thereby increasing engagement. Further, in some instances, the cutouts on one side may provide direct access to the treat, while the cutouts on the opposite but corresponding side may simply be a groove with a dental cleaning mechanism. The groove with the dental cleaning mechanism may be formed such that the groove is not deep enough to reach the treat. The benefit of such embodiments is that it still provides cleaning to the top and bottom teeth of the pet, but additional material is retained on one side to increase the durability of the device.

In any combination of features, the dental device(s) as described above provide a reusable and convenient dental device for a pet that encourages a pet to self-clean its teeth by partially exposing a pet treat held in a cavity through one or more cutouts in the dental device. Thus, a pet is encouraged to chew the dental device through the cutouts and through dental cleaning mechanisms disposed on the cutouts to break and obtain the pet treat from the cavity via the cutouts.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A pet dental device comprising:
    a body extending from a first end to a second end, the body having a first portion and a second portion each extending from a center portion, the first portion and the second portion extending at an angle away from each other;
    at least one cavity extending into the body, the at least one cavity configured to receive a pet treat;
    at least one cutout extending into the body and intersecting the at least one cavity to expose a pet treat disposed in the at least one cavity;
    an opening extending into the at least one cavity; and
    a retainer positioned near the opening,
    wherein the pet treat is received in the at least one cavity via the opening and retained within the at least one cavity by the retainer.

2. The pet dental device of claim 1, wherein an axis of the at least one cutout is at least one of perpendicular to a surface of a floor or parallel to and facing the surface of the floor when the body is at rest.

3. The pet dental device of claim 1, further comprising at least one set of dental cleaning mechanisms positioned on at least a portion of a perimeter of the at least one cutout.

4. The pet dental device of claim 1, wherein the angle is at least 90 degrees.

5. The pet dental device of claim 1, wherein the first portion and the second portion are equal in length.

6. The pet dental device of claim 1, wherein the retainer includes a flap positioned within the at least one cavity and near the opening and angled away from the opening, and wherein the pet treat is retained in the at least one cavity by the flap.

7. The pet dental device of claim 1, wherein the retainer includes a trough within the at least one cavity, and wherein the pet treat is captured by the trough after the pet treat is received in the at least one cavity via the opening.

8. The pet dental device of claim 1, wherein the at least one cavity opens to the at least one first end or the second end.

9. The pet dental device of claim 1, wherein the at least one cavity does not reach a center point of the center portion.

10. The pet dental device of claim 1, wherein the at least one cavity comprises a pair of cavities, and wherein a first cavity of the pair of cavities extends from the first end to the center portion and a second cavity of the pair of cavities extends from the second end to the center portion, wherein the first cavity and the second cavity do not intersect.

11. A pet dental device comprising:
    a body extending from a first end to a second end, the body having a center portion between the first end and the second end;
    at least one cavity extending into the body, the at least one cavity configured to receive a pet treat; and
    at least one cutout extending into the body and intersecting the at least one cavity to expose a pet treat disposed in the at least one cavity, the at least one cutout having an axis extending from a first end of the at least one cutout to a second end of the at least one cutout.

12. The pet dental device of claim 11, wherein an axis of the at least one cutout is at least one of perpendicular to a surface of a floor or parallel to and facing the surface of the floor when the body is at rest.

13. The pet dental device of claim 11, further comprising at least one set of dental cleaning mechanisms positioned on at least a portion of a perimeter of the at least one cutout.

14. The pet dental device of claim 11, wherein the body includes a first portion and a second portion each extending from the center portion.

15. The pet dental device of claim 14, wherein the first portion and the second portion extend at an angle away from each other.

16. The pet dental device of claim 14, wherein the first portion and the second portion are equal in length.

17. The pet dental device of claim 14, wherein the first portion and the second portion extend in planes parallel to each other, and where in the first portion and the second portion are spaced apart from each other.

18. A pet dental device comprising:
a body extending from a first end to a second end, the body having a center portion between the first end and the second end;
at least one cavity extending into the body, the at least one cavity configured to receive a pet treat;
at least one cutout extending into the body and intersecting the at least one cavity to expose a pet treat disposed in the at least one cavity;
an opening extending into the at least one cavity; and
a retainer positioned near the opening,
wherein the pet treat is received in the at least one cavity via the opening and retained within the at least one cavity by the retainer.

19. The pet dental device of claim 18, wherein the retainer includes a flap positioned within the at least one cavity and near the opening and angled away from the opening, and wherein the pet treat is retained in the at least one cavity by the flap.

20. The pet dental device of claim 18, wherein the retainer includes a trough within the at least one cavity, and wherein the pet treat is captured by the trough after the pet treat is received in the at least one cavity via the opening.

* * * * *